United States Patent
Hansen et al.

(10) Patent No.: US 7,335,013 B2
(45) Date of Patent: *Feb. 26, 2008

(54) DRIVE SYSTEMS FOR A RECIPROCATING MOLD PLATE PATTY-FORMING MACHINE

(75) Inventors: David Hansen, Orland Park, IL (US);
Glenn Sandberg, New Lenox, IL (US);
Scott A. Lindee, Mokena, IL (US);
Timothy W. Ring, Schererville, TN (US)

(73) Assignee: Formax, Inc., Mokena, IL (US)

( * ) Notice: Subject to any disclaimer, the term of this patent is extended or adjusted under 35 U.S.C. 154(b) by 230 days.

This patent is subject to a terminal disclaimer.

(21) Appl. No.: 10/943,805

(22) Filed: Sep. 16, 2004

(65) Prior Publication Data

US 2005/0103207 A1     May 19, 2005

Related U.S. Application Data

(60) Provisional application No. 60/515,585, filed on Oct. 29, 2003, provisional application No. 60/503,354, filed on Sep. 16, 2003.

(51) Int. Cl.
*A22C 7/00*    (2006.01)

(52) U.S. Cl. .................. 425/574; 425/556; 426/512; 426/513

(58) Field of Classification Search ............... 425/556, 425/574; 426/512, 513; *A22C 7/00*
See application file for complete search history.

(56) References Cited

U.S. PATENT DOCUMENTS 3,747,160 A     7/1973    Holly et al.

(Continued)

FOREIGN PATENT DOCUMENTS

WO     WO 01/41575 A1    6/2001

(Continued)

OTHER PUBLICATIONS

Adjustment—Stroke Length Illustration 3, F-26C Manual, 1997, 1 page, Formax, Inc.

*Primary Examiner*—Yogendra N. Gupta
*Assistant Examiner*—Maria Veronica Ewald
(74) *Attorney, Agent, or Firm*—The Law Office of Randall T. Erickson, PC

(57)     ABSTRACT

A drive system reciprocates a mold plate between a cavity fill position and a patty discharge position, and can also reciprocate knock out plungers to discharge molded food patties from cavities in the mold plate at the patty discharge position. This drive system includes a first electric motor; a first rotary-to-linear motion converting apparatus operatively connected to the first electric motor; at least one drive member operatively connected between the first rotary-to-linear motion converting apparatus and the mold plate to reciprocate the mold plate. The drive system can also include a second electric motor; a second rotary-to-linear motion converting apparatus operatively connected to the second electric motor; and at least one knock out member operatively connected between the second rotary-to-linear motion converting apparatus and the knock out plungers, to reciprocate the knock out plungers. The first and second motors are precisely controlled to control and synchronize the movements of the mold plate and knock out plungers. The drive system can also include a control over a plurality of valves in a mold plate breather air pumping system.

28 Claims, 44 Drawing Sheets

U.S. PATENT DOCUMENTS

| | | |
|---|---|---|
| 3,952,478 A | 4/1976 | Richards et al. |
| 4,054,967 A | 10/1977 | Sandberg et al. |
| RE30,096 E | 9/1979 | Richards |
| 4,182,003 A | 1/1980 | Lamartino et al. |
| 4,356,595 A | 11/1982 | Sandberg et al. |
| 4,372,008 A | 2/1983 | Sandberg |
| 4,516,291 A | 5/1985 | Goldberger et al. |
| 4,697,308 A | 10/1987 | Sandberg |
| 4,768,260 A | 9/1988 | Sandberg |
| 4,768,325 A | 9/1988 | Lindee et al. |
| 4,821,376 A | 4/1989 | Sandberg |
| 4,872,241 A | 10/1989 | Lindee |
| 4,996,743 A | 3/1991 | Janssen |
| 5,655,436 A | 8/1997 | Soper |
| 5,730,650 A | 3/1998 | Soper |
| 5,980,228 A | 11/1999 | Soper |
| 6,156,358 A | 12/2000 | Soper |
| 6,368,092 B1 | 4/2002 | Lindee et al. |
| 6,428,303 B2 * | 8/2002 | Lindee et al. ............... 425/215 |
| 6,454,559 B1 | 9/2002 | Lindee |
| 6,517,340 B2 | 2/2003 | Sandberg |
| 6,572,360 B1 | 6/2003 | Buhlke et al. |
| 6,745,679 B2 | 6/2004 | Nakamura et al. |
| 6,827,111 B1 * | 12/2004 | Tournour et al. ............. 141/12 |
| 2003/0034225 A1 * | 2/2003 | Sandberg et al. ........ 198/460.2 |

FOREIGN PATENT DOCUMENTS

WO    WO 02/102166 A1    12/2002

* cited by examiner

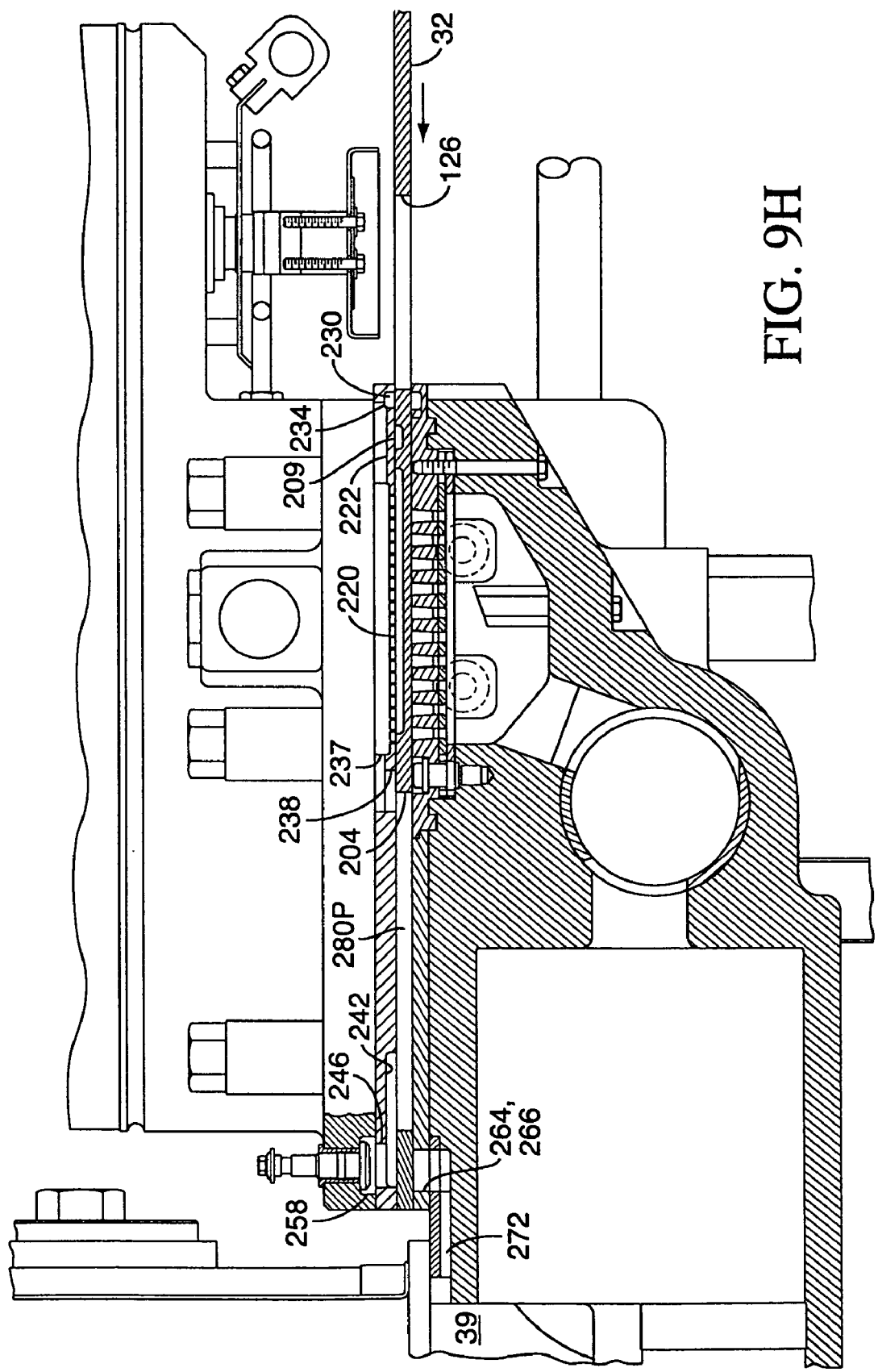

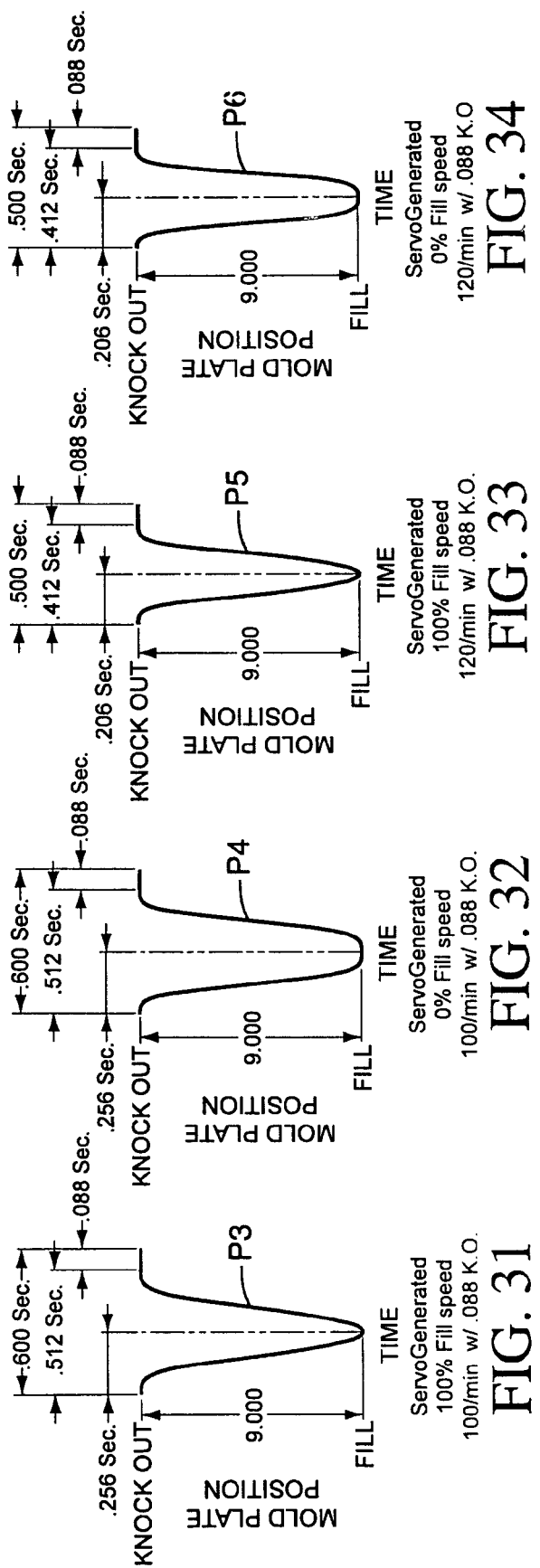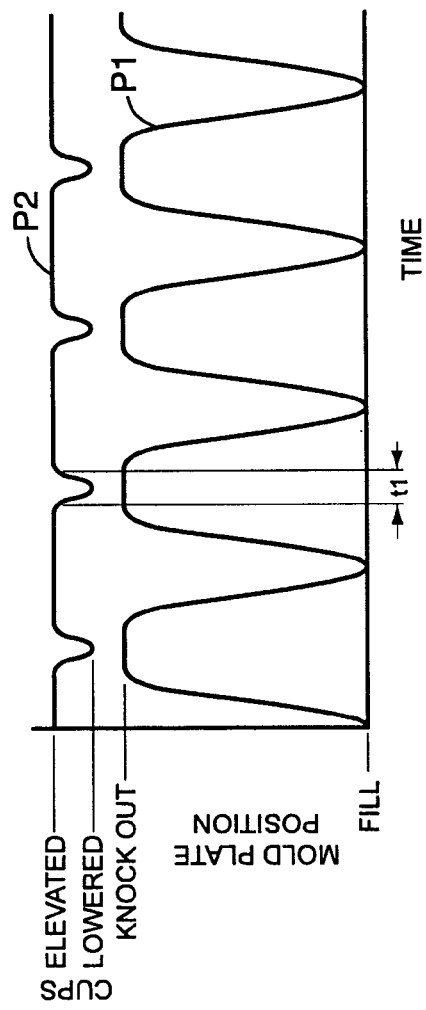

DRIVE SYSTEMS FOR A RECIPROCATING MOLD PLATE PATTY-FORMING MACHINE

This application claims the benefit of U.S. provisional application Ser. No. 60/503,354, filed Sep. 16, 2003, and U.S. provisional application Ser. No. 60/515,585, filed Oct. 29, 2003.

BACKGROUND OF THE INVENTION

Use of pre-processed foods, both in homes and in restaurants, has created a demand for high-capacity automated food processing equipment. That demand is particularly evident with respect to hamburgers, molded steaks, fish cakes, and other molded food patties.

Food processors utilize high-speed molding machines, such as FORMAX F-6, F-12, F-19, F-26 or F-400 reciprocating mold plate forming machines, available from Formax, Inc. of Mokena, Ill., U.S.A., for supplying patties to the fast food industry. Prior known high-speed molding machines are also described for example in U.S. Pat. Nos. 3,887,964; 4,372,008; 4,356,595; 4,821,376; and 4,996,743, all herein incorporated by reference.

Although heretofore known FORMAX patty-molding machines have achieved commercial success and wide industry acceptance, the present inventors have recognized that needs exist for a forming machine having increased energy efficiency, and a smoother and quieter patty-forming machine operation. The present inventors have recognized that needs exist for an enhanced controllability and ability to tune a patty-forming machine for particular food materials to be processed, for an enhanced effectiveness of a patty-forming machine in producing uniform patties. The present inventors have recognized that needs exist for an enhanced convenience for cleaning and maintenance of a patty-forming machine, and for an increased durability, reduced maintenance costs and an increased duration of maintenance free operation.

SUMMARY OF THE INVENTION

The present invention provides an improved automated food patty molding machine capable of producing uniform molded food patties at a high rate of production.

The present invention provides a mold plate drive for a molded food product forming machine that utilizes a mold plate that is reciprocated between a cavity fill position and a patty discharge position. The drive of the invention is preferably a precise position controlled motor that can be precisely controlled to control the movement of the mold plate.

According to the preferred embodiment, the drive includes an electric motor, a pair of drive rods connected to a mold plate, a gear train having gears driven in rotation by the motor, and a pair of cranks driven into rotation by the gears. The motor comprises a precisely position-controlled motor, such as a servomotor. Each of the cranks is connected to reciprocally drive one of the drive rods. The drive rods drive the mold plate into reciprocation between a fill position and a discharge position. The cranks are arranged to rotate in opposite directions. A tie rod is connected between the drive rods.

According to another aspect of the invention, a machine drive system is provided that reciprocates the mold plate between a cavity fill position and a patty discharge position, and reciprocates knock out plungers to discharge molded food patties from cavities in the mold plate at the patty discharge position. The drive system includes a first electric motor; a first rotary-to-linear motion converting apparatus operatively connected to the first electric motor; at least one drive member operatively connected between the first rotary-to-linear motion converting apparatus and the mold plate to reciprocate the mold plate. The drive system also includes a second electric motor; a second rotary-to-linear motion converting apparatus operatively connected to the second electric motor; and at least one knock out member operatively connected between the second rotary-to-linear motion converting apparatus and the knock out plungers, to reciprocate the knock out plungers.

According to this system, rotation of the first electric motor causes reciprocation of the mold plate via the first rotary-to-linear motion converting apparatus and the drive member. Rotation of the second electric motor causes reciprocation of the knock out plungers via the second rotary-to-linear motion converting apparatus and the knock out member. Preferably, the first and second motors comprise precise position-controlled motors, such as servomotors. A controller coordinates the rotation of the first and second electric motors.

According to this system, the mold plate and knock out plungers are not mechanically linked to be driven together but are independently driven by the precise position-controlled motors. More sophisticated mold plate and knock out plunger movements can thus be programmed into, and synchronized by, the controller depending on the characteristics of the food product and patty shape.

According to another aspect of the invention, a machine drive system is provided for a molded food product forming machine having a reciprocating mold plate that reciprocates between a cavity fill position and a patty discharge position, the system including a controllable breather air system. The drive system includes a mold plate having a plurality of cavities, a breather plate and a breather passage. The breather plate has breather holes arranged to register with the cavities when the cavities are in a fill position. The breather holes are arranged to communicate with the breather passage, wherein the breather passage is in communication with a food product fines collection area, such as the food product storage hopper. At least one valve is arranged to close the breather passage between the breather holes and the collection area. The valve is closed during at least a portion of the movement of the mold plate from the cavity fill position toward the patty discharge position, and opened during at least a portion of the movement of the mold plate from the patty discharge position toward the cavity fill position. A first precise position-controlled electric motor, a first rotary-to-linear motion converting device operatively connected to the first electric motor, and at least one drive member operatively connected between the first rotary-to-linear motion converting device and the mold plate are configured such that rotation of the first electric motor causes reciprocation of the mold plate via the first rotary-to-linear motion converting device and the drive member. A controller coordinates the rotation of the first electric motor and the opening and closing of the valve.

According to a further aspect of the aforementioned system, the system also includes a second precise position-controlled electric motor, a second rotary-to-linear motion converting device operatively connected to the second electric motor, and at least one knock out member operatively connected between the second rotary-to-linear motion converting device and the knock out plungers, configured such that rotation of the second electric motor causes reciprocation of the knock out plungers via the second rotary-to-linear motion converting device and the knock out member. The controller coordinates the rotation of the second electric motor with rotation of the first electric motor.

According to a preferred embodiment, the food patty forming machine comprises two food pumps, each pump including a pump cavity having an intake opening and an outlet opening, a plunger aligned with the cavity, and drives for moving the plunger between a retracted position clear of the intake opening in the cavity, and a pressure position in which the plunger is advanced inwardly of the cavity, beyond the intake opening, toward the outlet opening. Supply means are provided for supplying moldable food material to the intake opening of each pump cavity whenever the plunger for that pump is in its retracted position. A manifold connects the outlet openings of the two pump cavities to the inlet of the molding mechanism. Actuating means are provided to actuate the pumps in that at least one pump cavity always contains moldable food material under pressure.

Valve means are incorporated in the manifold to seal the outlet opening of each pump cavity and the manifold whenever the plunger for that pump is moved toward its retracted position, thereby supporting a continuous supply of moldable food material, under pressure, to the inlet of the molding mechanism.

The molding mechanism comprises the reciprocating mold plate having one or more rows of mold cavities that are filled by one of the pumps via the inlet of the molding mechanism. The mold plate is reciprocated by a first servo drive motor. The first servo drive motor can precisely control the position of the mold plate, and the movement of the mold plate. Thus, the mold plate advance and retract speeds, acceleration, deceleration and dwell periods for filling and/or for discharging the cavities can be precisely controlled. These movements and dwell period can be tailored according to the type of food material and to the shape of the patties.

The molding mechanism also includes the knockout mechanism driven by the second servo drive motor. The speed, acceleration, deceleration and dwell periods of the knockout plungers can be precisely controlled by the second servo drive motor to be synchronized with the mold plate movements and positions and for the type of food product and shape of the patties.

A breather plate is arranged facing the mold plate and includes breather holes for expressing air and food product fines from the food product patties as they are formed in the cavities. The breather holes are connected to a breather passage that is also in select communication with outside air at a front of the breather plate and includes a pump chamber behind the mold plate. At least one valve is arranged in the breather passage between the breather holes and the fines collection area. The valve can be controlled for opening and closing by a pneumatic cylinder that is connected via a pneumatic interface, to the controller.

The invention provides an improved high-speed food patty molding machine that is subject to minimal wear in operation, and that requires minimal maintenance. The invention also provides an improved high-speed patty molding machine that is quiet in operation. The invention also provides an improved patty molding machine that has and enhanced energy efficiency. The invention also provides a reduced overall number of mechanical components, resulting in a reduced complexity. The improved high-speed food patty molding machine is simple and cost effectively manufactured, assembled, adjusted, and maintained, and can be readily disassembled for cleaning.

Numerous other advantages and features of the present invention will be become readily apparent from the following detailed description of the invention and the embodiments thereof, and from the accompanying drawings.

BRIEF DESCRIPTION OF THE DRAWINGS

FIGS. 9A-9K are enlarged fragmentary sectional views taken from FIG. 2, showing the machine configuration as the mold plate is moved along its path of reciprocation;

FIG. 30 is a position versus time diagram for a mold plate according to the invention;

FIG. 31 is a diagram of a first mold plate waveform;

FIG. 32 is a diagram of a second mold plate waveform;

FIG. 33 is a diagram of a third mold plate waveform;

FIG. 34 is a diagram of a fourth mold plate waveform;

DETAILED DESCRIPTION OF THE PREFERRED EMBODIMENTS

Figure 1:
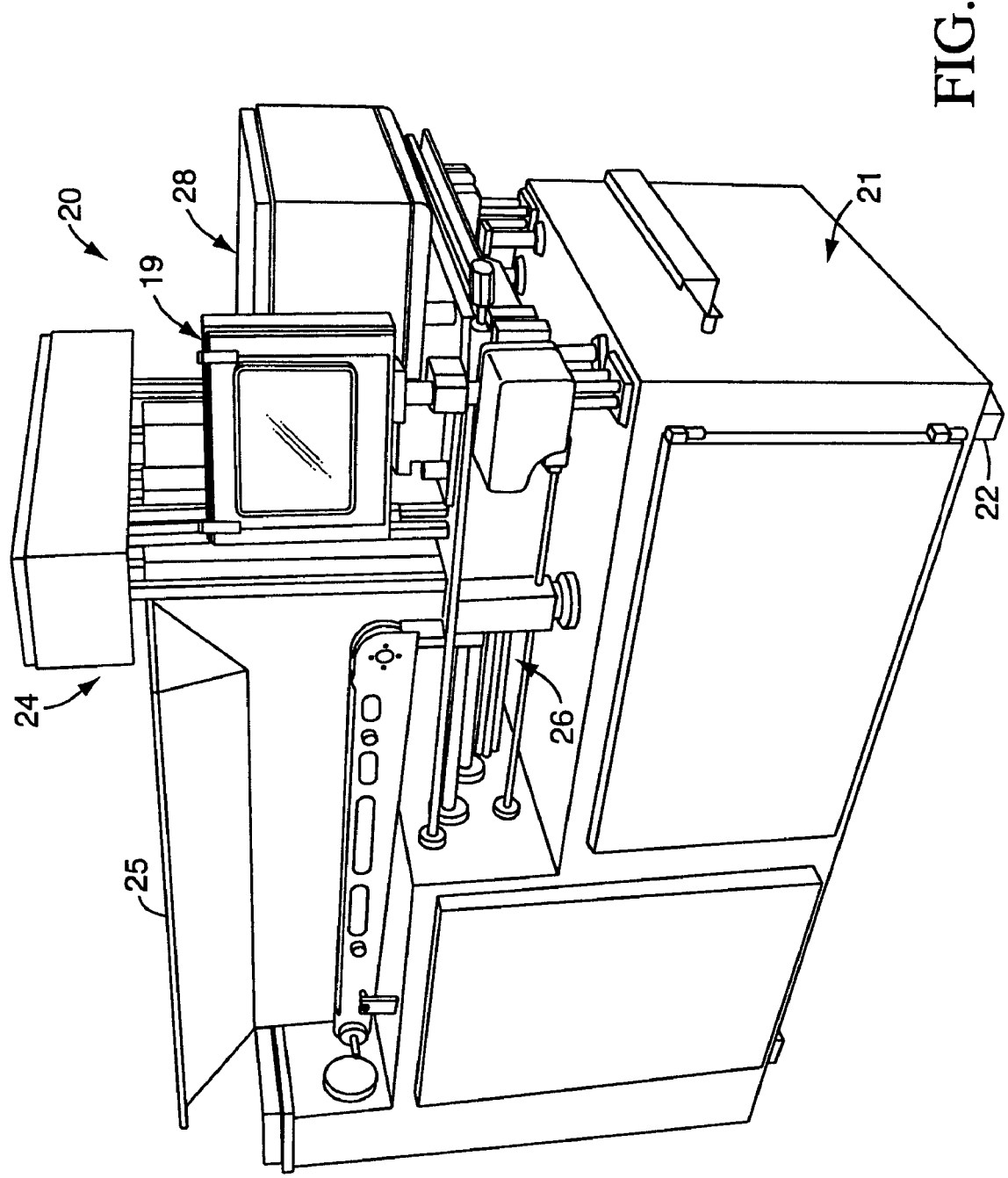
FIG. 1 is a perspective view of a patty-forming machine of the present invention.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

General Description Of The Apparatus

The high-speed food patty molding machine 20 illustrated in the figures comprises an exemplary embodiment of the invention. The complete machine is described in U.S. Ser. No. 10/942,627, now U.S. Pat. No. 7,255,554, filed on the same day as the present application, and herein incorporated by reference. This application also incorporates by reference U.S. Application Ser. No. 60/503,354, filed Sep. 16, 2003 and U.S. Provisional Application Ser. No. 60/515,585, filed Oct. 29, 2003.

The molding machine 20 includes a machine base 21, preferably mounted upon a plurality of feet 22, rollers or wheels. The machine base 21 supports the operating mechanism for machine 20 and can contain hydraulic actuating systems, electrical actuating systems, and most of the machine controls. The machine 20 includes a supply 24 for supplying moldable food material, such as ground beef, fish, or the like, to the processing mechanisms of the machine.

Figure 24:
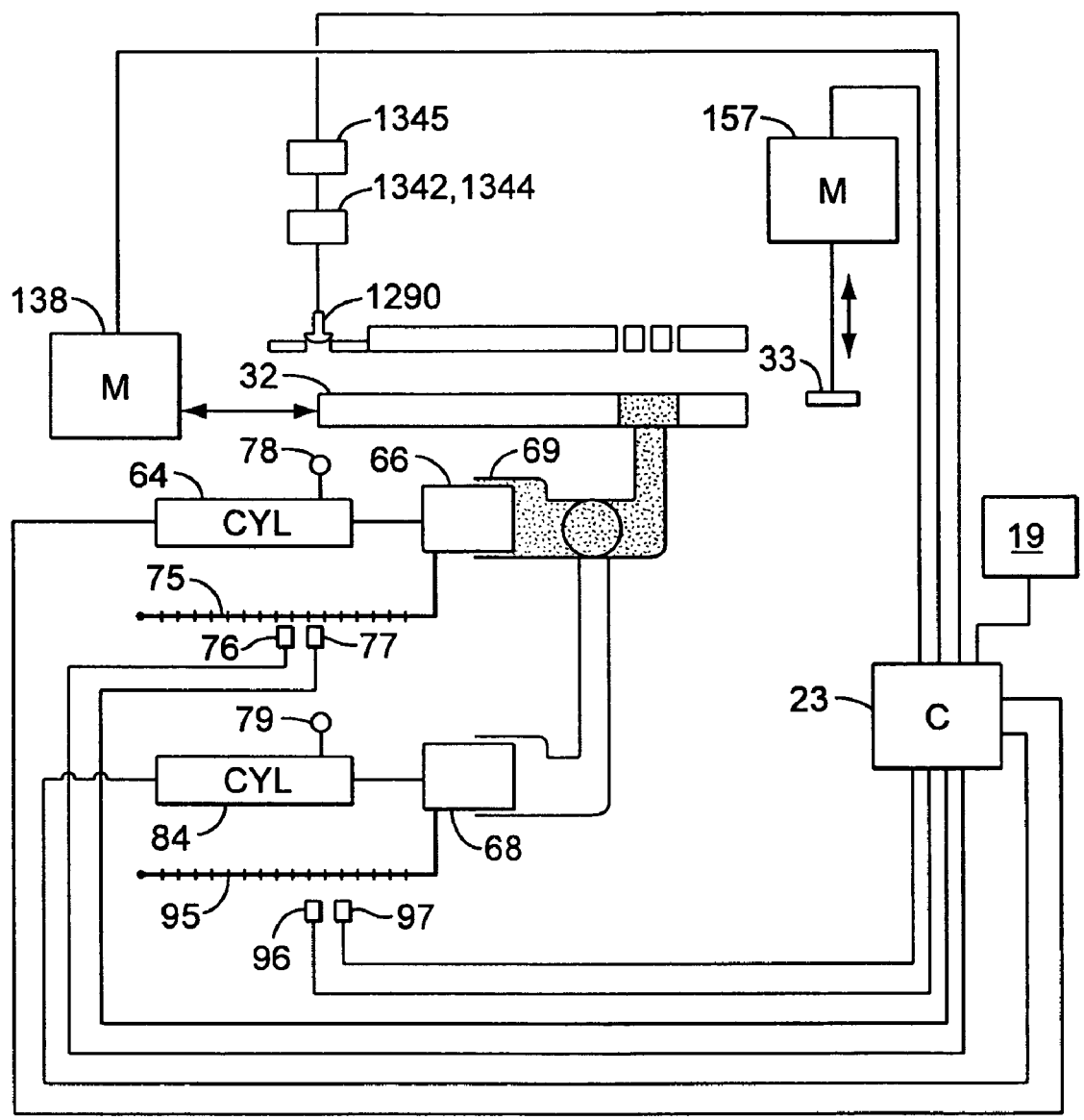
FIG. 24 is a schematic control diagram of the machine of the present invention.
Figure 25:
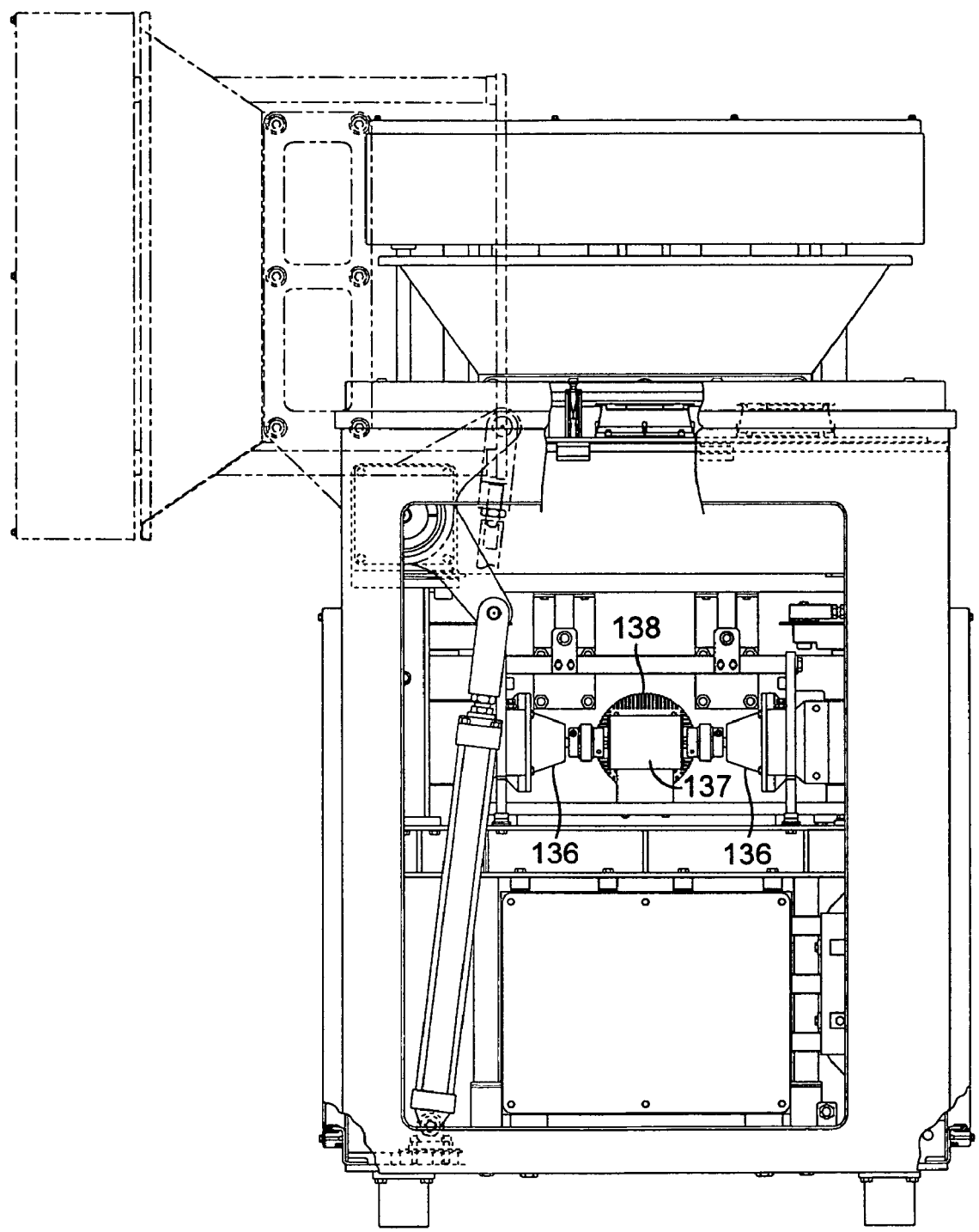
FIG. 25 is a sectional view taken generally along line 25-25 of FIG. 2, with some components and/or panels removed for clarity.

A control panel 19, such as a touch screen control panel, is arranged on a forward end of the apparatus 20 and communicates with a machine controller 23, shown in FIG. 24.

As generally illustrated in FIGS. 2-6, supply means 24 comprises a large food material storage hopper 25 that opens into the intake of a food pump system 26. The food pump system 26 includes at least two food pumps 61, 62, described in detail hereinafter, that continuously, or intermittently under a pre-selected control scheme, pump food material, under pressure, into a valve manifold 27 flow-connected to a cyclically operated molding mechanism 28.

In the operation of machine 20, a supply of ground beef or other moldable food material is deposited into hopper 25 from overhead. An automated refill device (not shown) can be used to refill the hopper when the supply of food product therein is depleted. The floor of hopper 25 at least partially closed by a conveyor belt 31 of a conveyor 30. The belt 31 includes a top surface 31a for moving the food material longitudinally of the hopper 25 to a hopper forward end 25a.

The food material is moved by supply means 24 into the intake of plunger pumps 61, 62 of pumping system 26. The pumps 61, 62 of system 26 operate in overlapping alteration to each other; and at any given time when machine 20 is in operation, at least one of the pumps is forcing food material under pressure into the intake of manifold 27.

Figure 1A:
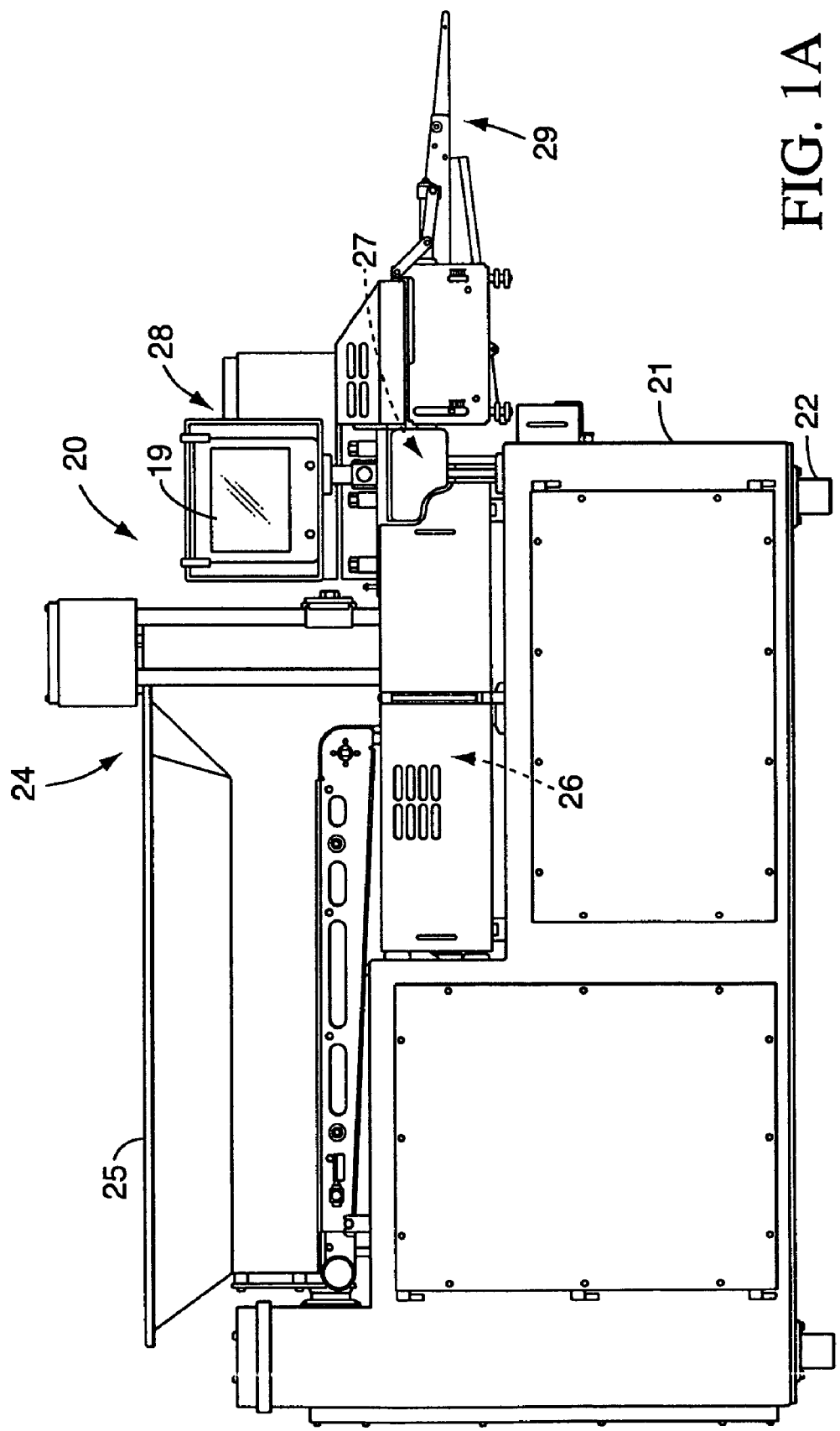
FIG. 1A is an elevational view of the patty-forming machine of FIG. 1.

The manifold 27 comprises a path for feeding the food material, still under relatively high pressure, into the molding mechanism 28. Molding mechanism 28 operates on a cyclic basis, first sliding a multi-cavity mold plate 32 into a receiving position over manifold 27 (FIG. 9A) and then away from the manifold to a discharge position (FIG. 9F) aligned with a series of knock out cups 33. When the mold plate 32 is at its discharge position, knock out cups plungers or cups 33 are driven downwardly as indicated by 33A in FIG. 2, discharging hamburgers or other molded patties from machine 20. The molded patties are deposited onto a conveyor 29 (FIG. 1A), to be transported away from the apparatus 20.

Food Supply System

The food supply means 24 and associated hopper 25 are illustrated in FIGS. 2-6. As seen, the conveyor belt 31 spans completely across the bottom of hopper 25, around an end of idler roller or pulley 35 and drive roller or pulley 36, the lower portion of the belt being engaged by a tensioning roller 37. In some cases the tensioning roller 37 may not be necessary, and can be eliminated. A drum motor (not visible) is provided within the drive roller 36 for rotating the drive roller.

The belt 31 can include a longitudinal V-shaped rib on an inside surface thereof that fits within a V-shaped cross sectional notch provided on the rollers 35, 36 to maintain a lateral centering of the belt during operation.

The forward end 25a of hopper 25 communicates with a vertical pump 38 having an outlet 39 at least partly open into a pump intake manifold chamber 41. A vertically oriented frame 42 extends above hopper 25 adjacent the right-hand side of the outlet 39. A motor housing 40 is mounted on top of the frame 42. A support plate 43 is affixed to the upper portion of frame 42 extending over the outlet 39 in hopper 25. The frame comprises four vertical tie rods 44a surrounded by spacers 44b (FIG. 5).

Figure 5:
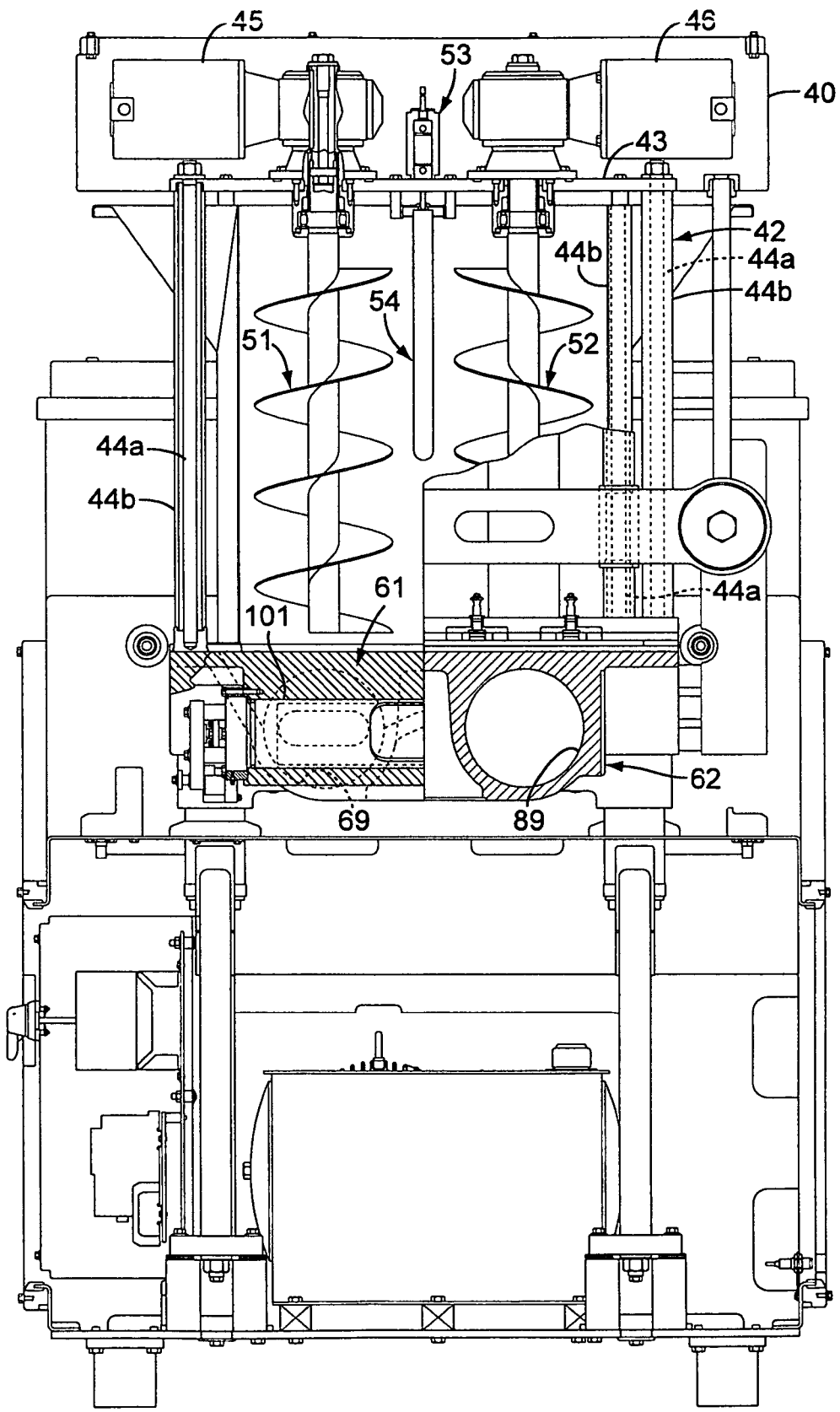
FIG. 5 is a sectional view taken generally along line 5-5 of FIG. 2, with some components and/or panels removed for clarity.

As shown in FIG. 5, the vertical pump 38 comprises two feed screw motors 45, 46 that drive feed screws 51, 52. The two electrical feed screw motors 45, 46 are mounted upon the support plate 43, within the motor housing 40. Motor 45 drives the feed screw 51 that extends partly through opening 39 in alignment with a pump plunger 66 of the pump 61. Motor 46 drives the feed screw 52 located at the opposite side of hopper 25 from feed screw 51, and aligned with another pump plunger 68 of the pump 62.

A level sensing mechanism 53 is located at the outlet end of hopper 25 comprising an elongated sensing element 54. As the moldable food material is moved forwardly in the hopper 25, it may accumulate to a level in which it engages the sensing element 54. When this occurs, a signal is generated to interrupt the drive for the roller 36 of conveyor 30. In this manner the accumulation of food material at the forward end 25a of hopper 25 is maintained at an advantageous level.

Figure 2:
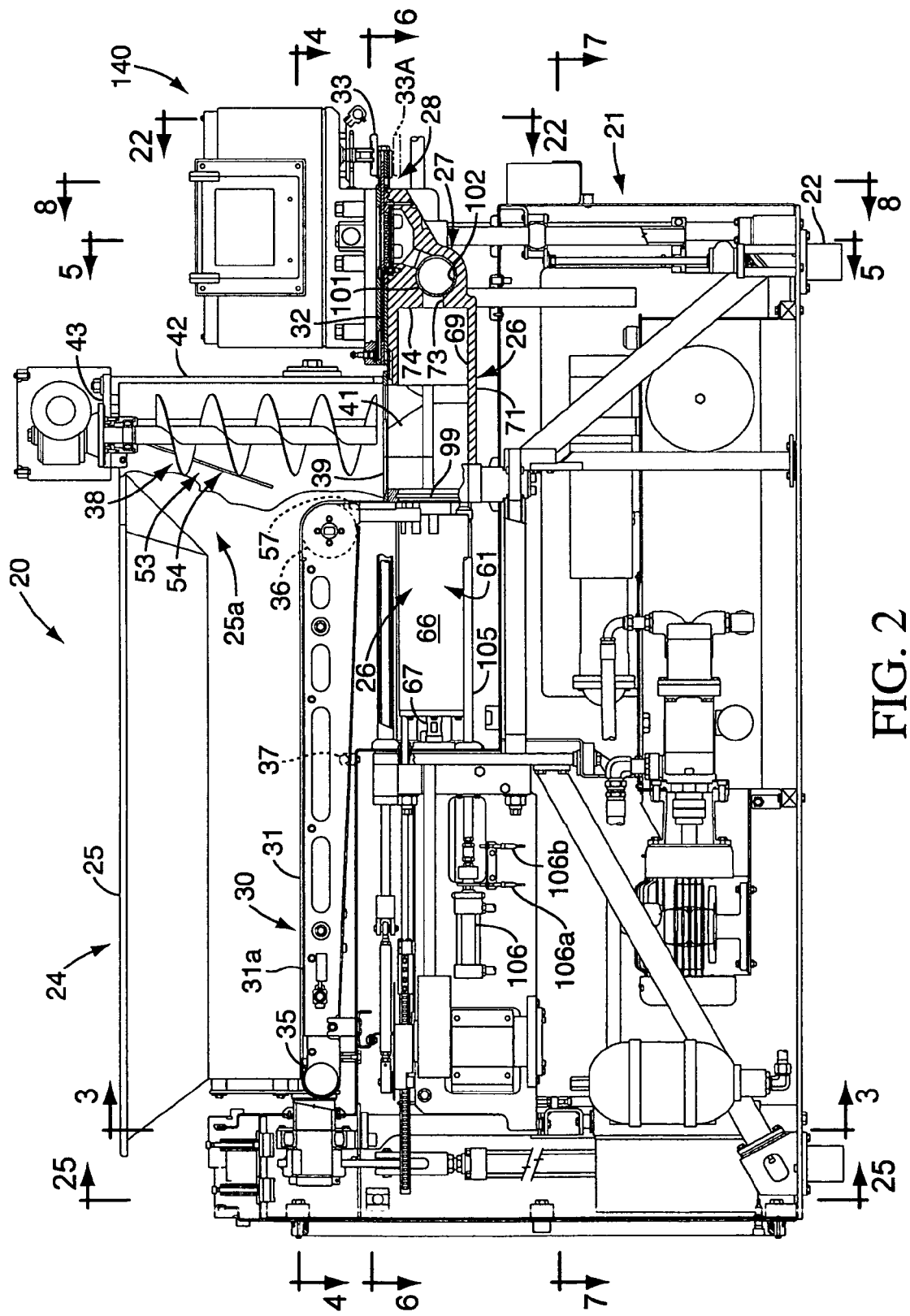
FIG. 2 is a longitudinal sectional view of the patty-forming machine of FIG. 1, with some components and/or panels removed for clarity.

When machine 20 is in operation, the feed screw motor 45 is energized whenever plunger 66 is withdrawn to the position shown in FIG. 2, so that feed screw 51 supplies meat from hopper 25 downwardly through outlet 39 into one side of the intake 41 of the food pumping system 26. Similarly, motor 46 actuates the feed screws 52 to feed meat to the other side of intake 41 whenever plunger 68 of the pump 62 is withdrawn. In each instance, the feed screw motors 45, 46 are timed to shut off shortly after the plunger is fully retracted, avoiding excessive agitation of the meat. As the supply of food material in the outlet 39 is depleted, the conveyor belt 31 continuously moves food forwardly in the hopper and into position to be engaged by the feed screws 51, 52. If the level of meat at the outlet 39 becomes excessive, conveyor 30 is stopped, as described above, until the supply at the hopper outlet is again depleted.

The wall of the outlet 39 immediately below conveyor drive rollers 36 comprises a belt wiper plate 57 that continuously engages the surface of the conveyor belt 31 to prevent leakage of the food material 38 from the hopper at this point.

Food Pump System

Figure 6:
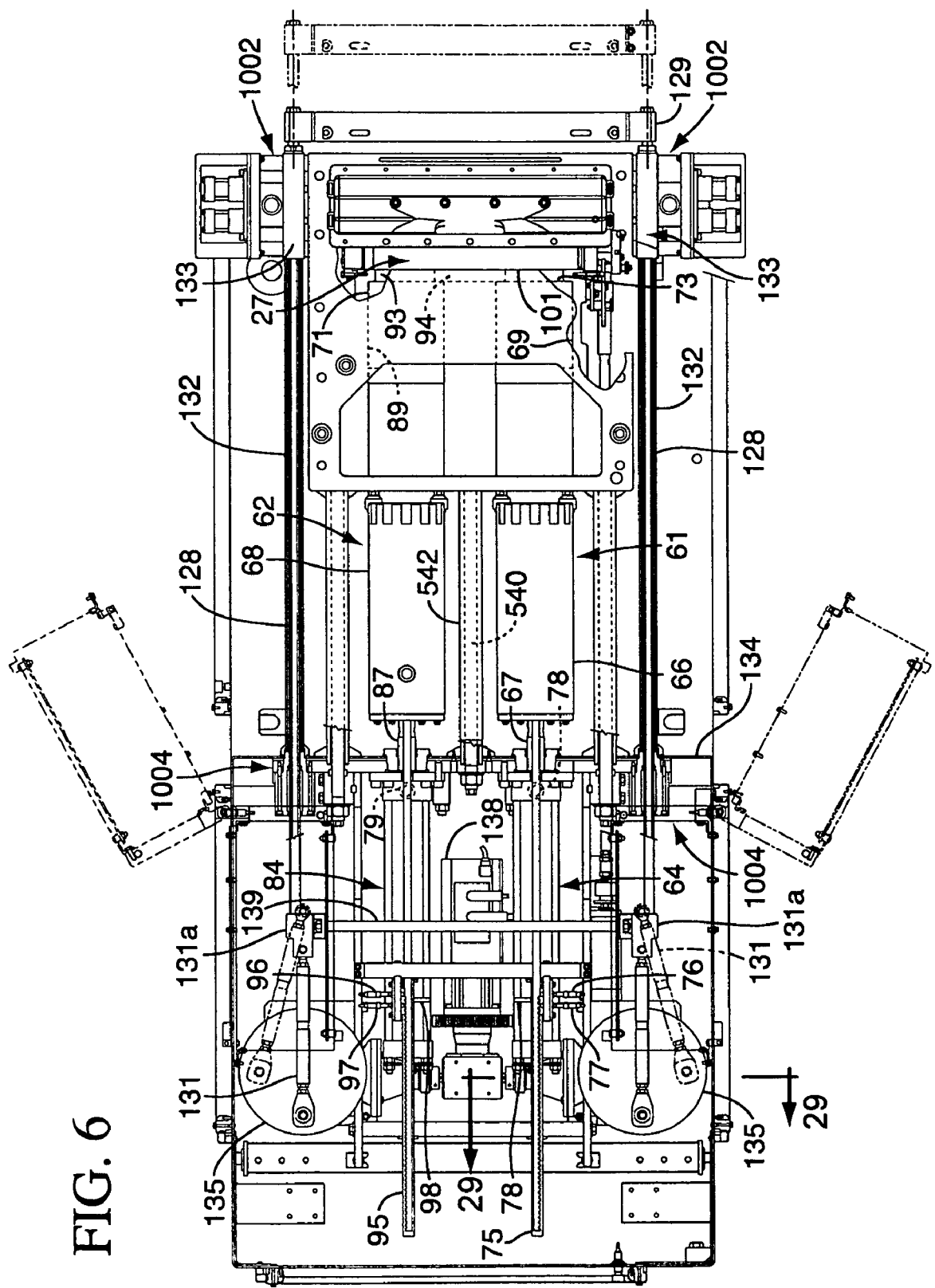
FIG. 6 is a sectional view taken generally along line 6-6 of FIG. 2, with some components and/or panels removed for clarity.
Figure 7:
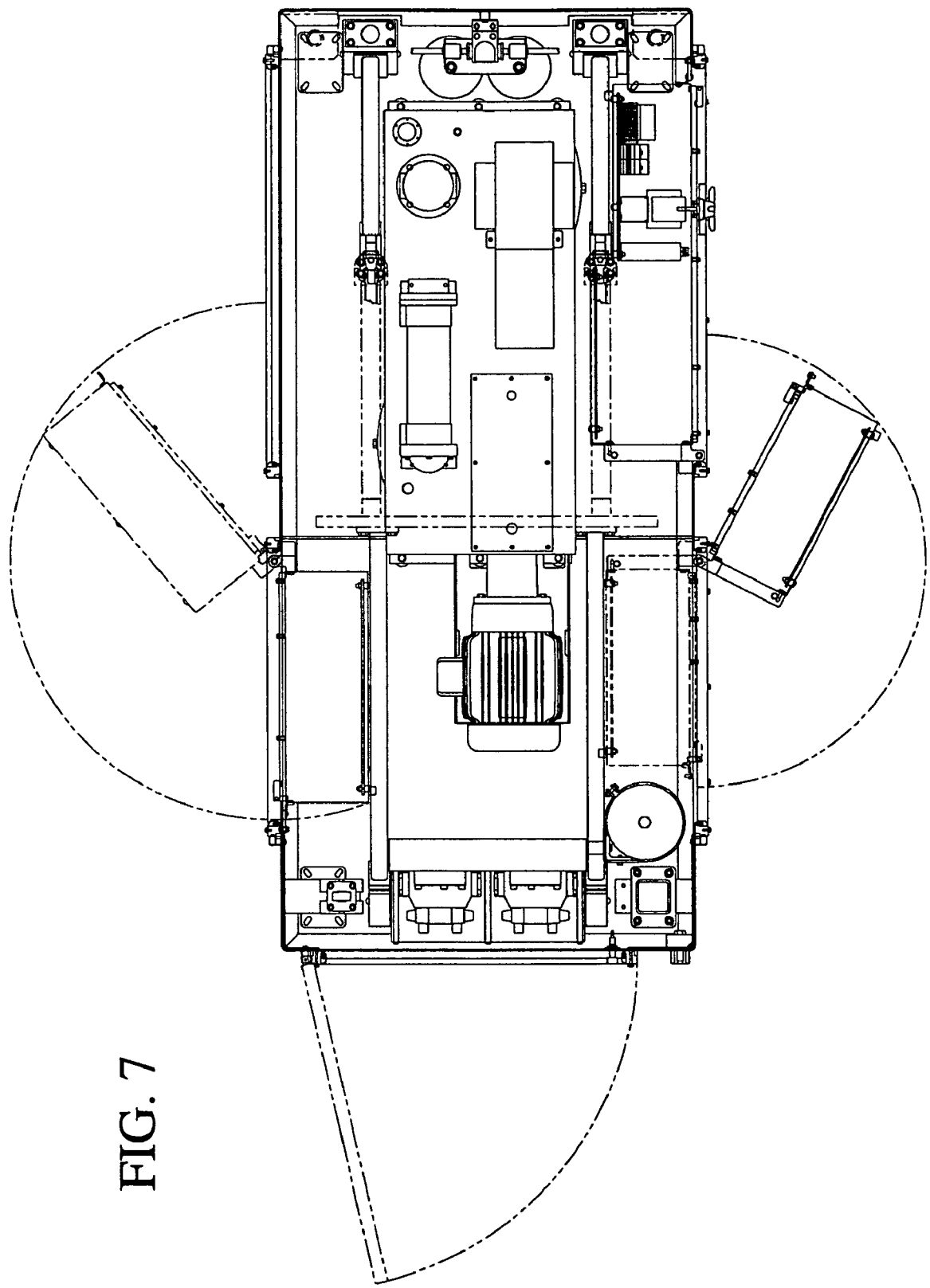
FIG. 7 is a sectional view taken generally along line 7-7 of FIG. 2, with some components and/or panels removed for clarity.
Figure 8:
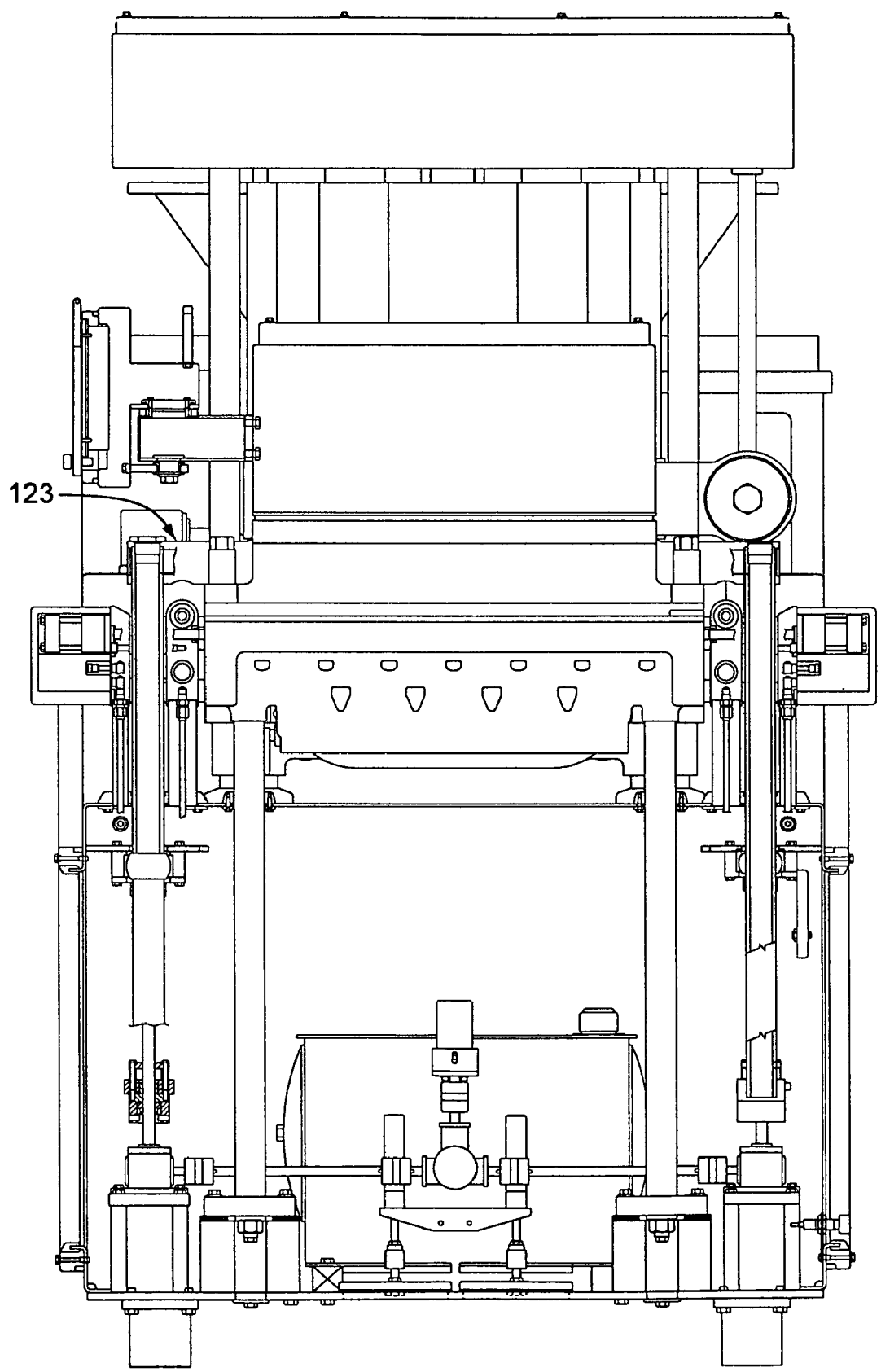
FIG. 8 is a sectional view taken generally along line 8-8 of FIG. 2, with some components and/or panels removed for clarity.

The food pump system 26 of molding machine 20 is best illustrated in FIGS. 2 and 6. Pump system 26 comprises the two reciprocating food pumps 61, 62 mounted within the machine base 21. The first food pump 61 includes a hydraulic cylinder 64. The piston (not shown) in cylinder 64 is connected to an elongated piston rod 67; the outer end of the elongated piston rod 67 is connected to the large plunger 66. The plunger 66 is aligned with a first pump cavity 69 formed by a pump cavity enclosure or pump housing 71. The forward wall 74 of pump cavity 69 has a relatively narrow slot 73 that communicates with the valve manifold 27 as described more fully hereinafter.

Preferably, the pump housing 71 and the valve manifold 27 are cast or otherwise formed as a one piece stainless steel part.

The second food pump 62 is essentially similar in construction to pump 61 and comprises a hydraulic cylinder 84. Cylinder 84 has an elongated piston rod 87 connected to the large plunger 68 that is aligned with a second pump cavity 89 formed in housing 71. The forward wall 94 of pump cavity 89 includes a narrow elongated slot 93 communicating with manifold 27.

Advantageously, the plungers 66, 68 and the pump cavities 69, 89 have corresponding round cross sections for ease of manufacturing and cleaning.

An elongated proximity meter 75 is affixed to the first pump plunger 66 and extends parallel to piston rod 67 into alignment with a pair of proximity sensors 76 and 77. A similar proximity meter 95 is fixed to and projects from plunger 68, parallel to piston rod 87, in alignment with a pair of proximity sensors 96, 97. Proximity sensors 76, 77 and 96, 97 comprise a part of the control of the two pumps 61, 62, shown in FIG. 24.

The meters 75, 95 and sensors 76, 77, 96, 97 monitor the plunger positions in small, precise increments, such as every 0.25 inches. The meters include teeth or other targets that are sensed by the sensors and counted by machine electronics, such as in the controller 23, or in intervening electronics and communicated to the controller 23.

Two further proximity sensors 78, 98 responsive to targets on an inside facing surfaces of the meters 75, 95 respectively, are provided which communicate to the controller 23, or to intervening electronics that communicate with the controller 23, the home position of the respective plunger which corresponds to a front end of each plunger being just inside, and sealed by a front ring seal 99 (FIG. 2) to the pump housing 71. The home position of each plunger is used by the controller to calibrate or set the machine position control of the plungers 66, 86.

In operation, the first pump 61 pumps the moldable food material into manifold 27 and the second pump 62 receives a supply of the moldable food material for a subsequent pumping operation. Pump 61 begins its pumping stroke, and compresses food product in pump cavity 69, forcing the moldable food material through slot 73 into manifold 27. As operation of molding machine 20 continues, pump 61 advances plunger 66 to compensate for the removal of food material through manifold 27. The pump can maintain a constant pressure on the food material in the cavity 69 during the molding cycle, or preferably can provide a pre-selected pressure profile over the molding cycle such as described in U.S. Pat. No. 4,356,595, incorporated herein by reference, or as utilized in currently available FORMAX machines. The pressure applied through pump 61 is sensed by a pressure sensing switch 78 connected to a port of the cylinder 64.

As plunger 66 advances, the corresponding movement of proximity meter 75 signals the sensor 76, indicating that plunger 66 is near the end of its permitted range of travel. When this occurs, pump 62 is actuated to advance plunger 68 through pump cavity 89, compressing the food material in the second pump cavity in preparation for feeding the food material from the cavity into manifold 27. The pressure applied through pump 62 is sensed by a pressure sensing switch 79 connected to one port of cylinder 84.

When the food in the second pump cavity 89 is under adequate pressure, the input to manifold 27 is modified so that subsequent feeding of food product to the manifold is effected from the second pump cavity 89 with continuing advancement of plunger 68 of the second pump 62. After the manifold intake has been changed over, pump 61 is actuated to withdraw plunger 66 from cavity 69.

Thereafter, when plunger 68 is near the end of its pressure stroke into pump cavity 89, proximity sensor 96, signals the need to transfer pumping operations to pump 61. The changeover process described immediately above is reversed; pump 61 begins its compression stroke, manifold 27 is changed over for intake from pump 61, and pump 62 subsequently retracts plunger 68 back to the supply position to allow a refill of pump cavity 89. This overlapping alternating operation of the two pumps 61, 62 continues as long as molding machine 20 is in operation.

The valve manifold 27, shown in FIGS. 2 and 6, holds a manifold valve cylinder or tube valve 101 fit into an opening 102 in housing 71 immediately beyond the pump cavity walls 74 and 94.

According to one embodiment, valve cylinder 101 includes two longitudinally displaced intake slots 107 and 108 alignable with the outlet slots 73 and 93, respectively, in the pump cavity walls 74 and 94. Slots 107 and 108 are angularly displaced from each other to preclude simultaneous communication between the manifold and both pump cavities 69 and 89. Cylinder 101 also includes an elongated outlet slot 109. The valve cylinder outlet slot 109 is generally aligned with a slot 111 (see FIG. 9A) in housing 71 that constitutes a feed passage for molding mechanism 28.

One end wall of valve cylinder 101 includes an externally projecting base end 103 that is connected to a drive linkage 104, which in turn is connected to the end of the piston rod 105 of a hydraulic actuator cylinder 106 (FIG. 2). Proximity sensors 106a, 106b communicate the rotary position of the valve cylinder to the machine controller 23.

When the pump 61 is supplying food material under pressure to molding mechanism 28, actuator cylinder 106 has retracted piston rod 105 to the inner limit of its travel, angularly orienting the manifold valve cylinder 101. With cylinder 101 in this position, its intake slot 107 is aligned with the outlet slot 73 from pump cavity 69 so that food material is forced under pressure from cavity 69 through the interior of valve cylinder 101 and out of the valve cylinder outlet slot 109 through slot 111 to the molding mechanism 28. On the other hand, the second intake slot 108 of valve cylinder 101 is displaced from the outlet slot 93 for the second pump cavity 89. Consequently, the food material forced into the interior of valve cylinder 101 from pump cavity 69 cannot flow back into the other pump cavity 89.

The valve cylinder 101 and corresponding slots or openings can alternately be as described in U.S. Provisional Application 60/571,368, filed May 14, 2004, or U.S. Ser. No. 10/942,754, now U.S. Pat. No. 7,125,245, filed on the same day as the present invention, both herein incorporated by reference. According to these disclosures, rather than a single outlet 109, two rows of progressively sized outlets, smallest closest to the active pump, are alternately opened to plural openings that replace the single opening 111.

Molding Mechanism

Figure 9A:
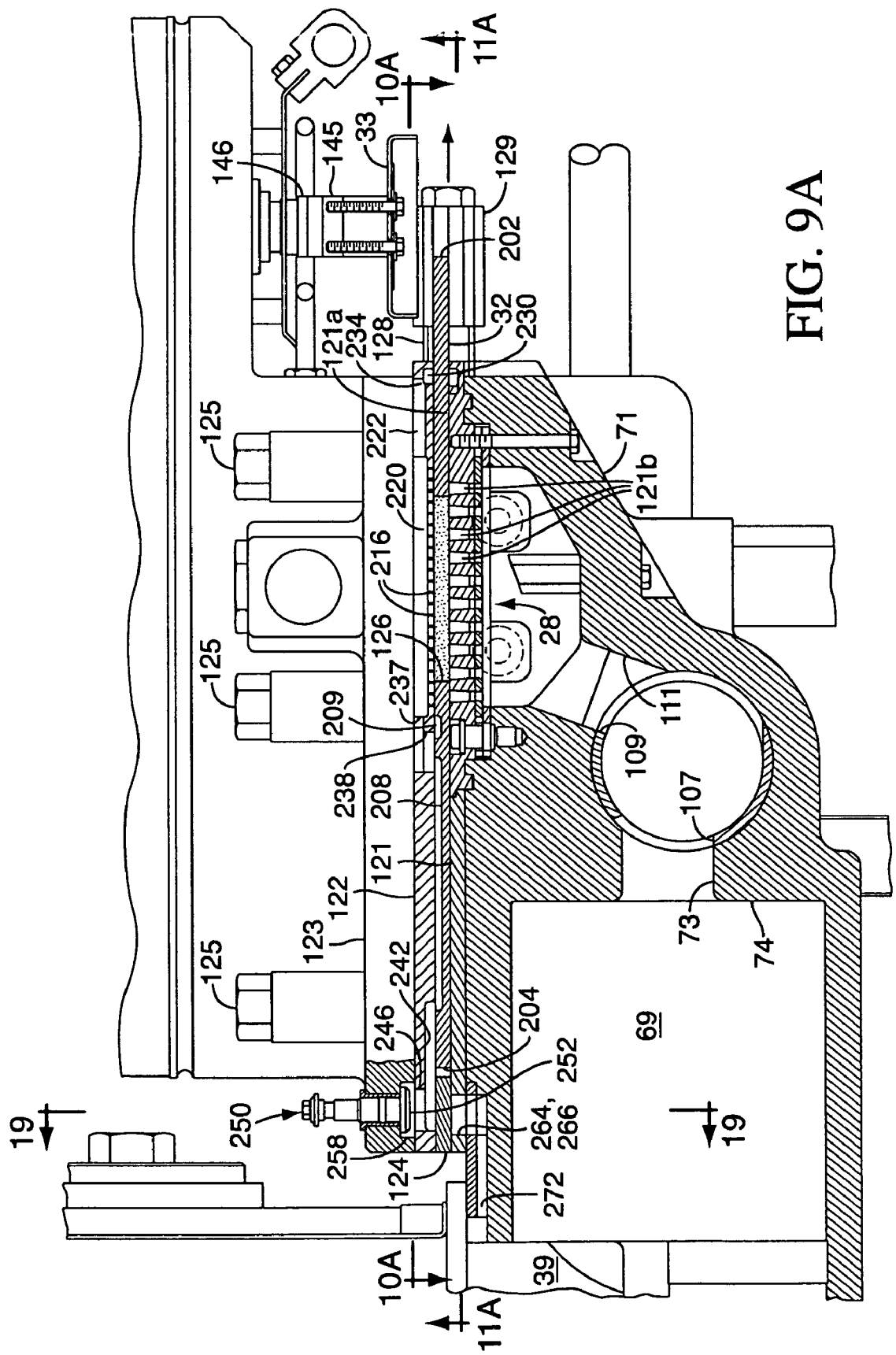

As best illustrated in FIG. 9A, the upper surface of the housing 71 that encloses the pump cavities 69 and 89 and the manifold 27 carries a support plate or wear plate 121 and a fill plate 121a that forms a flat, smooth mold plate support surface. The mold support plate 121 and the fill plate 121a may be fabricated as two plates as shown, or a single plate bolted to or otherwise fixedly mounted upon housing 71. The fill plate 121a includes apertures or slots that form the upper portion of the manifold outlet passage 111. In the apparatus illustrated, a multi fill orifice type fill plate 121a is utilized. A simple slotted fill plate is also encompassed by the invention.

Mold plate 32 is supported upon plates 121, 121a. Mold plate 32 includes a plurality of individual mold cavities 126 extending across the width of the mold plate and alignable with the manifold outlet passageway 111. Although a single row of cavities is shown, it is also encompassed by the invention to provide plural rows of cavities, stacked in aligned columns or in staggered columns. A cover plate 122 is disposed immediately above mold plate 32, closing off the top of each of the mold cavities 126. A mold cover casting or housing 123 is mounted upon cover plate 122. The spacing between cover plate 122 and support plate 121 is maintained equal to the thickness of mold plate 32 by support spacers 124 mounted upon support plate 121. Cover plate 122 rests upon spacers 124 when the molding mechanism is assembled for operation. Cover plate 122 and mold cover 123 are held in place by six mounting bolts, or nuts tightened on studs, 125.

The cover plate 122 can be configured as a breather plate as part of a molding mechanism air-and-fines removal system, such as described in U.S. Ser. No. 10/942,755, and filed on the same day as the present application, and herein incorporated by reference.

Figure 3:
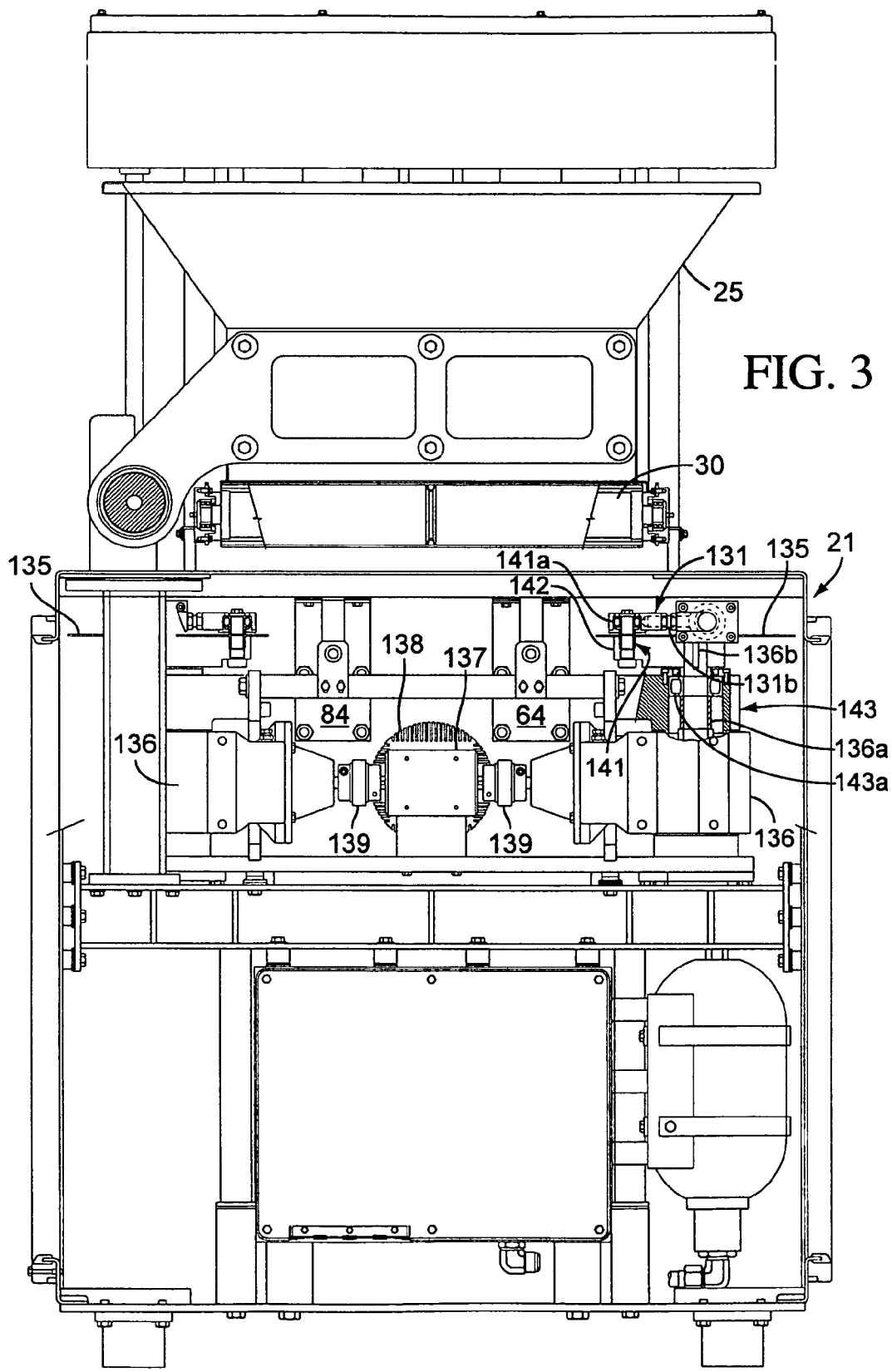
FIG. 3 is a sectional view taken generally along line 3-3 of FIG. 2, with some components and/or panels removed for clarity.
Figure 4:
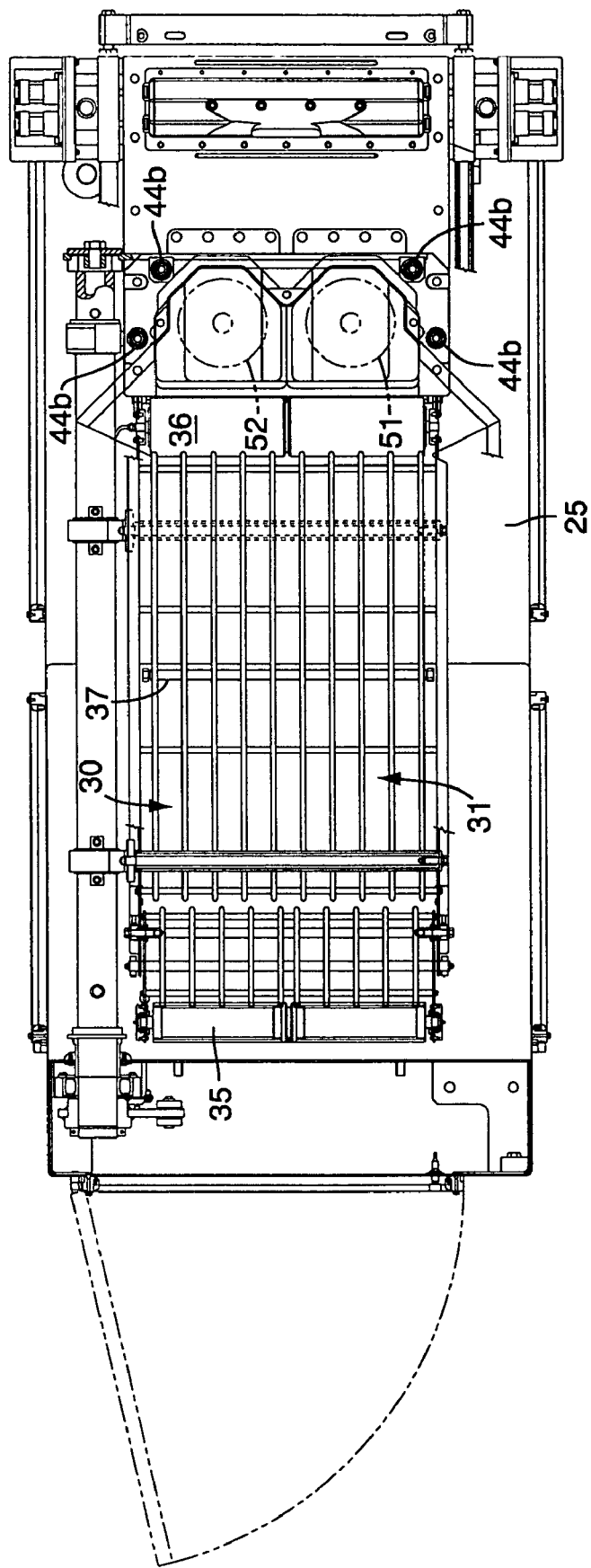
FIG. 4 is a sectional view taken generally along line 4-4 of FIG. 2, with some components and/or panels removed for clarity.
Figure 26:
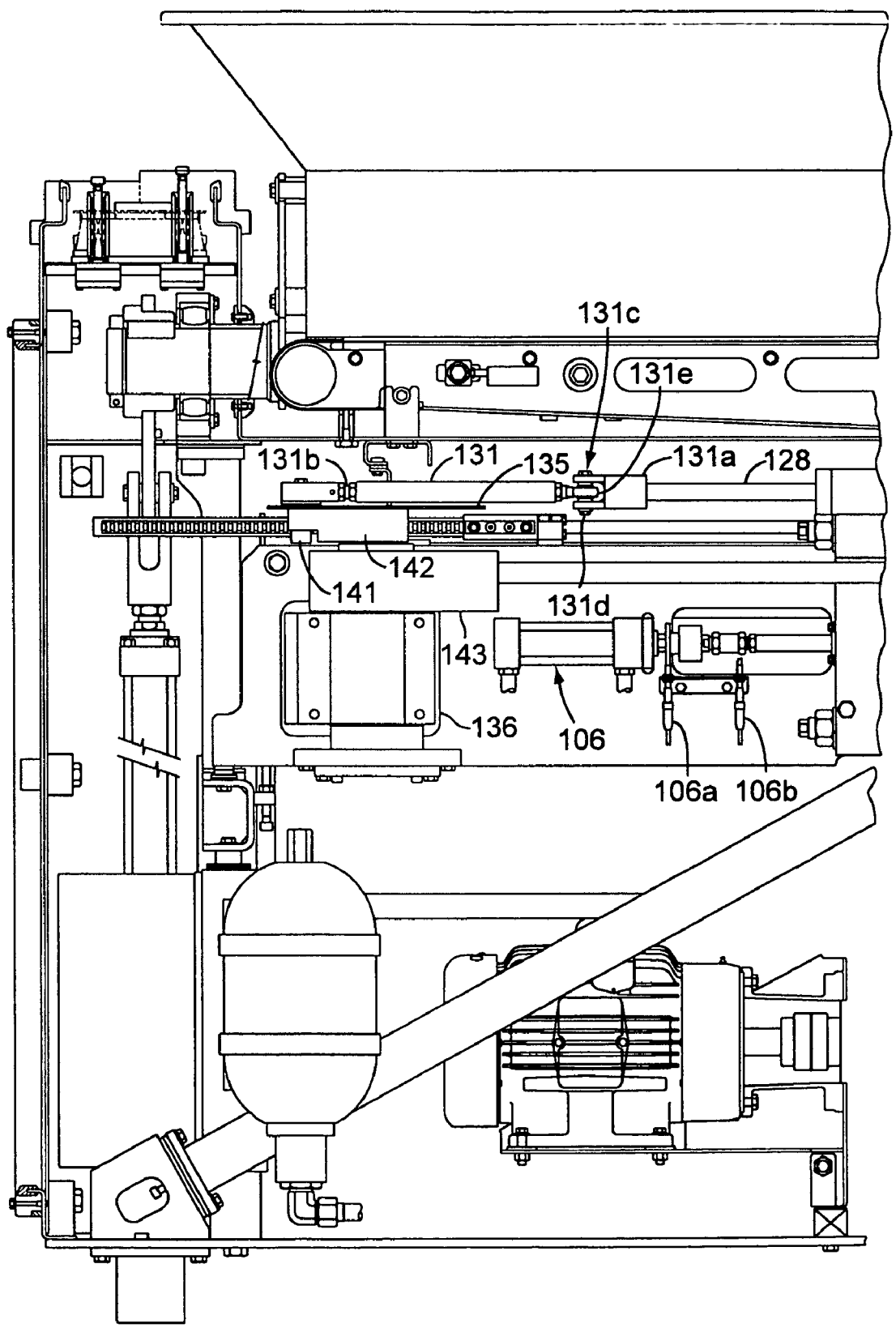
FIG. 26 is an enlarged, fragmentary view taken from the left side of FIG. 2.
Figure 29:
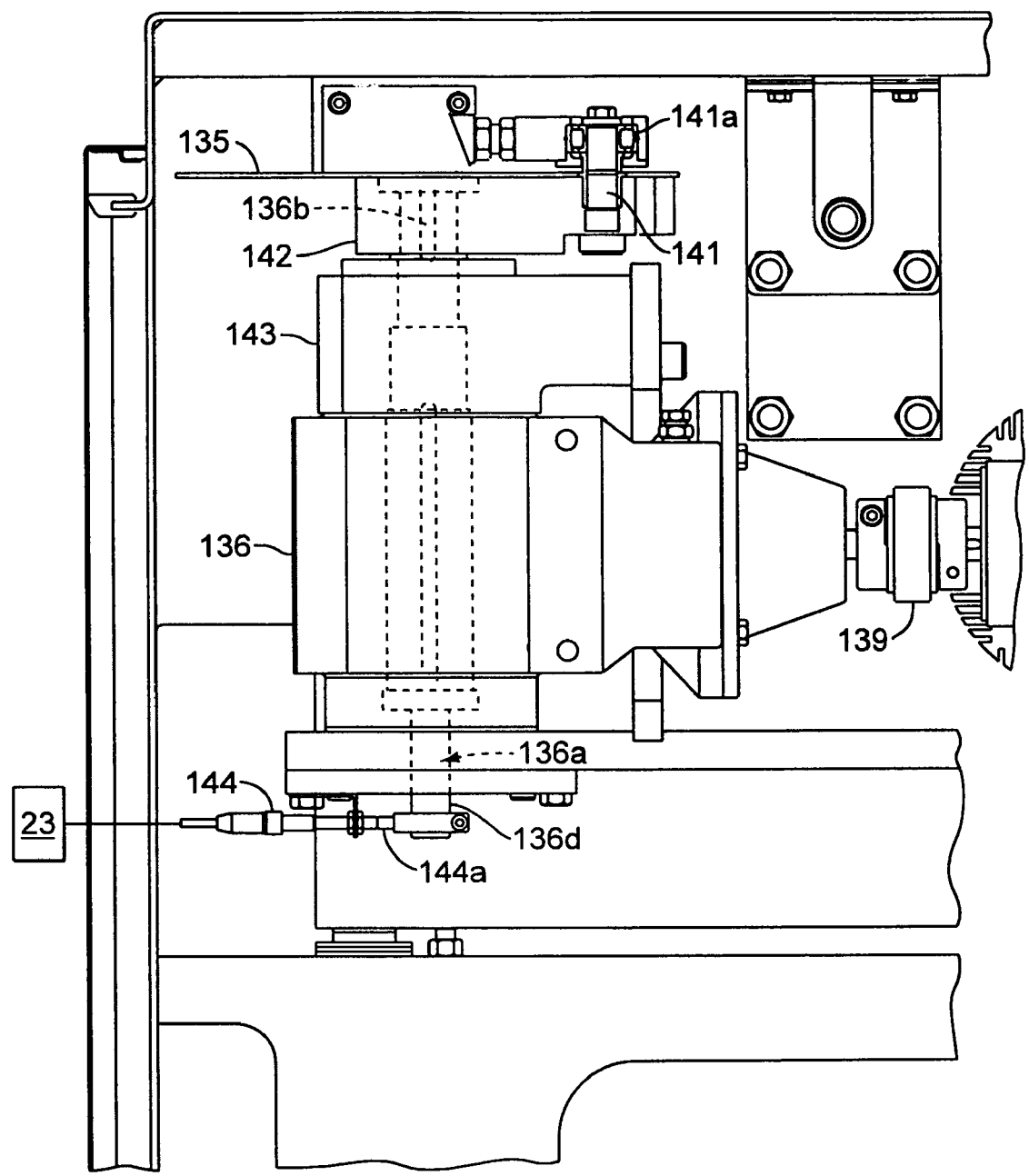
FIG. 29 is an enlarged, fragmentary sectional view taken generally along line 29-29 of FIG. 6, with some components and/or panels removed for clarity.

As best illustrated in FIGS. 3, 6, and 29 mold plate 32 is connected to drive rods 128 that extend alongside housing 71 and are connected at one end to a transverse bar 129. The other end of each drive rod 128 is pivotally connected to a connecting link 131 via a coupling plate 131a and a pivot connection 131c, shown in FIG. 26. The pivot connection 131c can include a bearing (not visible in the figures) surrounding a pin 131d within an apertured end 131e of the connecting link 131. The pin 131d includes a cap, or carries a threaded nut, on each opposite end to secure the crank arm to the coupling plate 131a.

Each drive rod 128 is carried within a guide tube 132 that is fixed between a wall 134 and a front bearing housing 133. The connecting links 131 are each pivotally connected to a crank arm 142 via a pin 141 that is journalled by a bearing 141a that is fit within an end portion of the connecting link 131. The pin crank arm 142 is fixed to, and rotates with, a circular guard plate 135. The pin 141 has a cap, or carries a threaded nut, on each opposite end that axially fixes the connecting link 131 to the crank arm 142 and the circular guard plate 135. The connecting link 131 also includes a threaded portion 131b to finely adjust the connecting link length.

The crank arms 142 are each driven by a right angle gear box 136 via a "T" gear box 137 having one input that is driven by a precise position controlled motor 138 and two outputs to the gearboxes 136. The "T" gear box 137 and the right angle gear boxes 136 are configured such that the crank arms 142 rotate in opposite directions at the same rotary speed.

The precise position controlled motor can be a 6-7.5 HP totally enclosed fan cooled servo motor. The servo motor is provided with two modules: a power amplifier that drives the servo motor, and a servo controller that communicates precise position information to the machine controller 23.

The controller 23 and the servo motor 138 are preferably configured such that the servo motor rotates in an opposite rotary direction every cycle, i.e., clockwise during one cycle, counterclockwise the next cycle, clockwise the next cycle, etc.

A bearing housing 143 is supported on each gearbox 136 and includes a rotary bearing 143a therein to journal an output shaft 136a of the gear box 136. The output shaft 136a is fixed to the crank arm 142 by a clamp arrangement formed by legs of the crank arm 142 that surround the output shaft and have fasteners that draw the legs together to clamp the output shaft between the legs (not shown), and a longitudinal key (not shown) fit into a keyway 136b on the output shaft and a corresponding keyway in the crank arm 142 (not shown).

A tie bar 139 is connected between the rods 128 to ensure a parallel reciprocation of the rods 128. As the crank arms 142 rotate in opposite rotational directions, the outward centrifugal force caused by the rotation of the crank arms 142 and the eccentric weight of the attached links 131 cancels, and separation force is taken up by tension in the tie bar 139.

One circular guard plate 135 is fastened on top of each crank arm 142. The pin 141 can act as a shear pin. If the mold plate should strike a hard obstruction, the shear pin can shear by force of the crank arm 142. The guard plate 135 prevents an end of the link 131 from dropping into the path of the crank arm 142.

The drive mechanism of the mold plate is easily reconfigured to change stroke length of different mold plates. For example, 6, 7, 8, 9, 10 or 11 inch stroke lengths are practically achievable with the apparatus by changing parts, such as the parts 131, 135, 142.

FIG. 29 illustrates a proximity sensor 144 in communication with the machine control. A target 144*a* is clamped onto an extension 136*d* of the rotating shaft 136*a*. The proximity sensor 144 communicates to the controller 23 that the crank arm 142 is at a particular rotary position corresponding to the mold plate 32 being at a preselected position. Preferably, the proximity sensor 144 can be arranged to signal to the controller that the crank arm 142 is in the most forward position, corresponding to the mold plate 32 being in the knockout position. The signal confirms to the controller that the knockout cups 33 can be safely lowered to discharge patties, without interfering with the mold plate 32.

During a molding operation, the molding mechanism 28 is assembled as shown in FIGS. 2 and 9A, with cover plate 122 tightly clamped onto spacers 124.

Figure 9B:
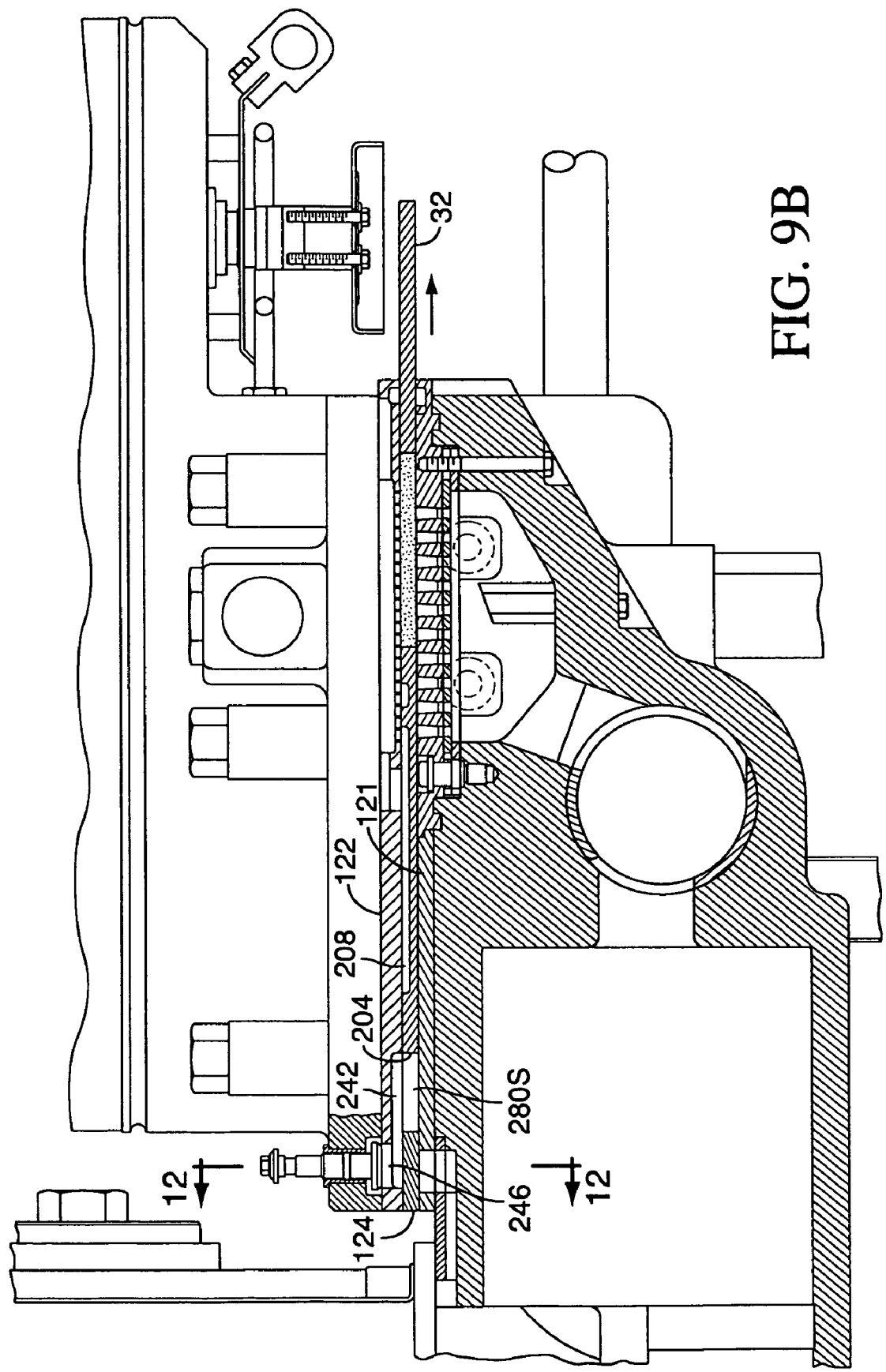
Figure 9C:
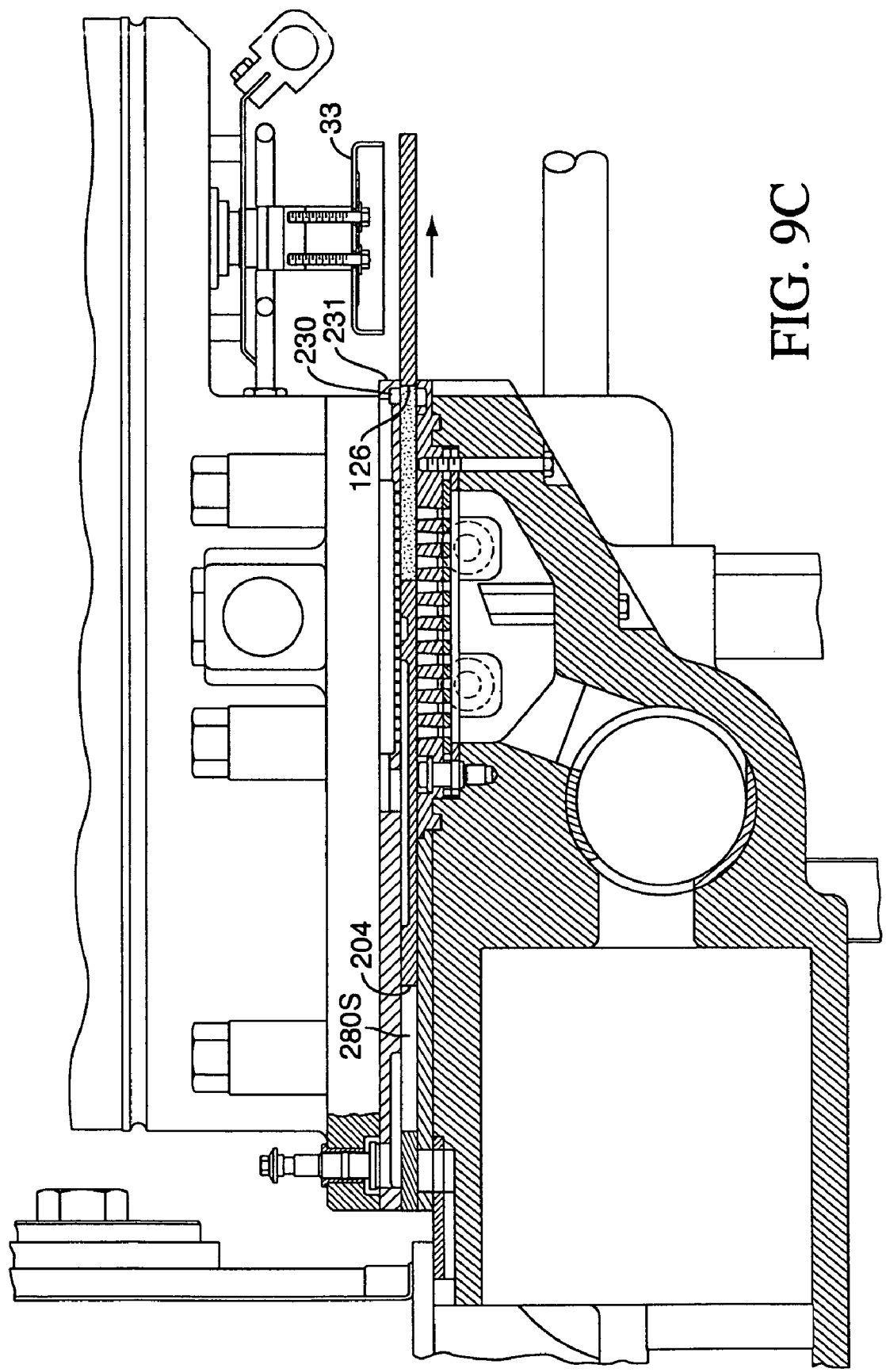
Figure 9D:
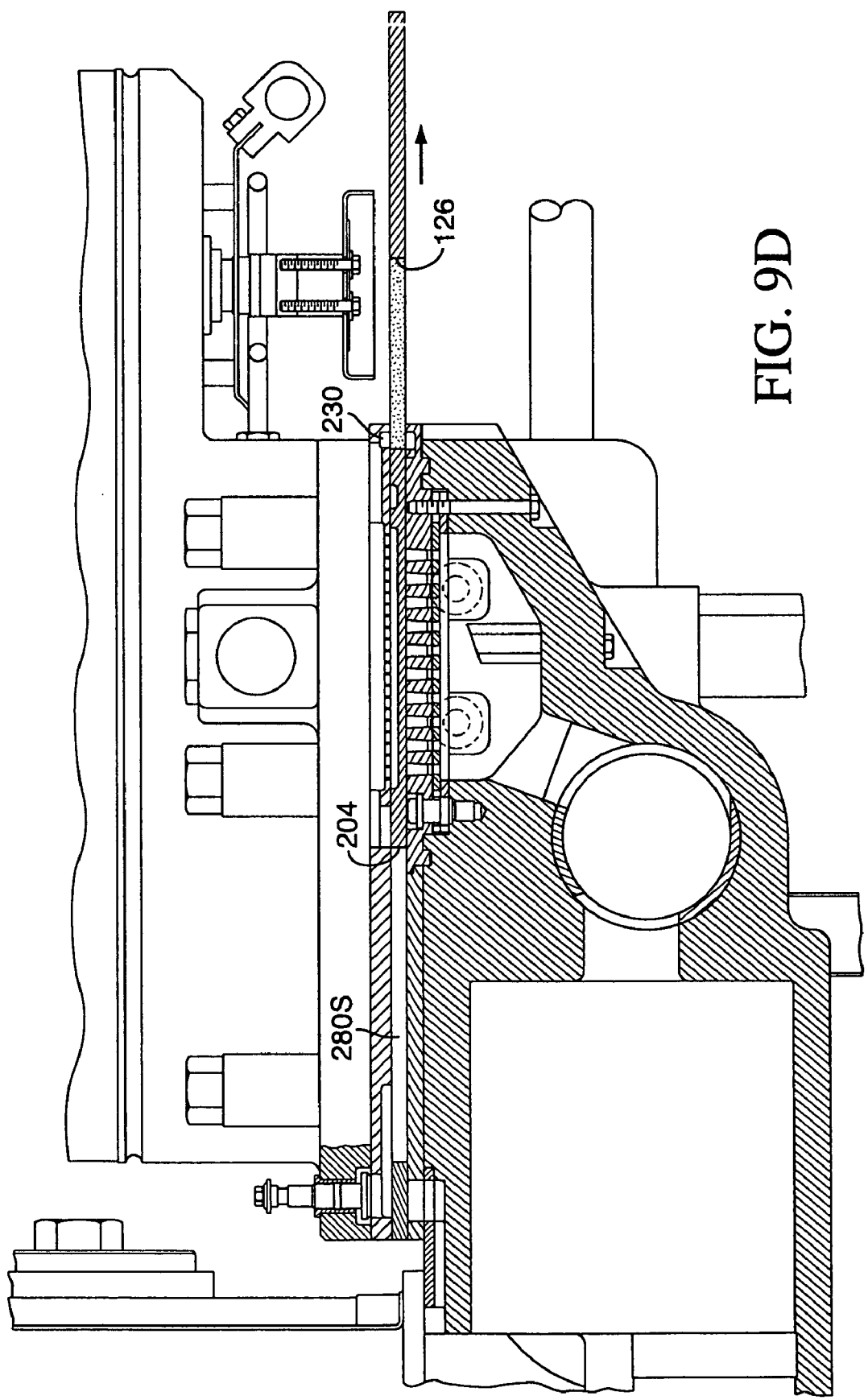
Figure 9E:
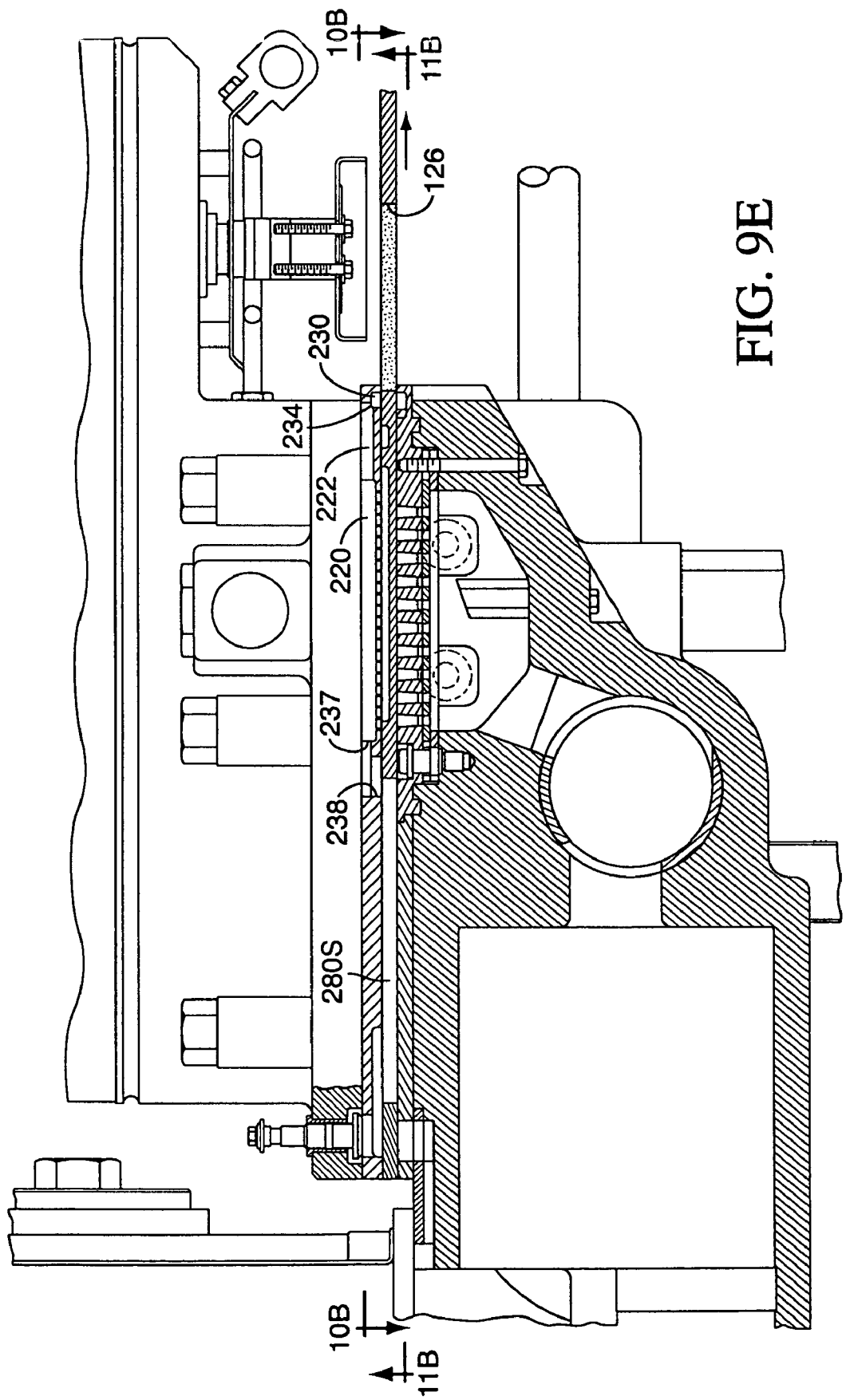
Figure 9F:
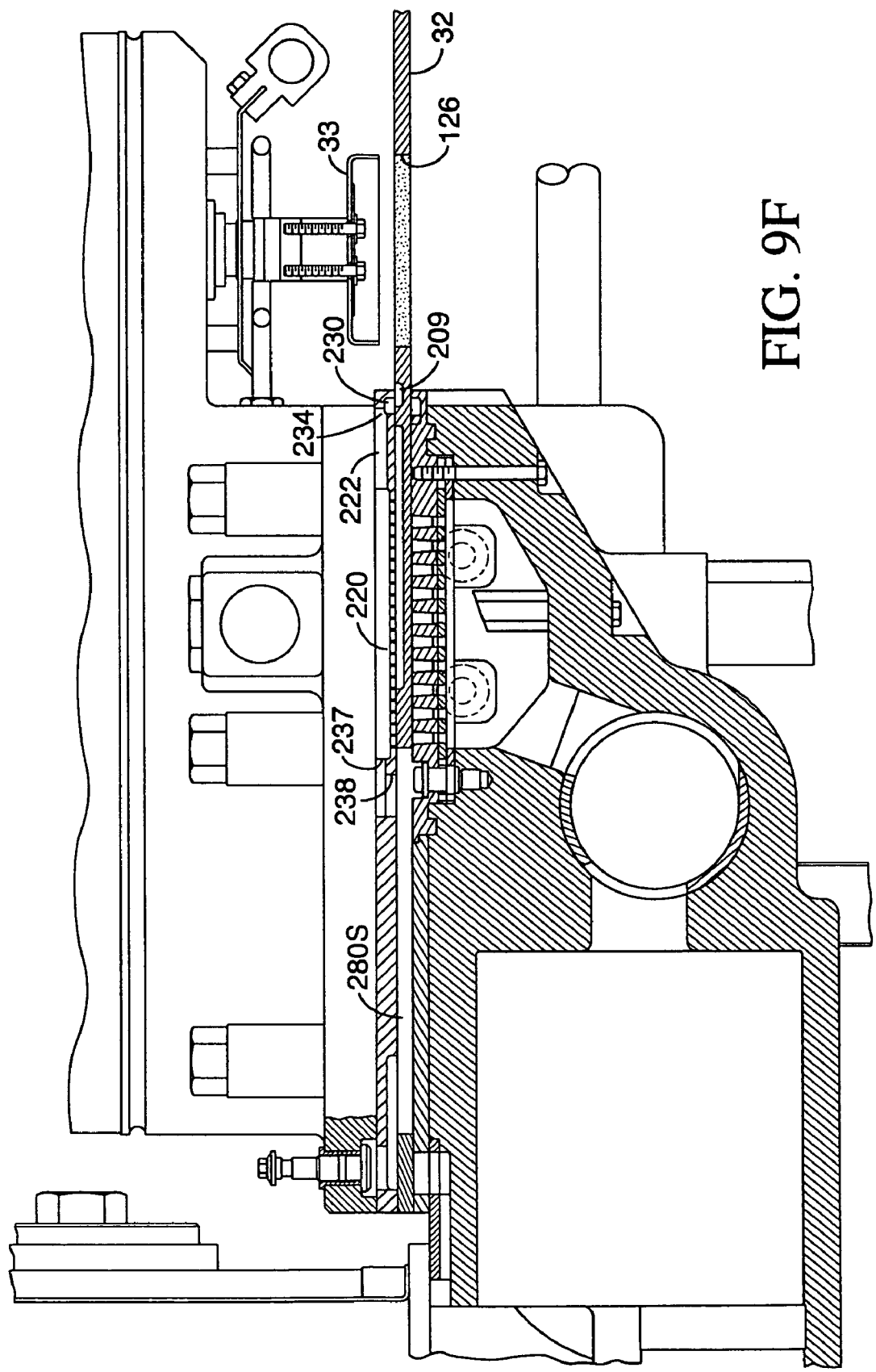

In each cycle of operation, knockout cups 33 are first withdrawn to the elevated position as shown in FIG. 9F. The drive for mold plate 32 then slides the mold plate from the full extended position to the mold filling position illustrated in FIGS. 2 and 9A, with the mold cavities 126 aligned with passageway 111.

During most of each cycle of operation of mold plate 32, the knockout mechanism remains in the elevated position, shown in FIG. 9A, with knockout cups 33 clear of mold plate 32. When mold plate 32 reaches its extended discharge position as shown in FIG. 9F the knockout cups 33 are driven downward to discharge the patties from the mold cavities.

The discharged patties may be picked up by the conveyor 29 or may be accumulated in a stacker. If desired, the discharged patties may be interleaved with paper, by an appropriate paper interleaving device. Such a device is disclosed in U.S. Pat. No. 3,952,478, or U.S. Ser. No. 60/540,022, filed on Jan. 27, 2004, both incorporated herein by reference. In fact, machine 20 may be used with a wide variety of secondary equipment, including steak folders, bird rollers, and other such equipment.

By using a servo motor to drive the mold plate, the mold plate motion can be precisely controlled. The motion can have a fully programmable dwell, fill time, and advance and retract speeds.

FIG. 30 illustrates one motion profile P1 for the movement of the mold plate 32 that is precisely controlled by the servomotor 138 and controller 23. The mold plate position (any point on the mold plate) is shown as a function of time between the most retracted position, the fill position, and the forward most extended position, the knockout position. The profile P1 of FIG. 30 shows a rather sharp turn around at the fill position, with little or no mold plate stopping, or dwell period. At the knockout position, there is a dwell period to allow the knockout cups to descend into the mold plate cavities to displace the formed patties from the cavities.

On the same graph a knockout cup movement profile P2 is depicted, wherein the knockout cups are lowered and raised during a segment of time t1 that is within the dwell period of the mold plate stopped in the knockout position.

FIG. 31 through 34 illustrate one cycle of different mold plate motion profiles that can be programmed by the controller 23 and the drive for the servomotor 138. The profile P3 in FIG. 31 is appropriate for a mold plate stroke speed of 100 cycles/minute and a knockout dwell period of 0.088 seconds. The profile P3 shows little or no filling dwell period; adequate filling can occur during retraction and/or advancement of the mold plate before and after the fill position. The profile would be for a food product material that is soft, easily flowable, and possibly warm.

FIG. 32 illustrates a profile P4 that is appropriate for a mold plate stroke speed of 100 cycles/minute and a cold, stiff or viscous product that requires a dwell period at the fill position to adequately fill the cavities.

FIG. 33 illustrates a profile P5 appropriate for easily flowable food product and a mold plate stroke speed of 120 cycles/minute.

FIG. 34 illustrates a profile P6 appropriate for viscous product that requires a dwell period at the fill position to adequately fill the cavities, and a mold plate stroke speed of 120 cycles/minute.

All of the profiles P3-P6 are for a 9 inch mold plate stroke length and allow for a 0.088 second knockout period. The different motion profiles for mold plate movements illustrated in FIG. 31-34 can be selected by an operator via the input screen 19 and the controller 23.

Drive Rod Lubricating Oil System

Figure 27:
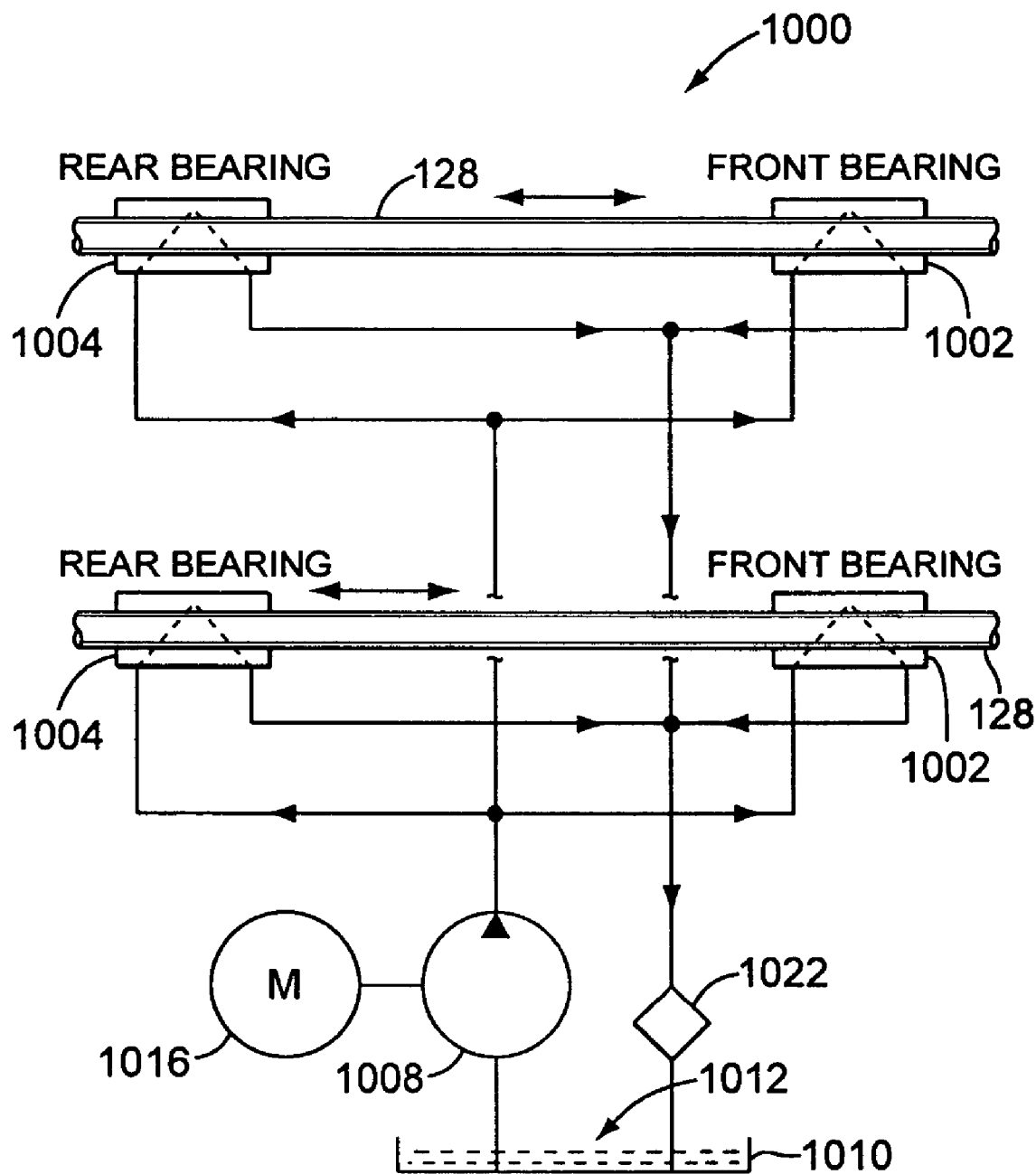
FIG. 27 is a diagrammatic view of a lube oil system of the invention.

FIG. 27 illustrates a mold drive rod lubricating system 1000 incorporated into the apparatus 20. The lubrication system 1000 includes front bearings 1002 and rear bearings 1002 for each drive rod 128. The location of the bearings is shown in FIG. 6.

A pump 1008 takes suction from reservoir 1010 holding lubricating oil 1012. A motor 1016 being either an electric, hydraulic, pneumatic or other type motor, drives the pump. The pump circulates lubricating oil through tubing and/or passages through the machine base area to the bearings 1002, 1004 and returns the lubricating oil through a filter 1022 to the reservoir. The pump, motor, reservoir and filter are all located within the machine base 21.

Figure 28:
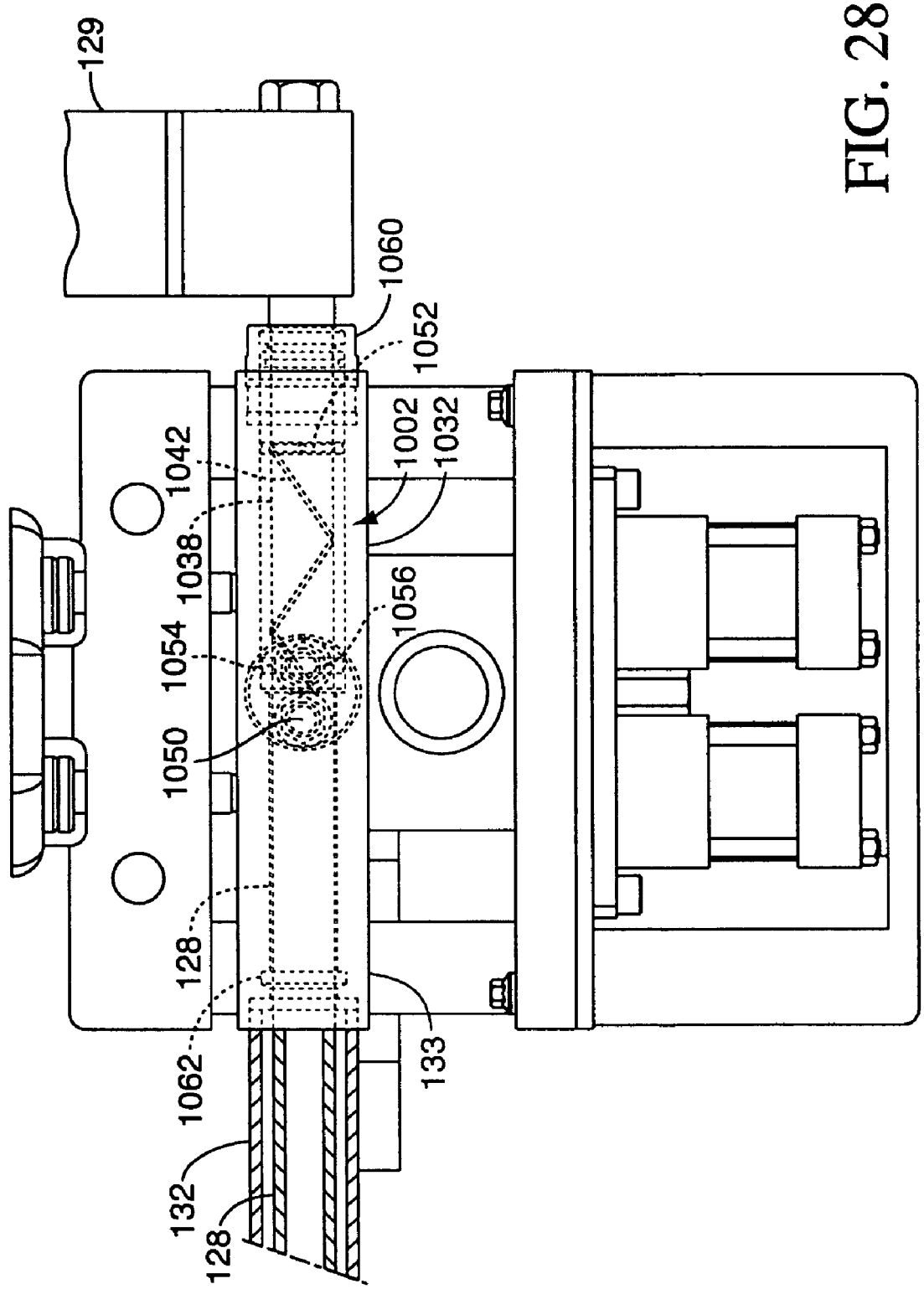
FIG. 28 is an enlarged, fragmentary sectional view taken from the right side of FIG. 6.

FIG. 28 illustrates a front bearing 1002. The other front bearing and the rear bearings 1004 are configured in substantially identical manner. The front bearing 1002 includes a housing 1032 having an internal bore 1036 for holding a sleeve bearing element 1038. The sleeve bearing element 1038 has an inside surface sized to guide the drive rod 128 and has a helical groove 1042 facing and surrounding the drive rod 128. An oil inlet port 1050 communicates lubricating oil into an open end of the helical groove. Lubricating oil proceeds through the helical groove to an opposite end of the bearing element 1038 to a first outlet groove 1052 in communication with a second outlet groove 1054 through a longitudinal channel (not shown). The second outlet groove 1054 is in communication with an outlet port 1056. The inlet port 1050 is in fluid communication with the pump 1008 and the outlet port 1056 is in fluid communication with the oil return lines to the filter 1022. A front seal 1060 and a rear seal 1062 retain oil within the housing 1032.

Knock Out System

Molding mechanism 28 further comprises a knockout apparatus 140 shown in FIGS. 2, 9A, 22, 23, and 35-36B. The knockout apparatus comprises the knockout cups 33, which are fixed to a carrier bar 145. Knockout cups 33 are coordinated in number and size to the mold cavities 126 in mold plate 32. One knockout cup 33 aligned with each mold cavity 126. The mold cavity size is somewhat greater than the size of an individual knockout cup.

The knockout apparatus 140 is configured to drive the carrier bar 145 in timed vertical reciprocation.

FIGS. 22, 23, and 35-36B illustrate the knockout apparatus 140 in more detail. The carrier bar 145 is fastened to knockout support brackets 146a, 146b. The knockout support brackets 146a, 146b are mounted to two knockout rods 147. Each knockout rod 147 penetrates through a sidewall of a housing 148 and is connected to a knockout beam 149.

The knockout beam 149 is pivotally mounted to a crank rod 151 that is pivotally connected to a fastener pin 156 that is eccentrically connected to a crank hub 155 that is driven by a motor 157.

The motor 157 is preferably a precise position controlled motor, such as a servo motor. An exemplary servomotor for this application is a 3000 RPM, 2.6 kW servo motor provided with a brake. The servo motor is provided with two modules: a power amplifier that drives the servo motor, and a servo controller that communicates precise position information to the machine controller 23.

The controller 23 and the motor 157 are preferably configured such that the motor rotates in an opposite direction every cycle, i.e., clockwise during one cycle, counterclockwise the next cycle, clockwise the next cycle, etc.

A heating element 160 surrounds, and is slightly elevated from the knockout carrier bar 145. A reflector 161 is mounted above the heating element 160. The heating element heats the knock out cups to a pre-selected temperature, which assists in preventing food product from sticking to the knock out cups.

Figure 22:
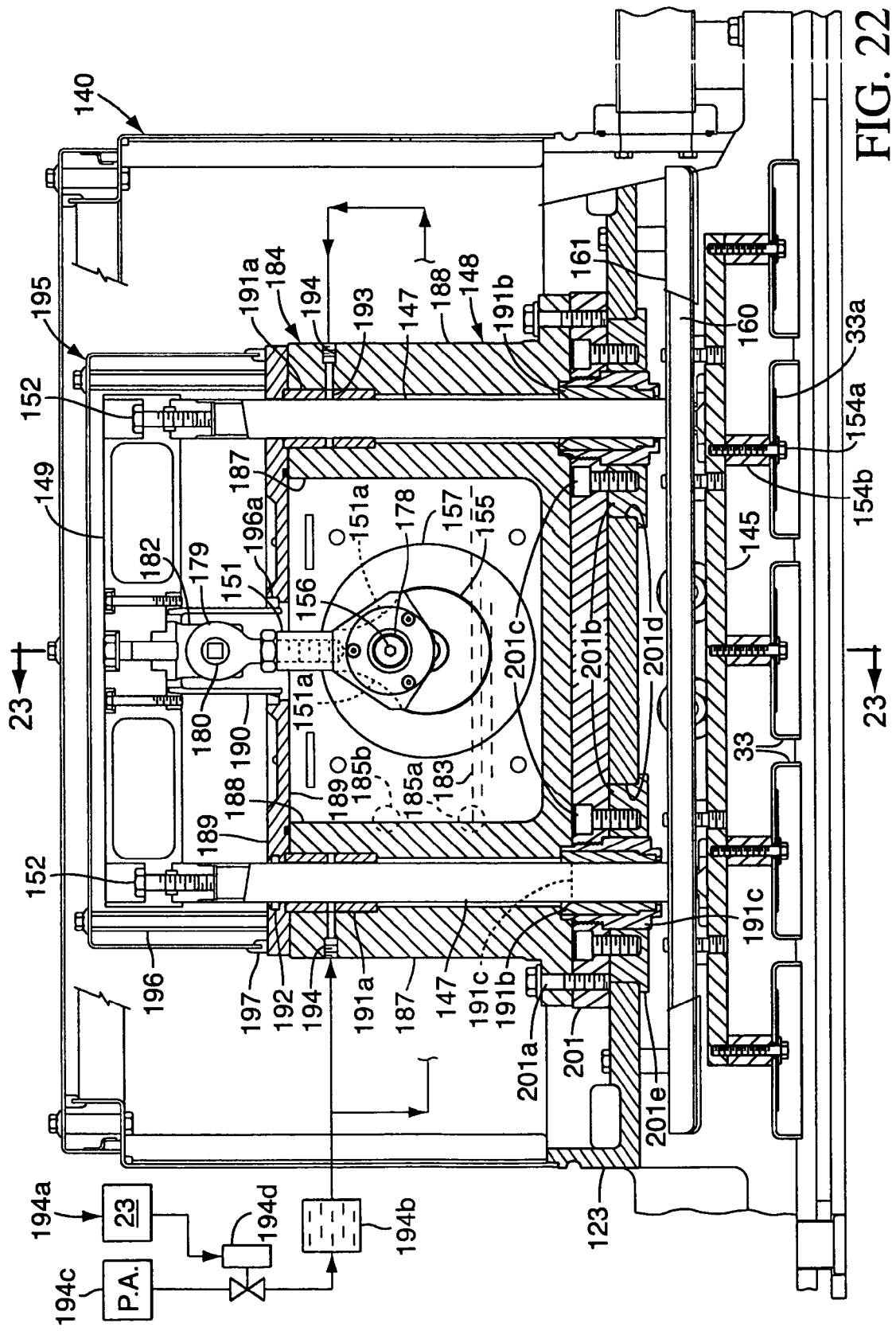
FIG. 22 is a fragmentary sectional view taken generally along line 22-22 of FIG. 2, with some components and/or panels removed for clarity.
Figure 23:
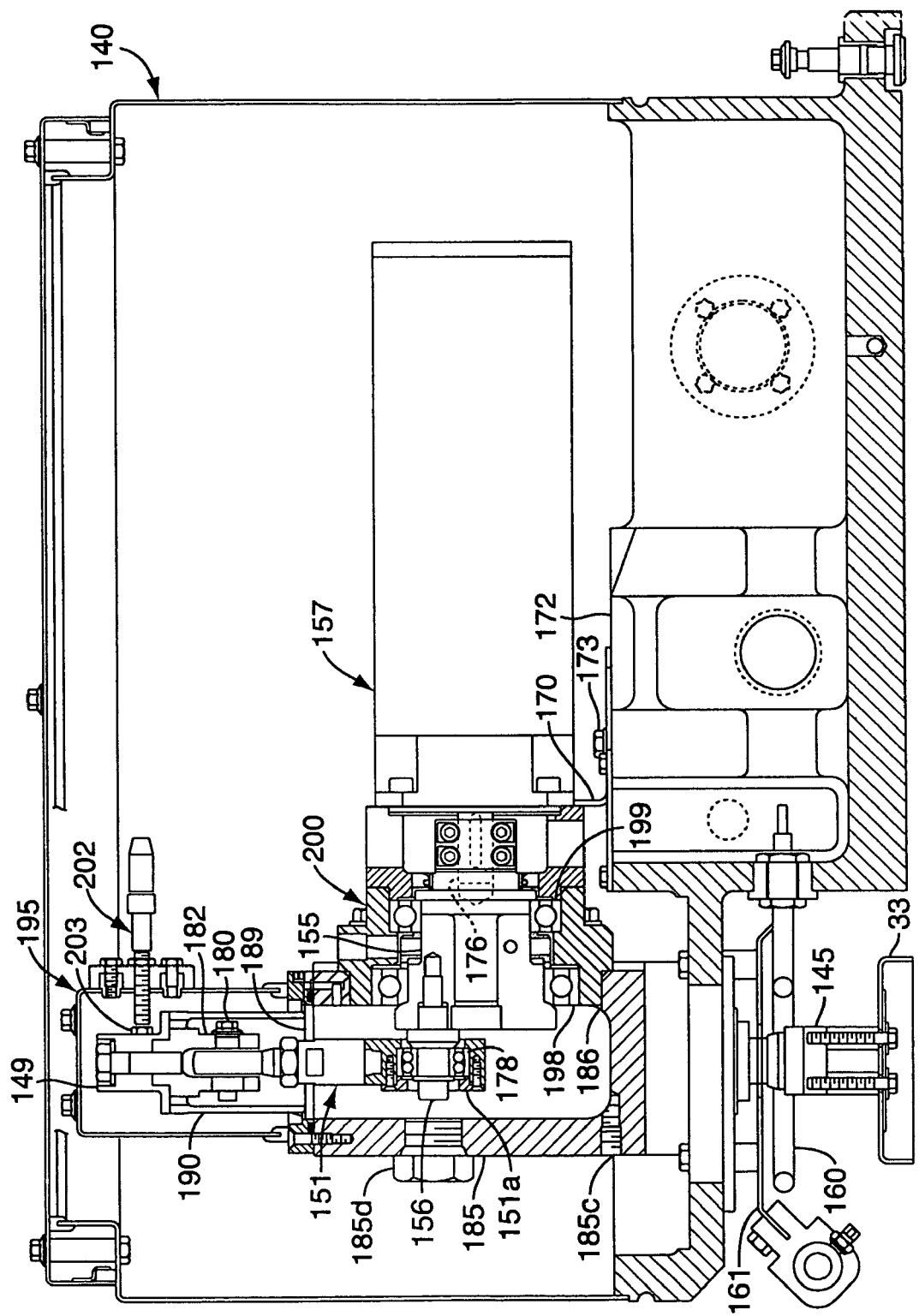
FIG. 23 is a fragmentary sectional view taken generally along line 23-23 of FIG. 22, with some components and/or panels removed for clarity.
Figure 35:
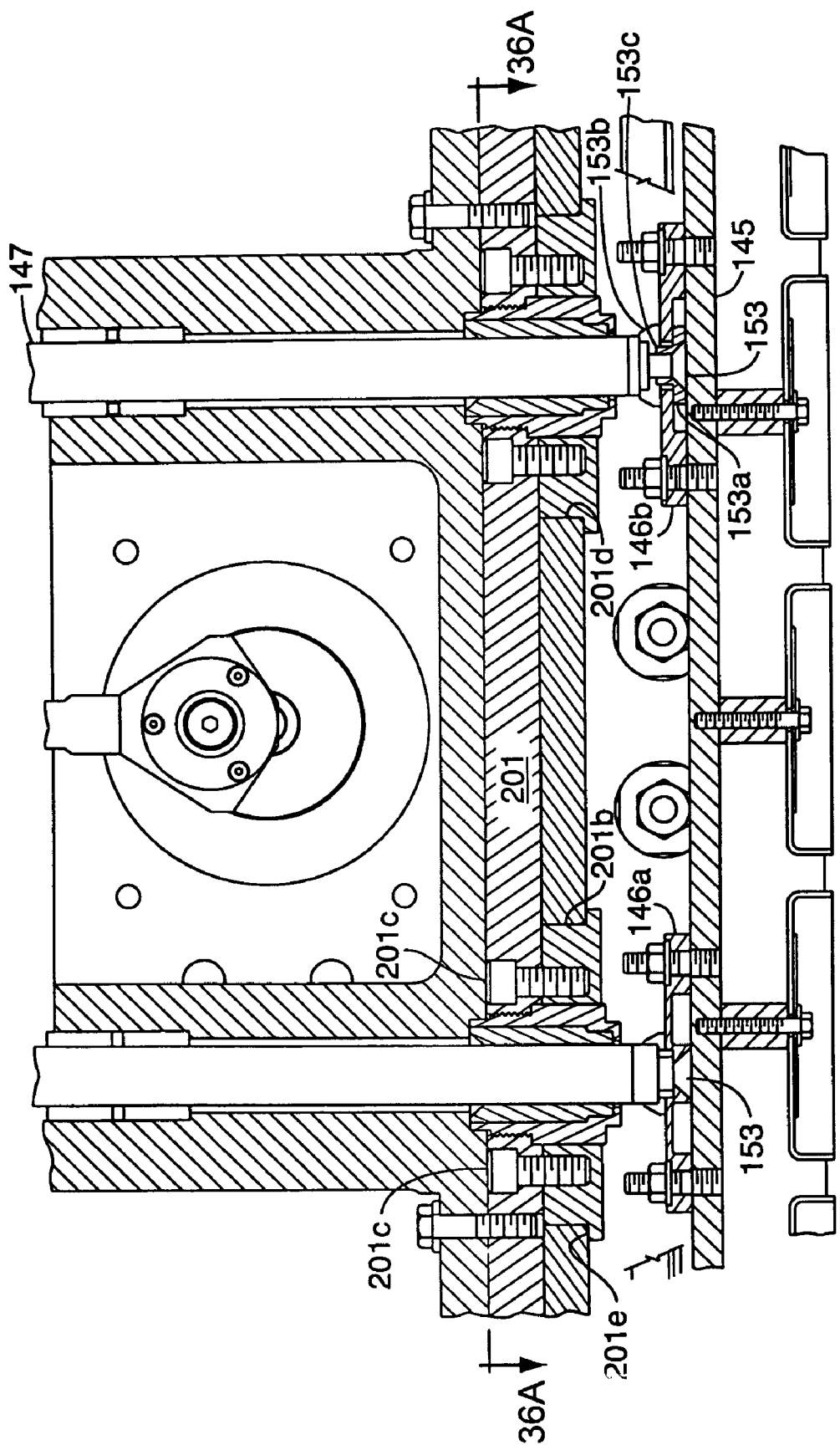
FIG. 35 is a fragmentary sectional view taken from FIG. 22, with some components removed for clarity.

In FIGS. 22, 23, and 35 the crank hub 155 is rotated into a position wherein the crank rod 151 is vertically oriented and the knockout beam 149 is lifted to its maximum elevation. The knockout rods are fastened to the knockout beam 149 by fasteners 152. The knockout support brackets 146a, 146b are in turn fastened to the knockout rods 147 by fasteners 153. Each knockout cup 33 is fastened to the knockout carrier bar by a pair of fasteners 154a and spacers 154b. An air flap or air check valve 33a can be provided within each cup to assist in dispensing of a meat patty from the cup 33.

As shown in FIG. 23, the motor 157 is supported by a bracket 170 from a frame member 172 that is mounted to the mold cover casting 123. The bracket 170 includes one or more slotted holes, elongated in the longitudinal direction (not shown). One or more fasteners 173 penetrate each slotted hole and adjustably fix the motor 157 to the frame member. The motor 157 includes an output shaft 176 that is keyed to a base end of the crank hub 155. The fastener pin 156 retains a roller bearing 178 thereon to provide a low friction rotary connection between an annular base end 151a of the crank rod 151 and the pin 156.

The crank rod 151 has an apertured end portion 179 on an upper distal end 151b opposite the base end 151a. The apertured end portion 179 is held by a fastener pin assembly 180 through its aperture to a yoke 182. The yoke 182 is fastened to the knockout beam 149 using fasteners. The crank rod 151 is length adjustable. The fastener pin assembly 180 can include a roller or sleeve bearing (not shown) in like fashion as that used with the fastener pin 156 to provide a reduced friction pivot connection.

The housing 148 is a substantially sealed housing that provides an oil bath. Preferably, the housing walls and floor is formed as a cast aluminum part. The crank hub 155, the pin 156, roller bearing 178, the apertured end portion 179, the fastener pin 180 and the yoke 182 are all contained within the oil bath having an oil level 183. The limits of the oil bath are defined by a housing 184 having a front wall 185, a rear wall 186, side walls 187,188, a top wall 189 and a sleeve 190. The sleeve 190 is a square tube that surrounds a substantial portion of the crank rod 151 and is sealed around its perimeter to the top wall 189 by a seal element 196a. The sleeve 190 is connected to the beam 149 and penetrates below the top wall 189. As the yoke 182 reciprocates vertically, the beam 149 and the sleeve 190 reciprocate vertically, the sleeve 190 maintaining a sealed integrity of the oil bath.

The crank rod 151 includes side dished areas 151a that act to scoop and propel oil upward during rotation of the hub 155 to lubricate the pin 180 and surrounding areas.

The knockout rods 147 are guided to reciprocate through the side walls 187,188, particularly, through upper and lower bearings 191a, 191b. The rods 147 are sealed to the top wall by seals 192. The bearings 191a can include an internal groove 193 that is in flow-communication with a lubricant supply through port 194.

A lubricant system 194a is provided to provide lubricant to the bearings 191a, 191b. The system 194a includes a lubricant reservoir 194b that is filled with lubricant, such as oil, and connected to plant air 194c via an electronically controlled valve 194d. The machine controller 23 periodically, according to a preset routine, actuates the valve 194d to propel some lubricant into the bearings 191a. Lubricant can run down the knockout rod 147 into a dished top 191c of the lower bearings 191b to allow oil to penetrate between the knockout rods 147 and the lower bearings 191b.

An outer cover 195 is fastened and sealed around the side walls 187, 188 and front and rear walls 185, 186 by fasteners, spacers 196 and a seal 197. Any lubricating oil that passes through the seal can be returned to the oil bath via dished out drain areas and drain ports through the top wall.

The front wall 185 includes an oil level sight glass 185a, a fill port 185b (shown dashed in FIG. 22), a drain port 185c (FIG. 23); and an access hole closed by a screw 185d (FIG. 23).

The crank hub 155 is journaled for rotation by two roller bearings 198, 199. The roller bearings 198, 199 are supported by a collar assembly 200 bolted to the rear wall 186 and to the motor 157.

The housing 148 is fastened to a support plate 201 by fasteners 201a. The support plate 201 is fastened to circular adapter plates 201b by fasteners 201c. The circular adapter plates 201b are removably fit into circular holes 201d in the casting 123. The circular adapter plates 201b include a bottom flange 201e which abuts the casting 123. The circular adapter plates 201b surround the bearings 191b and associated bearing assembly 191c.

As shown in FIG. 35, the left bracket 146a is fixedly connected to the left knockout rod 147 using the fastener 153 while the right bracket 146b is connected for a sliding connection. In this regard the right fastener 153 passes through an inverted T-nut 153a that passes through the bracket 146b and fits into a back up washer 153b that abuts the top side of the bracket 146b. The bracket 146b includes an oversized opening in the lateral direction that allows the bracket 146b to shift laterally with respect to the T-nut and knockout rod 147. This arrangement allows the bar 145 to expand and contract laterally with respect to the knockout rods 147. When the knockout cups 33 are heated by the heating element 160, the carrier bar 145 can become heated as well. Preferably, the carrier bar 145 is composed of aluminum which can expand to a significant degree. The sliding connection of the bracket 146b accommodates this thermal expansion.

The knockout assembly is changeable to extend further forwardly to minimize knockout cup cantilever and stress in supporting members. This is accomplished by loosening the bracket 170 from the frame member 172 and sliding the motor 157 and the connected parts forward or rearward and replacing the circular adapter plates that guide the knockout rods 147.

Figure 36A:
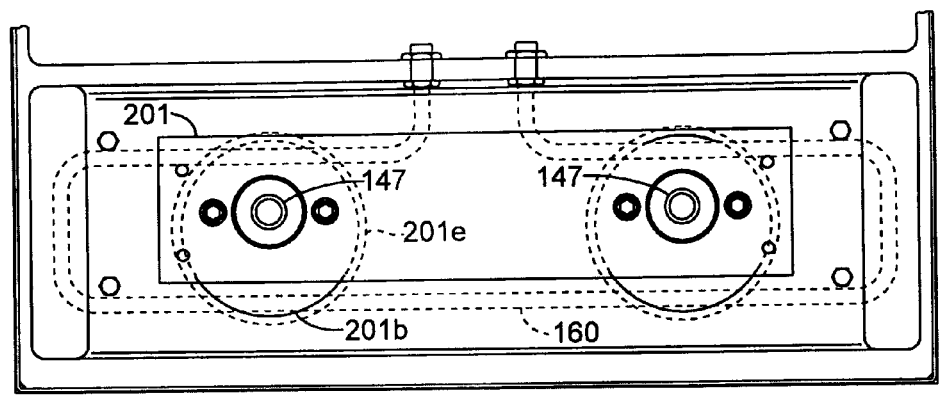
FIG. 36A is a fragmentary sectional view taken generally along line 36A-36A of FIG. 35 showing the knockout apparatus in a rear position, with some panels and/or components removed for clarity.
Figure 36B:
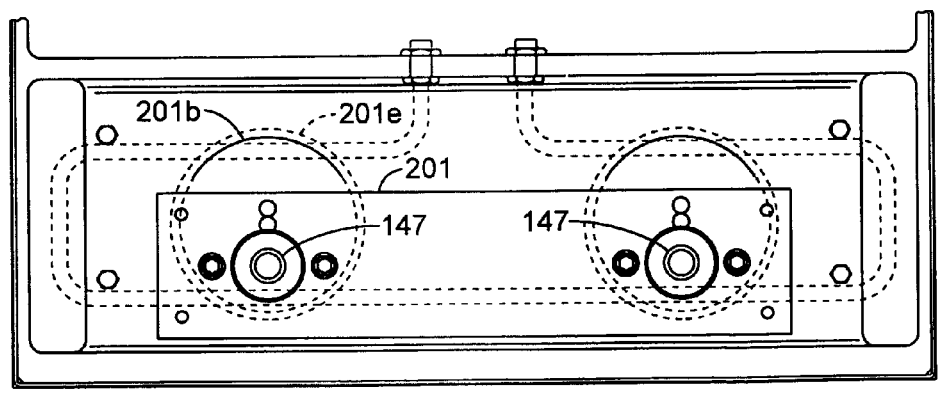
FIG. 36B is a sectional view similar to FIG. 36A showing the knockout apparatus in a forward position.

As demonstrated in FIGS. 36A and 36B, to change the longitudinal position of the knockout cups 33, the support plate 201 is shifted longitudinally. Replacement circular adapter plates 201bb are fit into the casting 123 from below. The replacement circular adapter plates 201bb include different hole patterns for the knockout rods 147, forwardly or rearwardly shifted, to accommodate the new position of the support plate 201.

A proximity sensor 202 is bolted to the outer cover 195, and a target 203 is provided on the crank beam 149 to be sensed by the proximity sensor 202. The proximity sensor 202 communicates to the controller 23 that the knockout cups are raised and the mold plate can be retracted without interfering with the knockout cups.

The movement of the knock out cups is fully programmable for different motion profiles, including dwell, accelerations and extend and retract speeds. Such motion profiles may be useful depending on the properties of the food product to be discharged from the mold plate cavities. Because both the mold plate and the knock out cups can be driven by programmably controlled servo motors, they can be flexibly sequenced without being restricted in motion by a common mechanical system.

Auxiliary Pump System for Air and Fines from the Breather System

FIGS. 9A through 19 illustrate another aspect of the invention. According to this aspect, the mold plate 32 includes two ends, a forward end 202 and a rearward end 204. The cavities 126 are located at a central position between the ends 202, 204. Elongated connection recesses 208 are located at a rearward position, near the rearward end 204. Relief recesses 209 are located between the connection recesses 208 and the cavities 126. In FIG. 9A the mold plate 32 is in a fill position, fully retracted toward the rear. The cover plate or breather plate 122 includes breather holes 216 that are in air communication with the cavities 126 while the mold plate is in the fill position.

The holes 216 are in communication with a top side air channel in the form of a dished region 220 of the cover plate 122. The dished region 220 includes branch regions 222 that extend forwardly. The branch regions 222 are in air communication with an antilip channel 230 open on a bottom side of the cover plate 122, through narrow apertures 234.

On a rearward portion of the dished region 220 are recesses 237 that are in communication with through holes 238 that extend through the thickness of the cover plate 122. In the mold plate position of FIG. 9A, the through holes 238 are open into the elongated connection recesses 208.

On a rearward portion of the cover plate 122 is a bottom side recess 242 that is in communication with an overhead valve passage 246 that can be closed by action of a valve 250, particularly by action of a valve element 252 of the valve 250. The valve element 252 is in the open position as shown in FIG. 9A. The valve element is movable within a valve chamber 258 formed into a bottom side of the mold cover 123.

The valve chamber 258 extends laterally and is flow connected to two through bores 264, 266 that each extend through the cover plate 122, the spacer 124, the top plate 121, and an insert plate 270 fit on a recess 272 of the pump casing 71. The recess 272 is open into the pump inlet 39.

In the position shown in FIG. 9A, the cavities are filled through a plurality of fill apertures or slots 121b through fill plate 121a (see FIG. 41 as an example of fill apertures) fastened to the manifold housing 71. The mold plate 32 is beginning its forward travel, driven by the drive rods 128 via the link 129. The valve element 252 is up; the valve 250 is open.

As illustrated in FIG. 9B, when the connection recess 208 is no longer in communication with the bottom side recess 242, the moving end 204 of the plate 32 creates a suction chamber 280S formed between the spacer 124, the end 204, the breather plate 122 and the top plate 121. The element 252 is drawn down by the suction to close the valve passage 246.

In the position of the mold plate shown in FIG. 9C, the cavities 126 have moved into a position to be relieved in pressure by the antilip slot 230, any expansion of the patties is cut as the patties pass under the antilip bar 231. Further suction is drawn in the chamber 280 by movement of the end 204.

As shown in FIG. 9D, maximum suction is developed at this point in the chamber 280S by movement of the end 204.

As shown in FIG. 9E, the end 204 has passed under the through hole 238. The suction chamber 280 draws air and meat fines from the chambers and recesses 230, 234, 222, 220, 237, 238 into the suction chamber 280S.

FIG. 9F illustrates the mold plate 32 in its discharge position. The relief recesses 209 open the antilip channel 230 to outside air. Outside air flushes through the series of recesses and other passages identified as 209, 230, 234, 222, 220, 237, and 238 and into the suction chamber 280S under influence of a vacuum present in the suction chamber 280S. The pressure in the suction chamber 280S and the connected chambers and passages 238, 237, 220, 222, 234, 230 is increased to atmospheric pressure. The valve element 252 is then elevated and the valve 250 is then open.

Figure 9G:
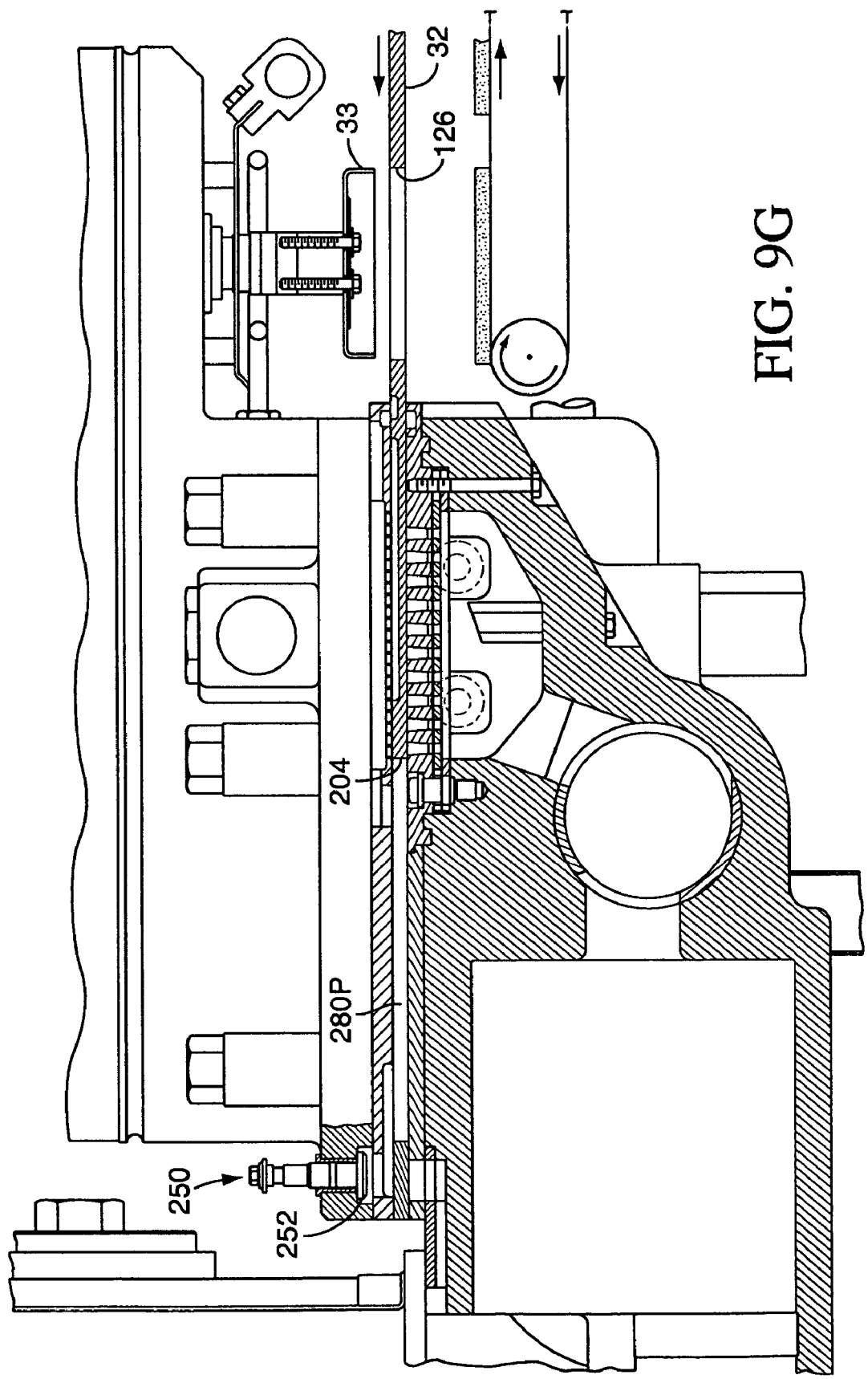

FIG. 9G illustrates the patty has been discharged by downward movement of the cup 33, which subsequently has been elevated. The patty has been deposited onto the conveyor. The mold plate 32 begins a rearward movement. The suction chamber 280 now becomes a compression or pump chamber 280P. Any air or meat fines drawn into the suction chamber 280S can now be transported by positive pressure or pumping action of the pump chamber 280P through the open valve 250 and into the pump inlet 39 as now described.

FIG. 9H illustrates that for a brief time during the return stroke of the mold plate, the mold plate moved a small amount to the left of the position shown in FIG. 9H, the moving end 204 will pump air rearward through the pump chamber 280P and forward through the passages 238, 237, 220, 222, 234, 230, 126 to atmosphere. However the latter forward path is more restrictive than the rearward path so little flows in this direction. Most air and fines are pumped through the chamber 280P, through the recess 242, through the valve passage 246, through the recess 258, through the bores 264 and 266, through the recess 272 and into the pump inlet 39.

Figure 9I:
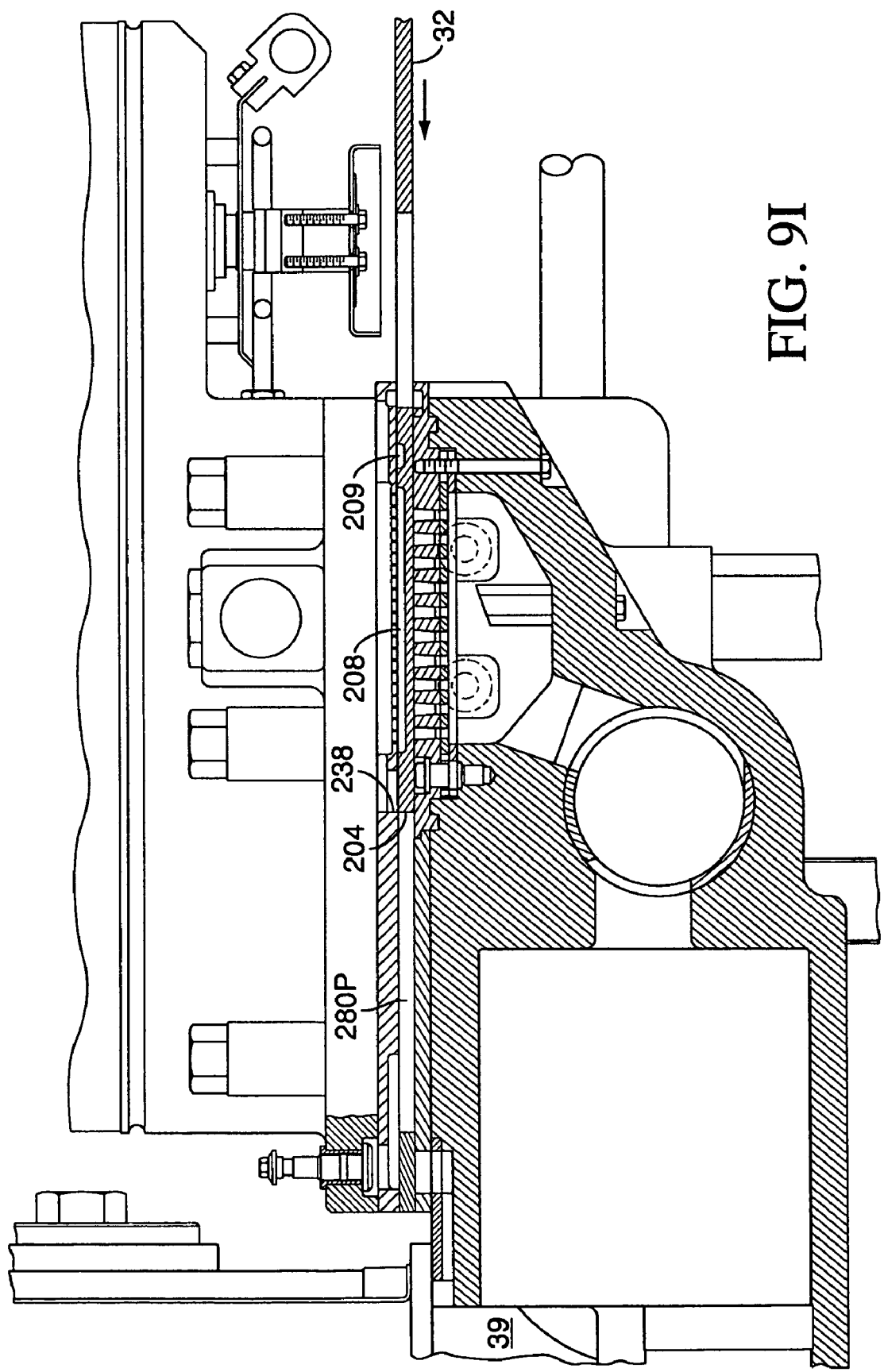

FIG. 9I illustrates that the end 204 has passed the passage 238 and thus all of the air and fines in the pump chamber 280P must pass rearward toward the pump inlet 39.

Figure 9J:
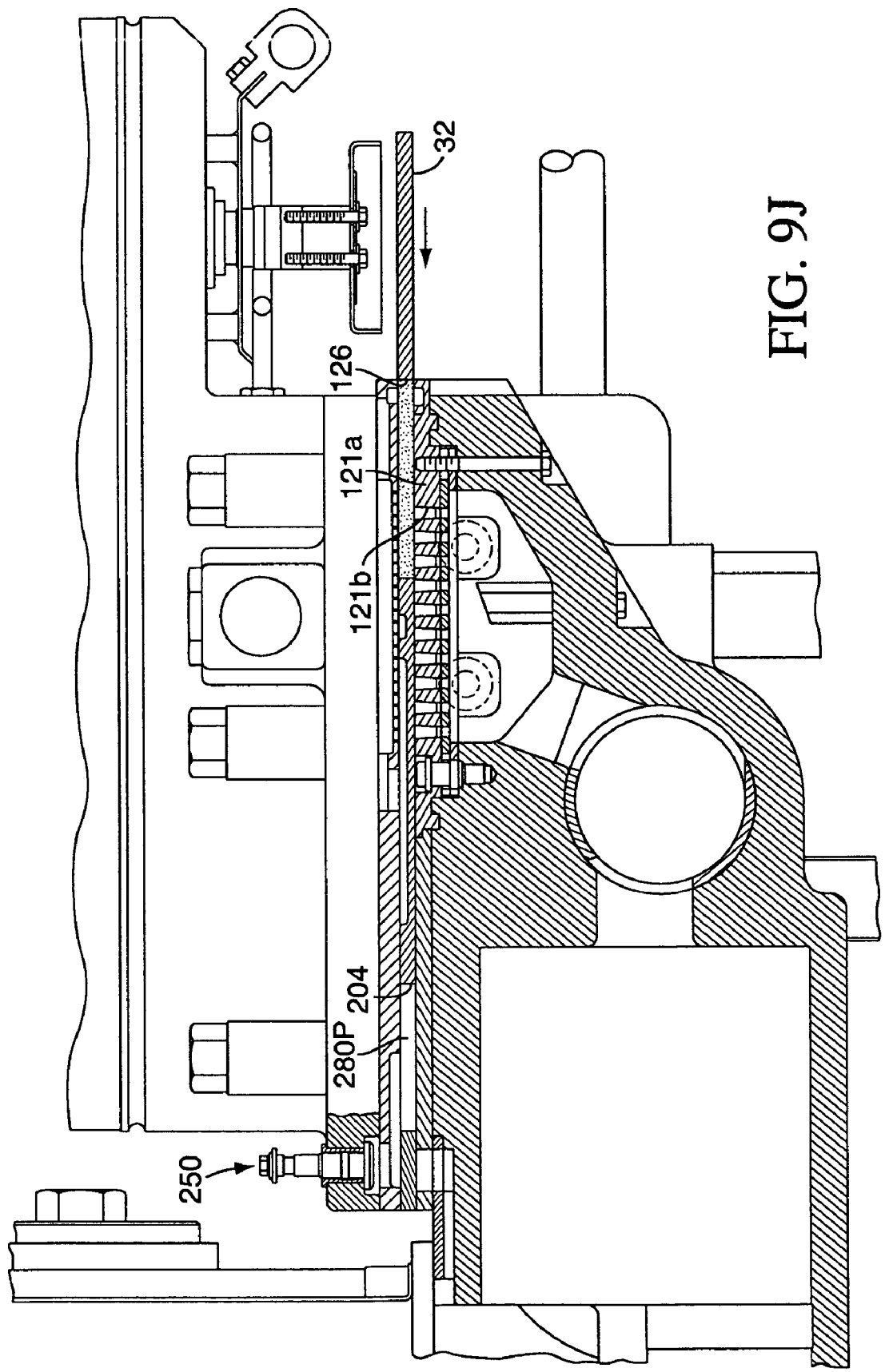

FIG. 9J illustrates the cavities 126 become open to the fill slots 121b of the fill plate 121a wherein the cavities begin to fill with meat under pressure. The pump chamber is continuously reduced in volume as the end 204 proceeds rearward. The valve 250 is still open.

Figure 9K:
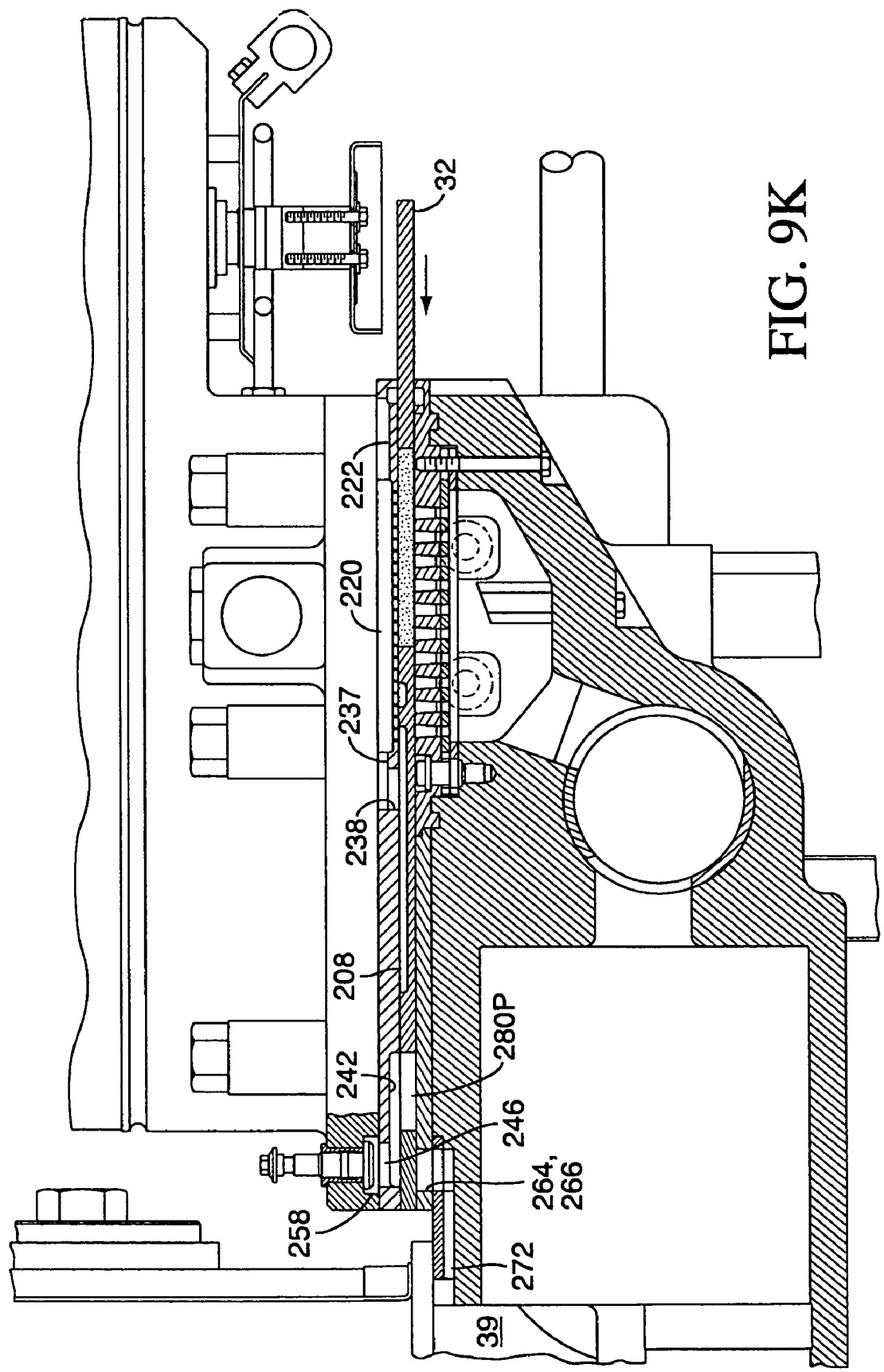
Figure 10A:
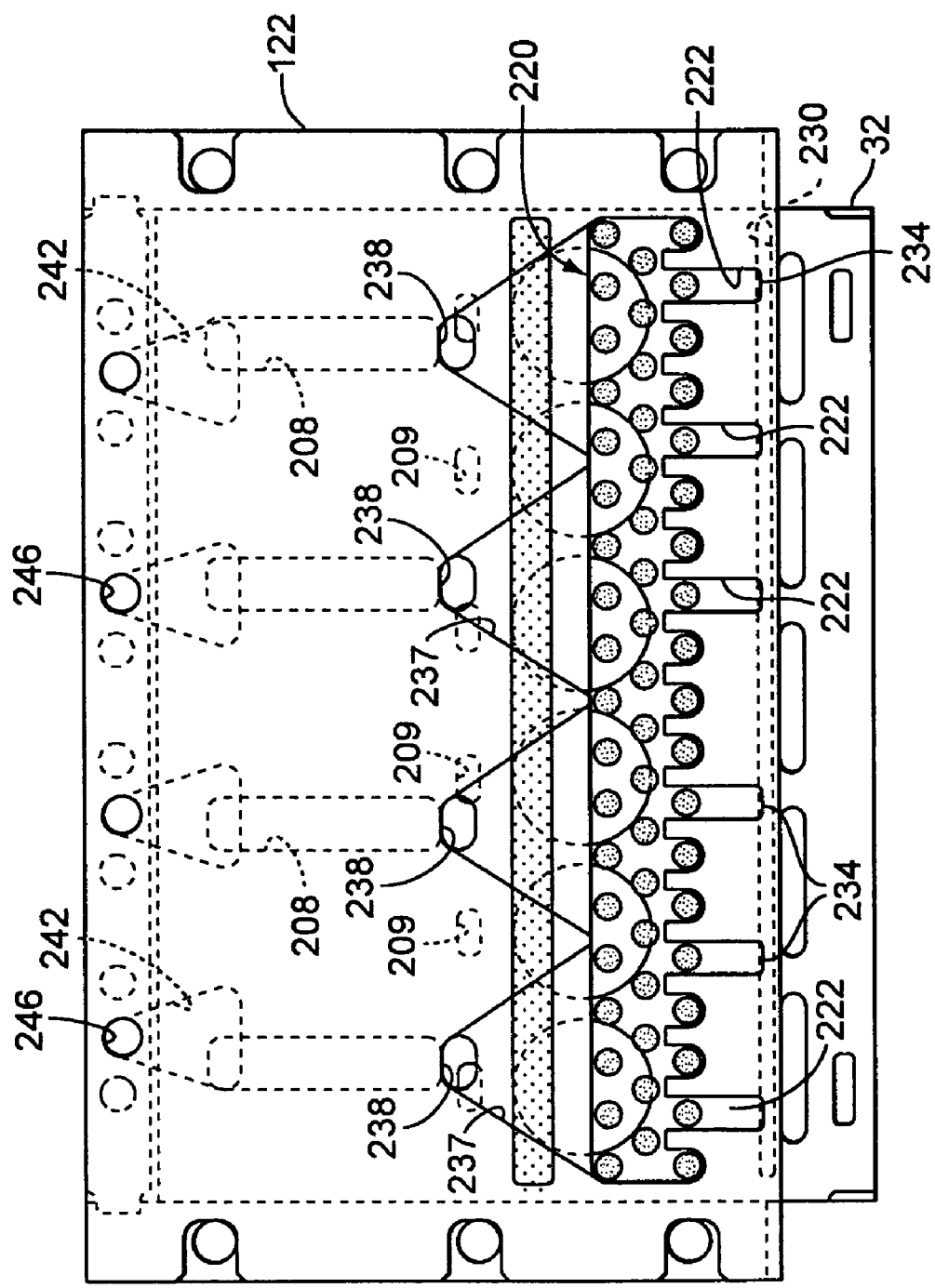
FIG. 10A is a fragmentary sectional view taken generally along line 10A-10A of FIG. 9A, with some components and/or panels removed for clarity.
Figure 10B:
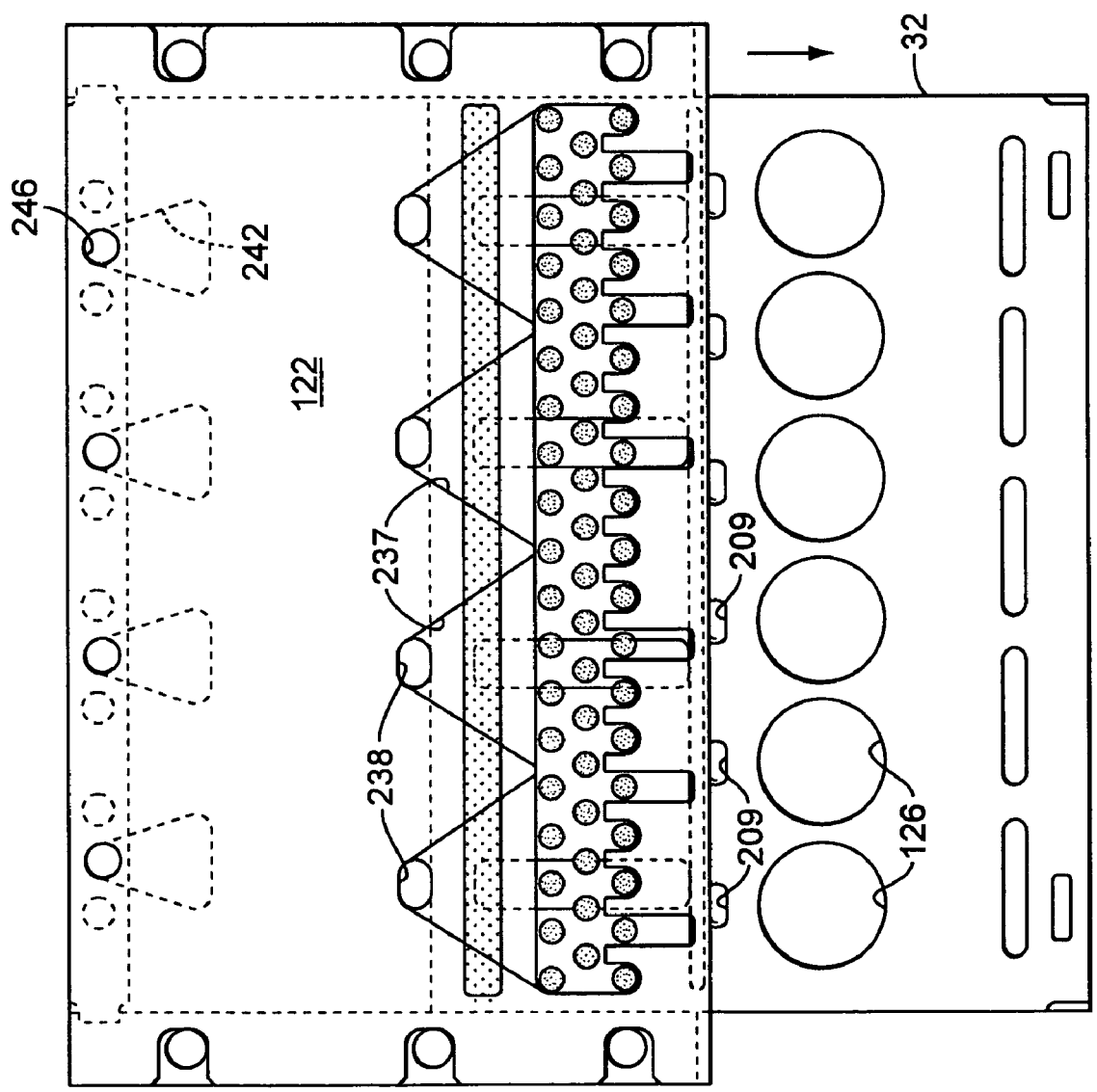
FIG. 10B is a fragmentary sectional view taken generally along line 10B-10B of FIG. 9E, with some components and/or panels removed for clarity.
Figure 11A:
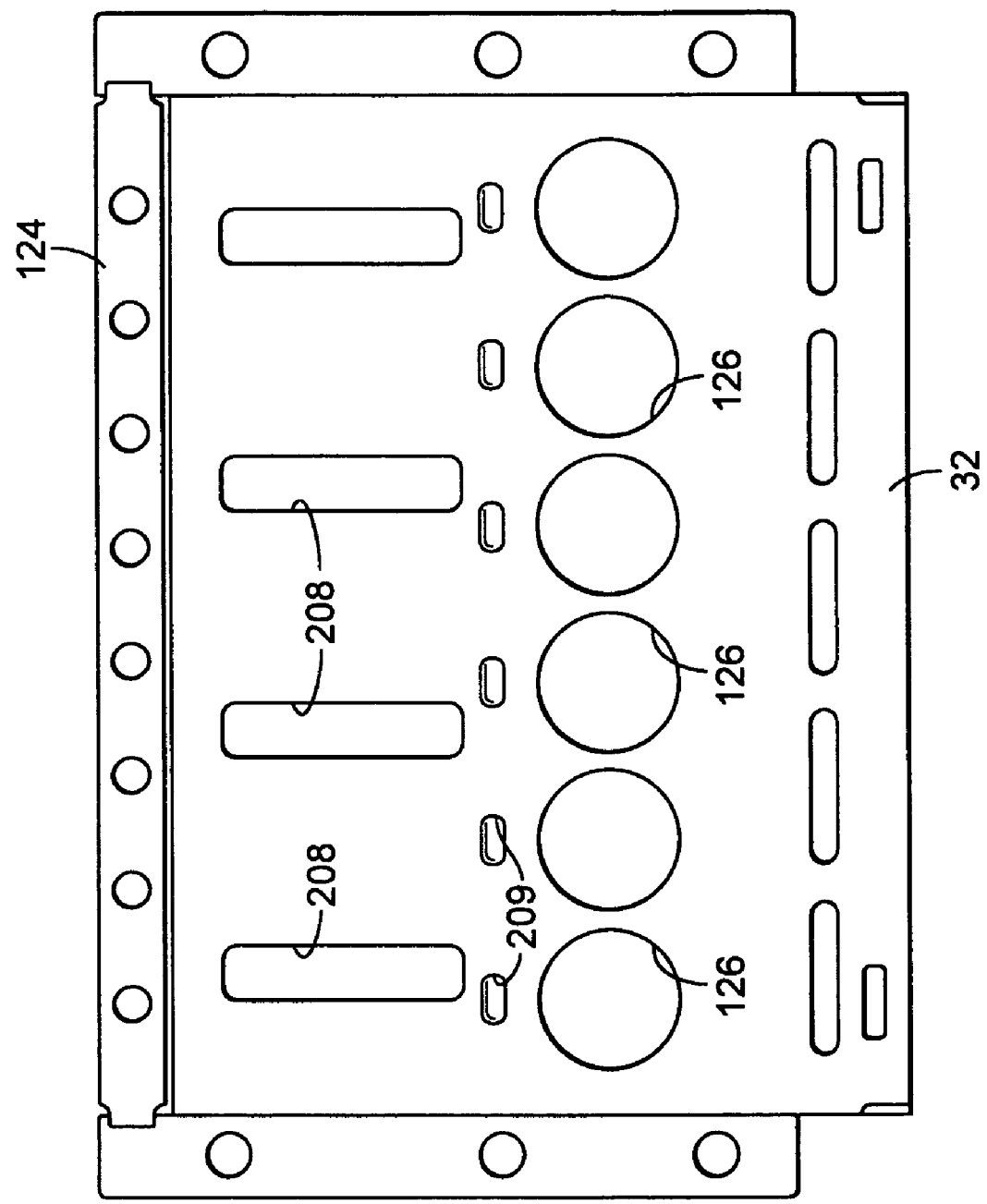
FIG. 11A is a fragmentary sectional view taken generally along line 11A-11A of FIG. 9A, with some components and/or panels removed for clarity.
Figure 11B:
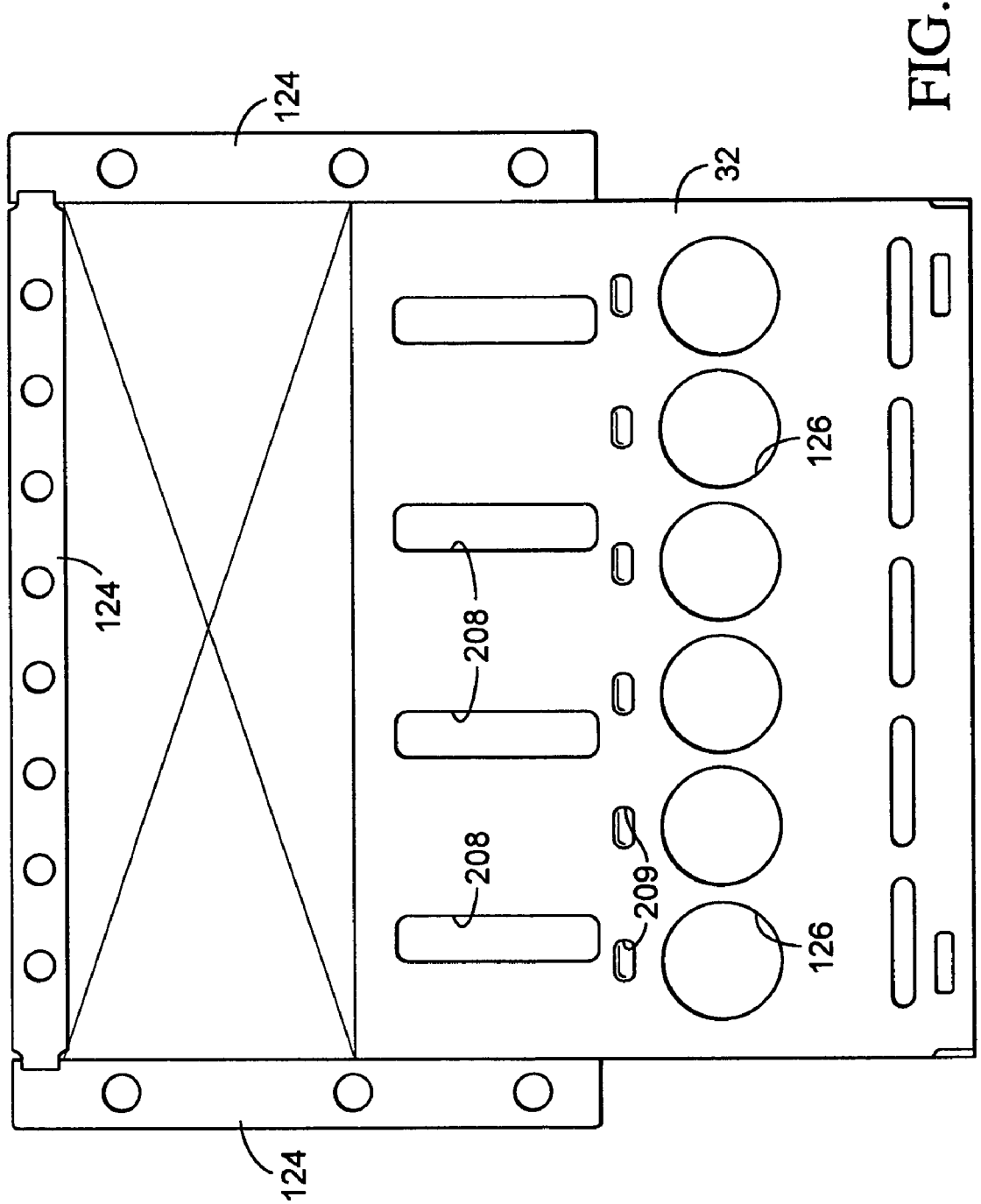
FIG. 11B is a fragmentary sectional view taken generally along line 11B-11B of FIG. 9E, with some components and/or panels removed for clarity.

FIG. 9K illustrates a late stage of movement of the mold plate 32. The cavities 126 are continuing to be filled. The meat, under pressure forces air and meat fines through the apertures 216 into the chambers 220, 222, 237, 238, 208. The valve 250 remains open wherein the mold plate reaches the position of FIG. 9A, the air and meat fines can exit the chambers 220, 222, 237, 238, 208 by virtue of the recess 208 being in air flow communication with the recess 242 and the passages 246, 258, 264, 266, 272 and 39.

Figure 13:
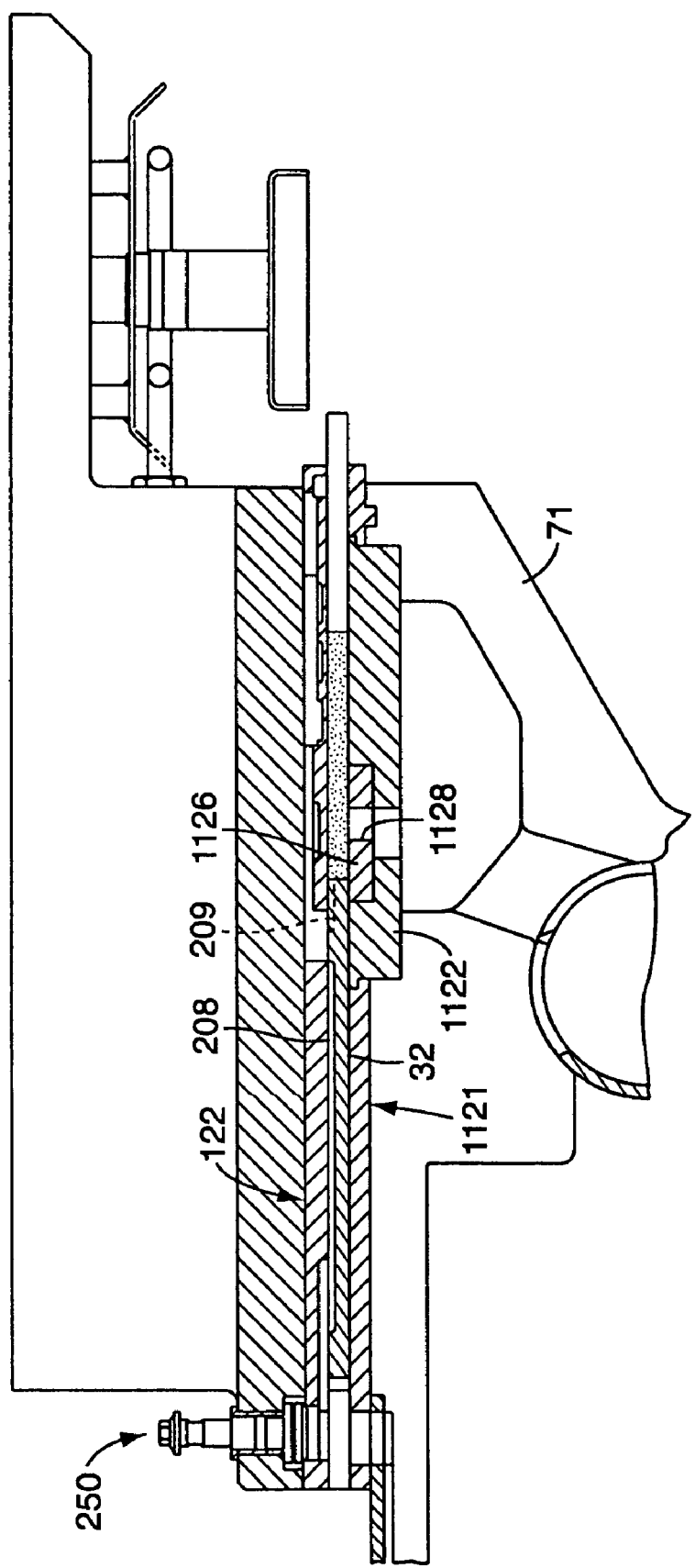
FIG. 13 is an enlarged fragmentary sectional view similar to FIG. 9A but having an alternate fill arrangement.

FIG. 13 illustrates the mold plate 32 and the breather plate 122 arranged above an alternate support plate 1121 having a fill plate 1122 fastened thereto and to the manifold housing 71. The fill plate 1122 mounts an insert plate 1126 that has a fill slot 1128 therethrough. The slot can be continuous or intermittent (corresponding to the location of the cavities) across a width of the cavity pattern.

Figure 14:
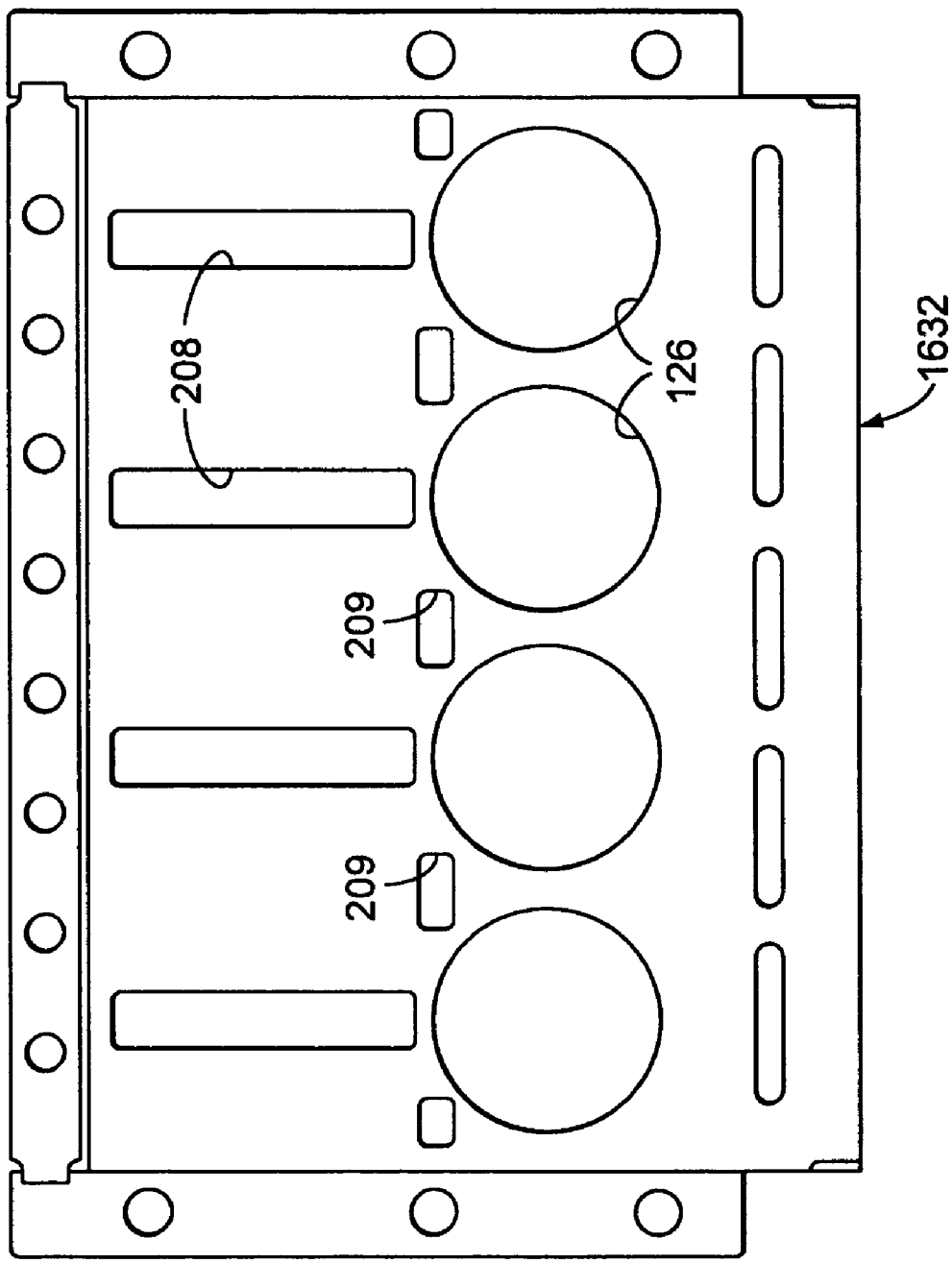
FIG. 14 is an enlarged fragmentary sectional view similar to FIG. 11A but having an alternate mold plate.
Figure 15:
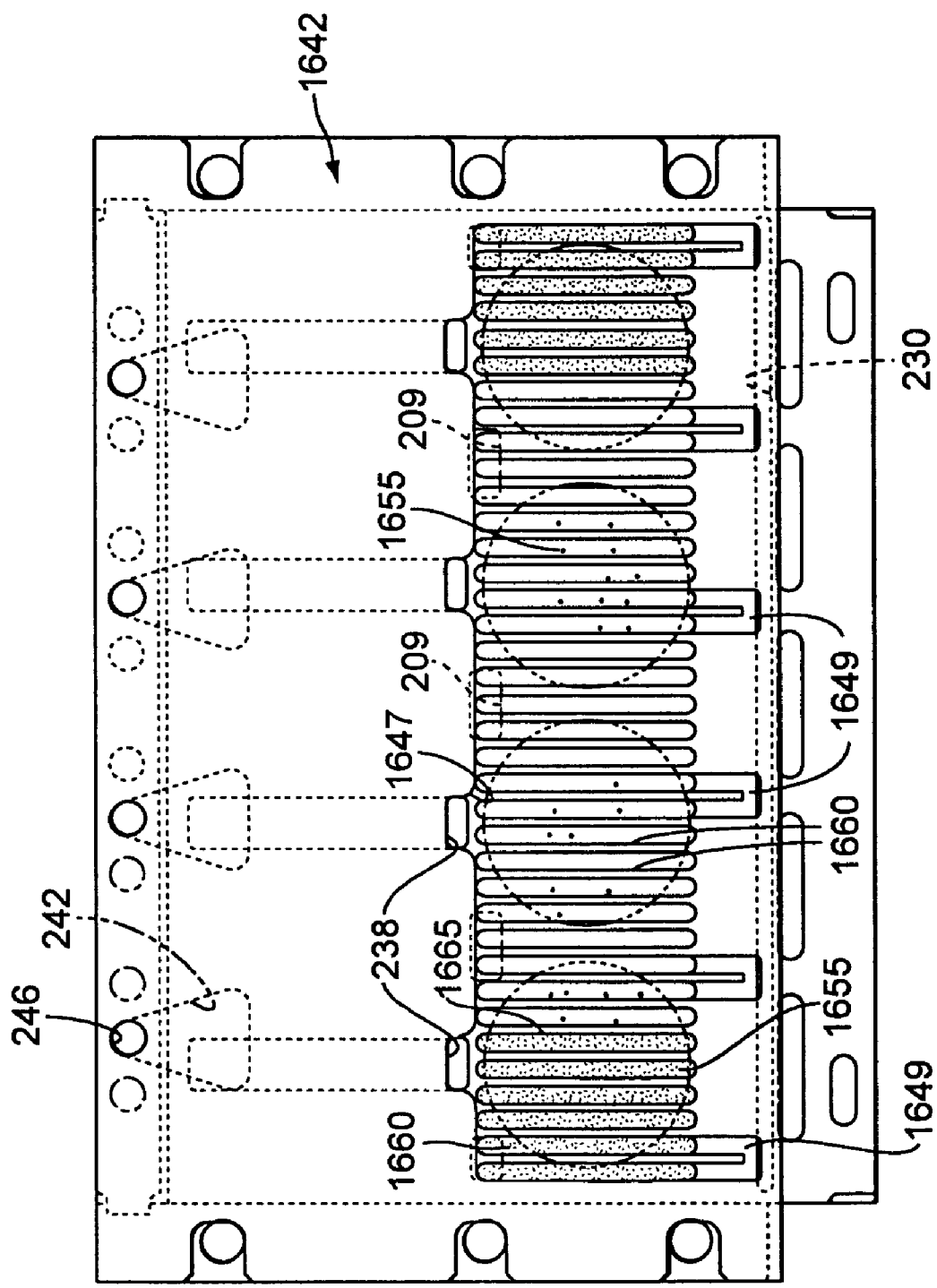
FIG. 15 is an enlarged fragmentary sectional view similar to FIG. 10A but illustrating the mold plate of FIG. 14 beneath an alternate breather plate, with some components and/or panels removed for clarity.

FIGS. 14 and 15 illustrate an alternate mold plate 1632 having four cavities 126 in a row and arranged below an alternate breather plate 1642. The alternate breather plate 1642 includes an alternate recess arrangement 1647, but which functions similarly to the recess 237, and alternate branch regions 1649, but which functions similarly to the branch regions 222. Breather holes 1655 (not all of them shown) are located within elongated dished areas 1660, which are in communication with the recesses 1647.

Although a single row of cavities is shown in the mold plate 32 in FIGS. 10A-11B, 14 and 15, it is encompassed by the invention to provide multiple rows of cavities, in straight or staggered columns, such as described in U.S. Pat. Nos. 6,454,559; 6,517,340; 4,872,241; 6,572,360; and/or 3,747,160; or international patent publications WO 01/41575 and/or WO 02/102166, all herein incorporated by reference.

Figure 16:
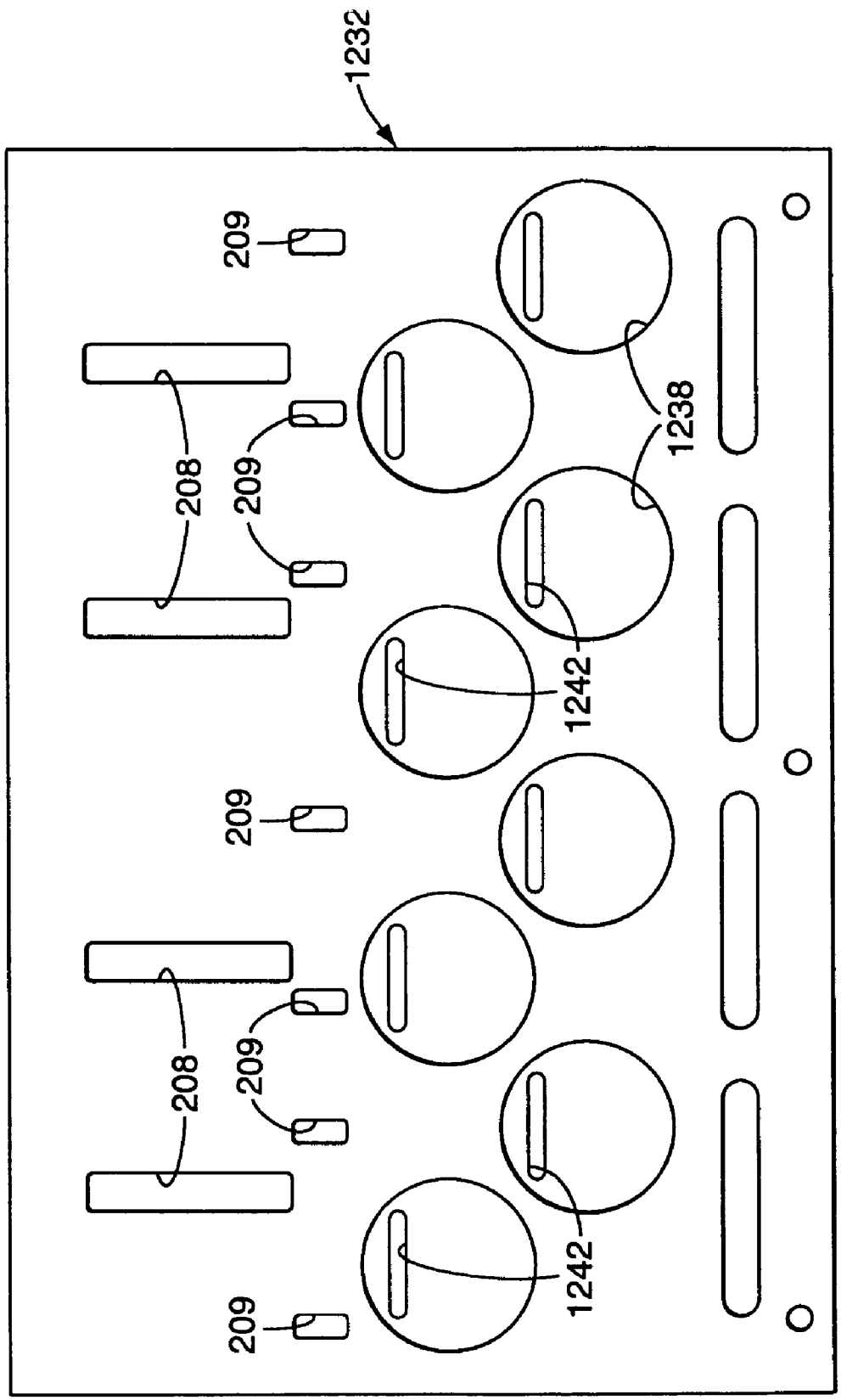
FIGS. 16-18 illustrate alternate mold plates with superimposed fill slots or openings, the mold plates usable with the systems of FIGS. 9A-9K or FIG. 13.
Figure 17:
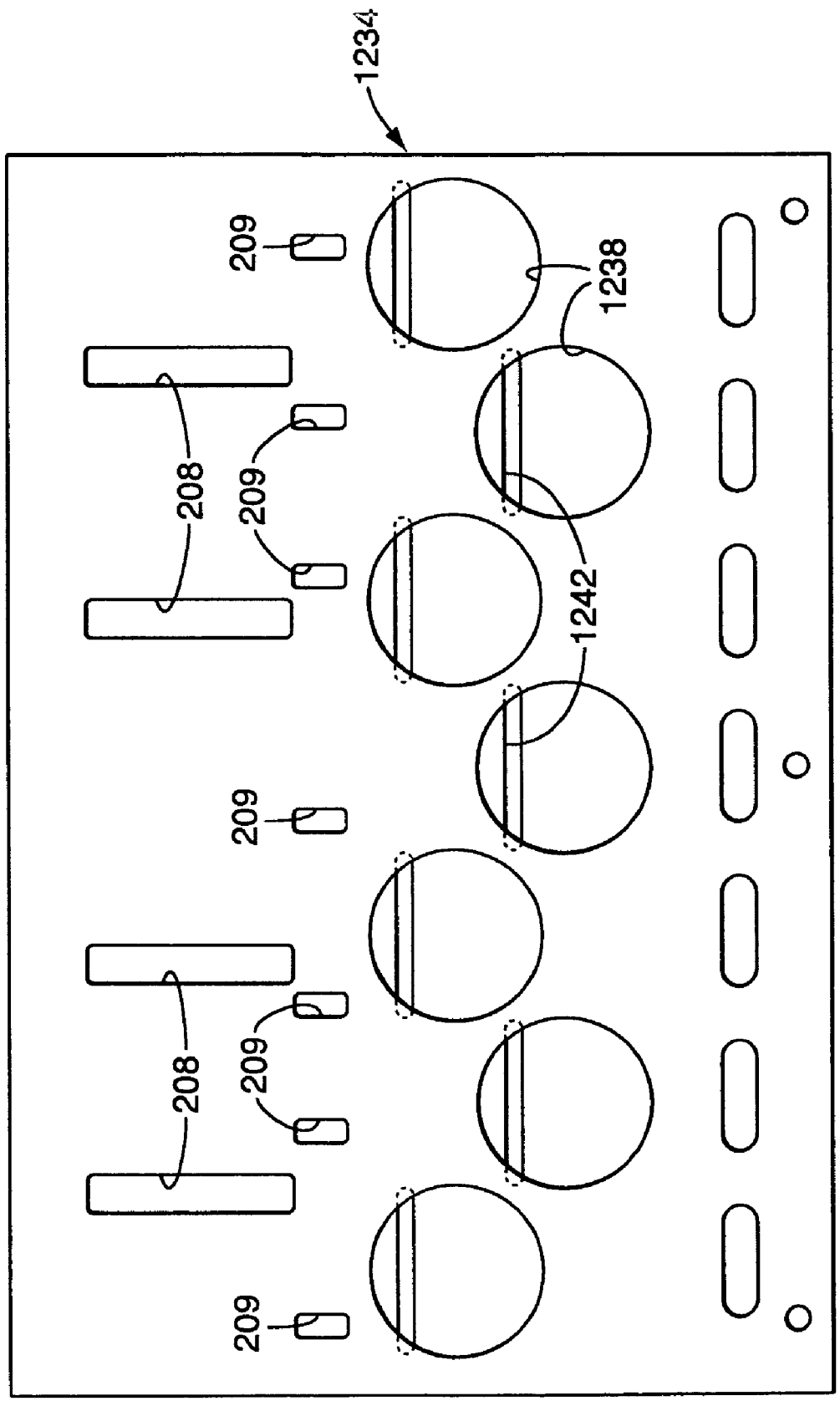
Figure 18:
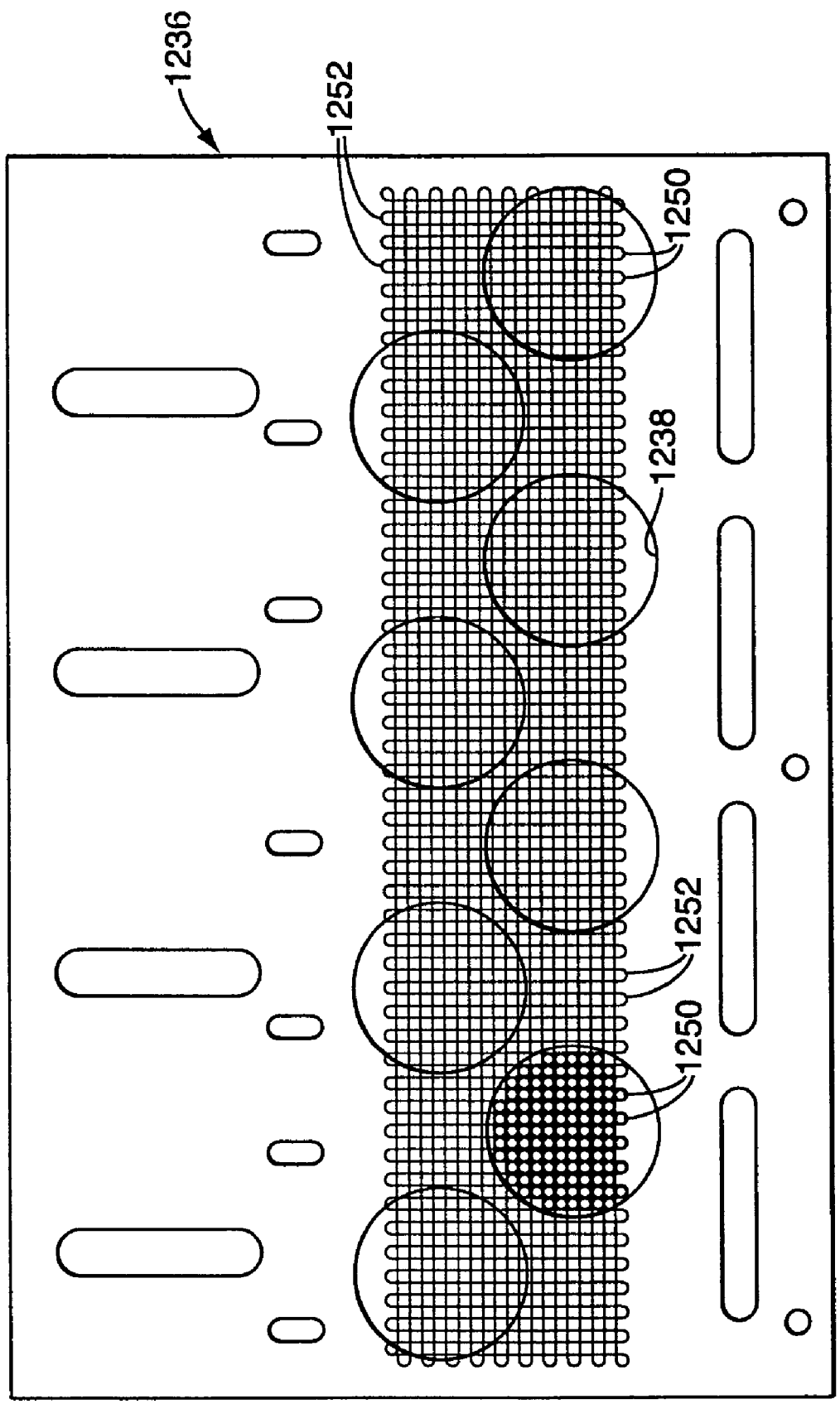

FIGS. 16-18 illustrate alternate mold plates 1232, 1234, 1236 having similar mold plate features as described above, but having two rows of cavities 1238 in staggered columns. In FIGS. 16 and 17 the cavities are filled by individual fill slots 1242 below the mold plates 1232, 1234. In FIG. 18, the cavities 1238 are filled by a plurality of fill apertures 1250 in registry with the cavities 1238. The apertures 1252 that are not in registry with the cavities are shown but are not drilled through the plate 1236.

Furthermore, the apparatus 20 can also have, in conjunction with the mold plate and fill plate arrangements, a stripper or seal off mechanism such as described in U.S. Pat. Nos. 4,821,376; 4,697,308; and/or 4,372,008, all herein incorporated by reference, or as available on current FORMAX F-26 machines.

Figure 12:
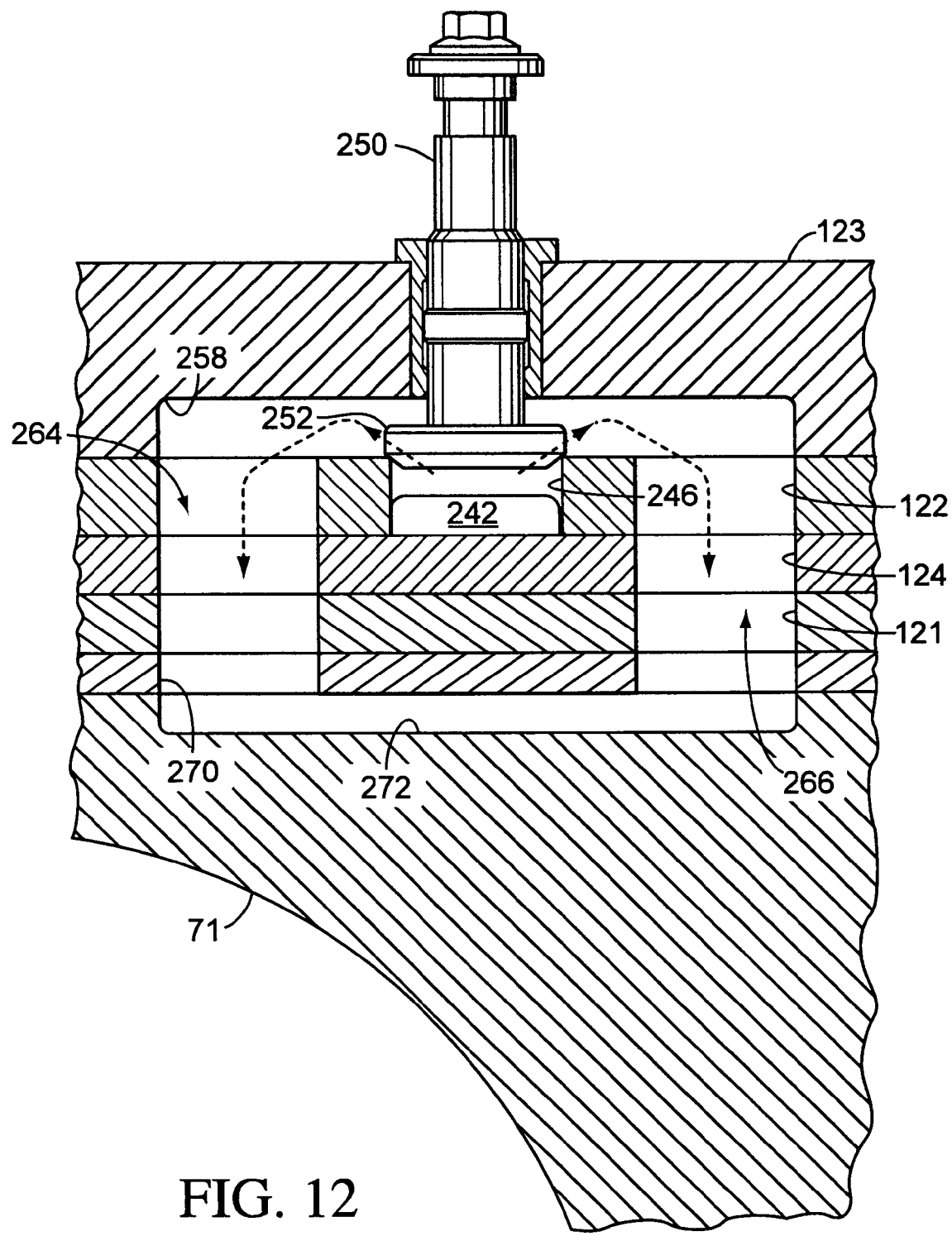
FIG. 12 is a fragmentary sectional view taken generally along line 12-12 of FIG. 9B, with some components and/or panels removed for clarity.
Figure 19:
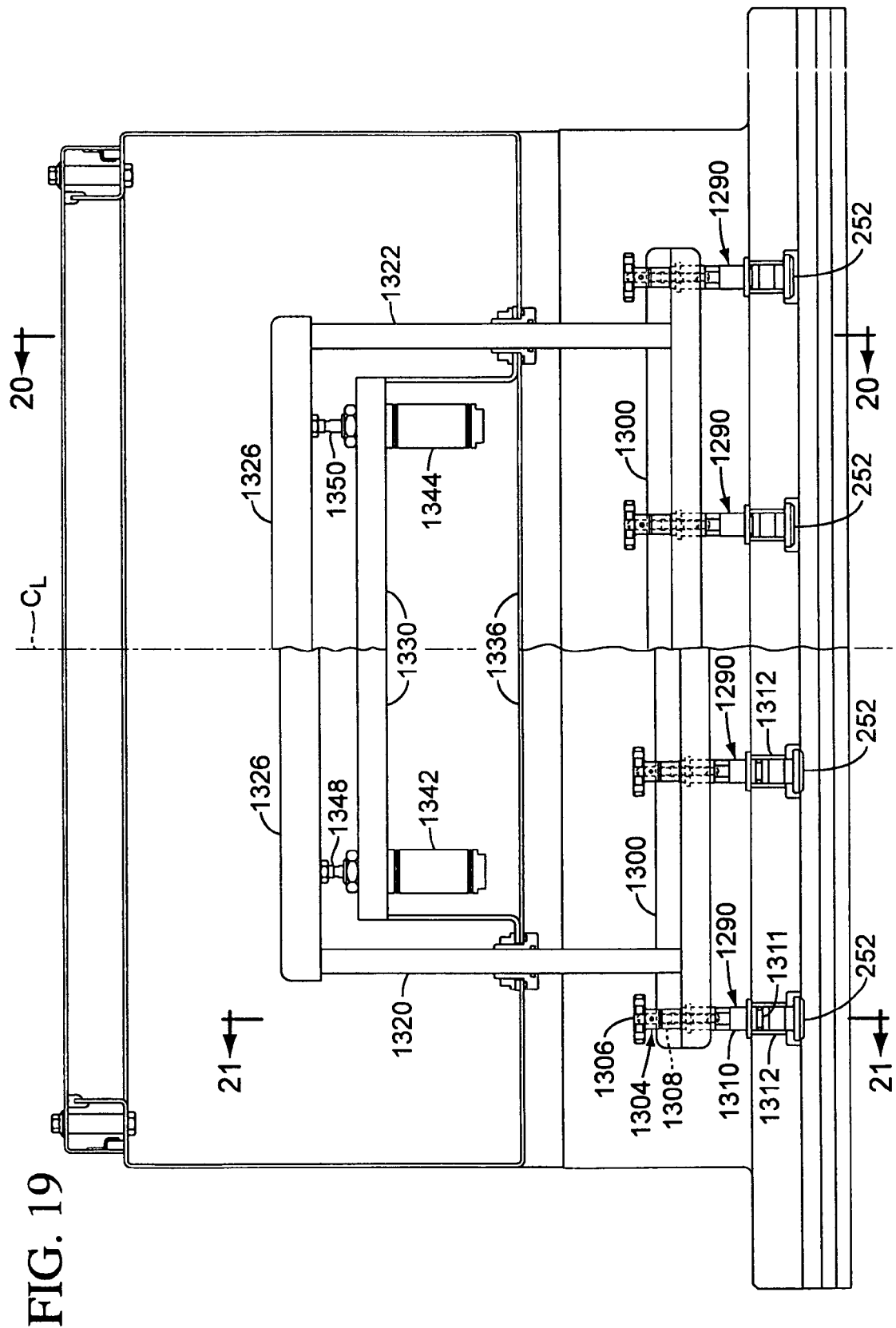
FIG. 19 is a sectional view of an alternate embodiment of the valve arrangement shown in FIG. 12, taken generally along line 19-19 from FIG. 9A, with some components and/or panels removed for clarity.
Figure 21:
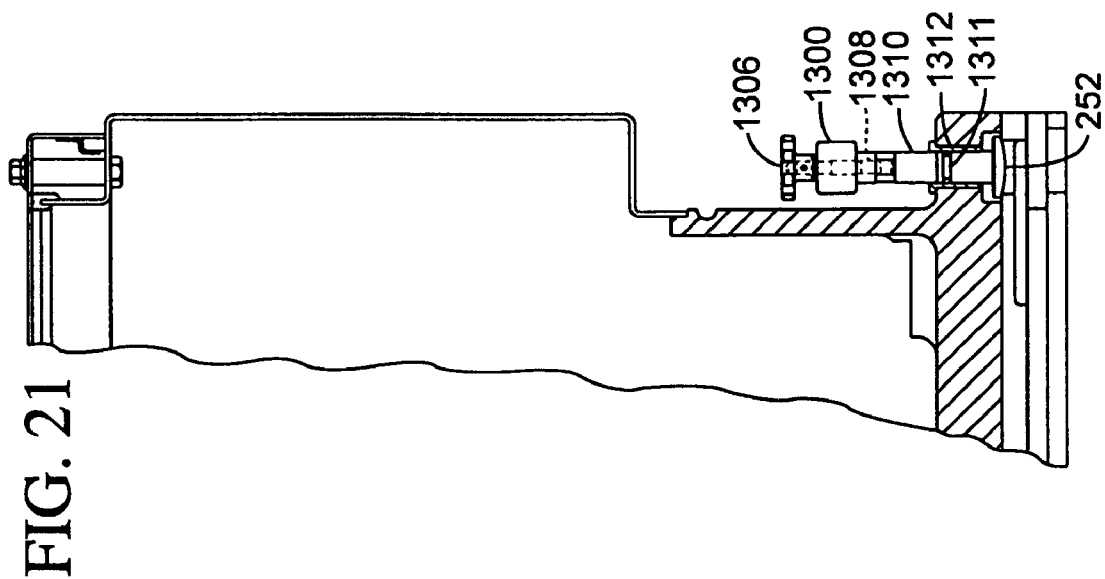
FIG. 21 is a sectional view taken generally along line 21-21 of FIG. 19.
Figure 20:
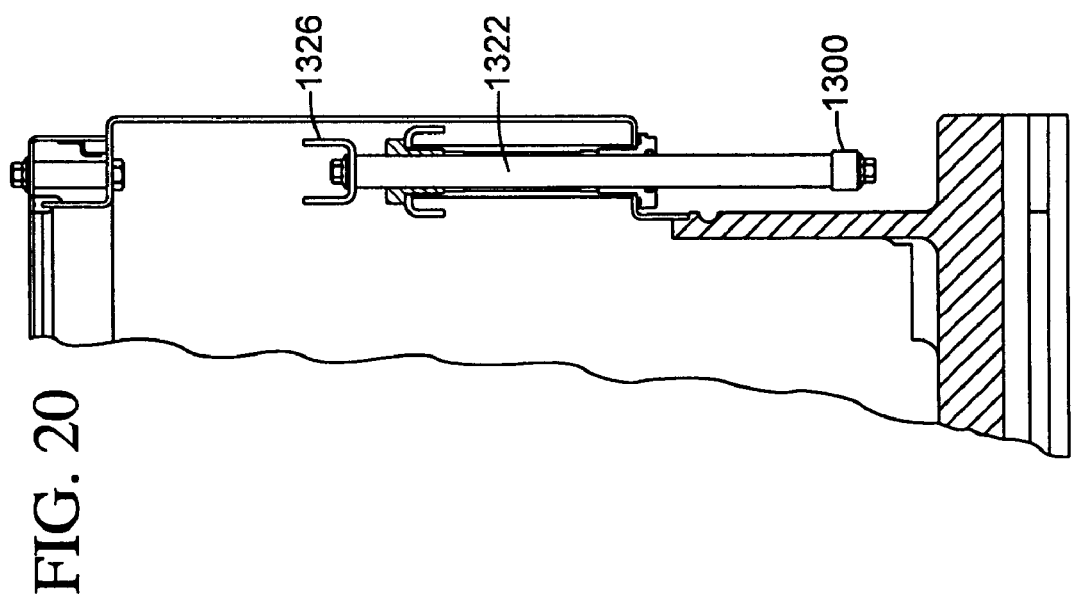
FIG. 20 is a sectional view taken generally along line 20-20 of FIG. 19.

FIG. 19 illustrates an alternate valve arrangement than described in FIG. 12. The porting of the valve elements 252 remains the same. The mechanism for opening and closing the valve elements 252 is modified. The sectional view is broken along its vertical centerline CL to show two valves 1290 with elements 252 lowered, and closed, to the left of the centerline CL, and two valves 1290 with elements 252 raised, and opened, shown to the right of the centerline CL. It should be understood however that in operation all four valve elements raise-and-lower together to open and close the valves.

The valves 1290 are mounted on a support bar 1300. The valves 1290 are mounted to the bar by a threaded adjustment mechanism 1304. The adjustment mechanism includes a handle 1306 locked onto a threaded shaft 1308 that is threaded into a valve stem assembly 1310 such that when the threaded shaft 1308 is turned by the handle 1306, the threaded shaft selectively raises or lowers the valve element 252 by precise amounts to set valve clearance and to ensure that the valves seat at the same time given their common movement. The valve stem assembly includes a ring seal 1311 to seal against a stationary sleeve 1312 of the valve 1290.

The support bar 1300 is supported on two rods 1320, 1322. A crossbar 1326 spans between the rods 1320,1322 and is fastened thereto. A bracket 1330 is supported on a machine wall 1336. A pair of pneumatic cylinders 1342, 1344 are fixed to the bracket 1330 and have actuation rods or piston rods 1348, 1350 fixed to the crossbar 1326. When the rods 1348, 1350 extend together from the cylinders 1342,1344, the crossbar 1326 raises the rods 1320, 1322, which raises the support bar 1300, which raises the valve stems 1310 and the valve elements 252. This opens the valves 1290.

Contracting the rods 1348, 1350 into the cylinders 1342, 1344 has the opposite effect, lowering the valve elements 252 and closing the valves 1290.

The pneumatic cylinders 1342, 1344 are signal-connected via pneumatic tubing and electronics to the machine controller that can precisely control the raising and lowering of the valve element to be synchronized with the mold plate movements. The valve element can be positively raised and lowers according to a precisely controlled timing sequence rather than being controlled by vacuum or positive pressure in the suction chamber or pump chamber.

FIG. 24 illustrates in schematic form, the control system of the present invention. The machine controller 23 can be programmed to control the servo motor drives 138, 157 and the pneumatic cylinders 1342, 1344, via the interface 1345, to be properly sequenced to coordinate the movements of the knockout cups and the valves 1290 with the movement and position of the mold plate 32. The controller can be pre-programmed, or programmed through the control panel 19, to control the mold plate accelerations, decelerations, advance and retract speeds, and dwell durations. These mold plate movement parameters can be selected depending on the particular product being molded, the characteristics of the food material, the selected production output rate of the machine, or other factors. The controller can control the advance and retract speeds, the accelerations and decelerations, and the dwell durations of the knock out cups 33 as well. These knock out cup movement parameters can be selected depending on the particular product being molded, the characteristics of the food material, the selected production output rate of the machine, or other factors. The controller can have pre-programmed routines for a selectable product and output rate that are selectable via the control panel 19 that sets and coordinates the mold plate 32 movements, the knock out cup 33 movements and the valve 1290 movements.

The controller also controls the operation of the hydraulic cylinders 64, 84 to control the food pumps 61, 62.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. In a molded food product forming machine, a drive system for reciprocating a mold plate between a cavity fill position and a patty discharge position, the drive system comprising:

an electric motor having a motor output shaft;

an electric motor control that is configured to precisely control the rotational position of said motor output shaft;

a first gear train operatively connected to said motor output shaft and having a first output shaft arranged having a first vertical axis;

a first crank arm having a base end and a distal end and connected at said base end to said first output shaft and arranged to rotate with said first output shaft about said first vertical axis;

a first drive rod operatively connected to said distal end of said first crank arm and arranged to linearly reciprocate with the rotation of said first crank arm;

a second gear train operatively connected to said motor output shaft and having a second output shaft arranged having a second vertical axis;

a second crank arm having a base end and a distal end and connected at said base end to said second output shaft and arranged to rotate with said second output shaft about said second vertical axis;

a second drive rod operatively connected to said distal end of said second crank arm and arranged to linearly reciprocate with the rotation of said second crank arm;

wherein said first and second gear trains are configured such that said first and second output shafts rotate simultaneously in opposite rotational directions about said first and second vertical axes;

said first and second drive rods connectable to a mold plate; and a controller in communication with said electric motor control, coordinating the rotation of said motor output shaft of said electric motor, said controller controls the precise positions of said first and second drive rods during reciprocation thereof by controlling said electric motor control according to a pre-selected routine.

2. The drive system according to claim 1, wherein said electric motor and said electric motor control comprise a servomotor drive.

3. The drive system according to claim 1, wherein said motor output shaft rotates in a single rotary direction during each mold plate movement cycle.

4. The drive system according to claim 1, wherein said first and second drive rods are arranged in parallel, and comprising a bearing for each drive rod for guiding sliding movement of said drive rods, said bearings mountable on a frame of a molding machine, and a lubrication oil system circulating lubricating oil between said drive rods and said bearings.

5. The drive system according to claim 1, comprising a tie rod connected between said first and second drive rods.

6. A mold plate drive for a molded food product forming machine, comprising:

an electric motor;

a pair of drive rods operatively connected to a mold plate;

a gear train having gears driven into rotation by said motor; and a pair of cranks arranged to rotate about vertical axes and driven into rotation by said gears, each of said cranks operatively connected to reciprocally drive one of said drive rods wherein said drive rods drive said mold plate into reciprocation between a fill position and a discharge position.

7. The drive according to claim 6, wherein said gear train is configured for said cranks to simultaneously rotate in opposite directions.

8. The drive according to claim 6, wherein said motor comprises a precise position-controlled motor.

9. The drive according to claim 6, wherein said motor comprises a servomotor.

10. The drive according to claim 6, comprising a tie rod connected between said drive rods.

11. The drive according to claim 6, comprising a tie rod connected between said drive rods;

wherein said cranks are arranged to rotate in opposite directions; and wherein said motor comprises a precise position-controlled motor.

12. In a molded food product forming machine, a drive system for reciprocating a mold plate between a cavity fill position and a patty discharge position and for reciprocating knock out plungers to discharge molded food patties from cavities in the mold plate, the drive system comprising:

a mold plate and a plurality of knock out plungers;

a first electric motor;

a first rotary-to-linear motion converting device a comprising a first gear train operatively connected to said first electric motor and having a first output shaft arranged having a first vertical axis; a first crank arm having a base end and a distal end and connected at said base end to said first output shaft and arranged to rotate with said first output shaft about said first vertical axis; a second gear train operatively connected to said first electric motor and having a second output shaft arranged having a second vertical axis; and a second crank arm having a base end and a distal end and connected at said base end to said second output shaft and arranged to rotate with said second output shaft about said second vertical axis; wherein said first and second gear trains are configured such that said first and second output shafts rotate simultaneously in opposite rotational directions about said first and second vertical axes;

a first drive rod operatively connected to said distal end of said first crank arm and arranged to linearly reciprocate with the rotation of said first crank arm;

a second drive rod operatively connected to said distal end of said second crank arm and arranged to linearly reciprocate with the rotation of said second crank arm;

said first and second drive rods connected to said mold plate;

a second electric motor;

a second rotary-to-linear motion converting device operatively connected to said second electric motor;

at least one knock out member operatively connected between said second rotary-to-linear motion converting device and said knock out plungers;

operation of said first electric motor causing reciprocation of said mold plate via said first rotary-to-linear motion converting device and said first and second drive rods, and operation of said second electric motor causing reciprocation of said knock out plungers via said second rotary-to-linear motion converting device and said knock out member; and a controller coordinating the rotation of said first and second electric motors.

13. The drive system according to claim 12, wherein said second electric motor comprises a precise position-controlled knock out motor having a rotary output shaft; and said second rotary-to-linear motion converting device receives rotary motion from said rotary output shaft, said second rotary-to-linear motion converting device comprising a rotating eccentric that is operatively connected to said knock out member; and said plurality of knock out plungers operatively connected to said knock out member to be driven into linear motion to pass into said cavities to discharge patties, and subsequently to withdraw from said cavities.

14. The drive system according to claim 13, wherein said precise position-controlled knock out motor comprises a servomotor.

15. The drive system according to claim 13, wherein said knock out member comprises a frame mounting said knock out plungers, and comprising a crank rod extending perpendicular to an axis of said rotary output shaft and pivotally connected to said rotating eccentric, said crank rod pivotally connected at an opposite end to said frame.

16. The drive system according to claim 12, wherein each of said first and second electric motors comprises a servomotor, and said controller controls the precise positions of said mold plate and said knock out plungers by controlling said first and second electric motors according to a pre-selected routine.

17. The drive system according to claim 12, wherein said first and second electric motors each operate in single respective rotary directions during each mold plate movement cycle.

18. The drive system according to claim 12, wherein said first and second drive rods are arranged in parallel, and comprising a bearing for each drive rod for guiding sliding movement of said drive rods, said bearings carried on said machine frame, and a lubrication oil system circulating lubricating oil between said drive rods and said bearings.

19. The drive system according to claim 12, wherein said first electric motor comprises a precise position-controlled motor.

20. The drive system according to claim 19, wherein said motor comprises a servomotor.

21. The drive system according to claim 12, comprising a tie rod connected between said first and second drive rods.

22. The drive system according to claim 12, wherein said second electric motor comprises a precise position-controlled motor having a rotary output shaft; and said second rotary-to-linear motion converting device receives rotary motion from said rotary output shaft, said second rotary-to-linear motion converting device comprising a rotating eccentric that is operatively connected to said knock out member; and said plurality of knock out plungers operatively connected to said knock out member to be driven into linear motion to pass into said cavities to discharge patties, and subsequently to withdraw from said cavities.

23. A molded food product forming machine, comprising:
a machine frame;
a mold plate having patty-forming cavities therein and arranged to reciprocate on said machine frame between a cavity fill position and a patty discharge position;
a food material delivery system configured to feed food material under pressure into said cavities when said mold plate is in said cavity fill position;
a first electric motor having a first motor output shaft;
a first electric motor control that is configured to precisely control the rotational position of said first motor output shaft;
a first gear train operatively connected to said first motor output shaft and having a first gear train output shaft arranged having a first vertical axis;
a first crank arm having a base end and a distal end and connected at said base end to said first gear train output shaft and arranged to rotate with said first gear train output shaft about said first vertical axis;
a first drive rod operatively connected to said distal end of said first crank arm and arranged to linearly reciprocate with the rotation of said first crank arm;
a second gear train operatively connected to said first motor output shaft and having a second gear train output shaft arranged having a second vertical axis;
a second crank arm having a base end and a distal end and connected at said base end to said second gear train output shaft and arranged to rotate with said second gear train output shaft about said second vertical axis;
a second drive rod operatively connected to said distal end of said second crank arm and arranged to linearly reciprocate with the rotation of said second crank arm;
wherein said first and second gear trains are configured such that said first and second gear train output shafts rotate simultaneously in opposite rotational directions about said first and second vertical axes;
said first and second drive rods connected to said mold plate; and
a controller in communication with said first electric motor control, coordinating the rotation of said first motor output shaft of said first electric motor, said controller controls the precise positions of said first and second drive rods during reciprocation thereof by controlling said first electric motor control according to a pre-selected routine.

24. The machine according to claim 23, further comprising:
a plurality of knockout plungers arranged above said patty discharge position, said knock out plungers carried by said machine frame and movable vertically to discharge patties from said cavities when said mold plate is in the patty discharge position;
a second electric motor having a second output shaft;
a second electric motor control that is configured to precisely control the rotational position of said second output shaft;
a rotary-to-linear motion converting device operatively connected to said second output shaft;
at least one second drive member operatively connected to said rotary-to-linear motion converting device and to said plurality of knockout plungers;
rotation of said second output shaft causing reciprocation of said plurality of knockout plungers via said rotary-to-linear motion converting device and said second drive member; and
wherein said controller is in communication with said second electric motor control, coordinating the rotation of said second output shaft of said second electric motor.

25. The machine according to claim 24, wherein each of said first and second electric motors and motor drives comprises a servomotor drive, and said controller controls the precise positions of said mold plate and said knock out plungers by controlling said first and second electric motors according to a pre-selected routine.

26. The machine according to claim 24, wherein said first and second electric motors each operate in a single respective rotary direction during each mold plate movement cycle.

27. A drive system for a molded food product forming machine having a reciprocating mold plate that reciprocates between a cavity fill position and a patty discharge position and reciprocating knock out plungers to discharge molded food patties from filled cavities in the mold plate, the drive system comprising:

a mold plate having a plurality of cavities and a plurality of knock out plungers;

a breather plate and a breather passage, said breather plate having breather holes arranged to register with said cavities when said cavities are in a fill position, said breather holes arranged to communicate with said breather channel, said breather passage in communication with a food product fines collection area;

at least one valve that is arranged to close said breather passage between said breather holes and said collection area, said valve closed during at least a portion of the movement of the mold plate from said cavity fill position toward said patty discharge position and opened during at least a portion of the movement of the mold plate from said patty discharge position toward said cavity fill position;

a first precise position controlled electric motor;

a first rotary-to-linear motion converting device a comprising a first gear train operatively connected to said first precise position controlled electric motor and having a first output shaft arranged having a first vertical axis; a first crank arm having a base end and a distal end and connected at said base end to said first output shaft and arranged to rotate with said first output shaft about said first vertical axis; a second gear train operatively connected to said first precise position controlled electric motor and having a second output shaft arranged having a second vertical axis; and a second crank arm having a base end and a distal end and connected at said base end to said second output shaft and arranged to rotate with said second output shaft about said second vertical axis; wherein said first and second gear trains are configured such that said first and second output shafts rotate simultaneously in opposite rotational directions about said first and second vertical axes;

a first drive rod operatively connected to said distal end of said first crank arm and arranged to linearly reciprocate with the rotation of said first crank arm;

a second drive rod operatively connected to said distal end of said second crank arm and arranged to linearly reciprocate with the rotation of said second crank arm;

said first and second drive rods connected to said mold plate and extending between said first rotary-to-linear motion converting device and said mold plate;

rotation of said first electric motor causing reciprocation of said mold plate via said first rotary-to-linear motion converting device and said first and second drive rods; and a controller coordinating the rotation of said first electric motor and the opening and closing of said valve.

28. The system according to claim 27, comprising:

a second precise position controlled electric motor;

a second rotary-to-linear motion converting device operatively connected to said second electric motor; and at least one knock out member operatively connected between said second rotary-to-linear motion converting device and said knock out plungers, rotation of said second electric motor causing reciprocation of said knock out plungers via said second rotary-to-linear motion converting device and said knock out member, said controller coordinating the rotation of said second electric motor with rotation of said first electric motor.

* * * * *